(12) United States Patent
Wittek et al.

(10) Patent No.: US 11,208,594 B2
(45) Date of Patent: Dec. 28, 2021

(54) LIQUID-CRYSTALLINE MEDIUM AND HIGH-FREQUENCY COMPONENTS COMPRISING SAME

(71) Applicant: Merck Patent GmbH, Darmstadt (DE)

(72) Inventors: Michael Wittek, Erzhausen (DE); Constanze Brocke, Gross-Gerau (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 53 days.

(21) Appl. No.: 15/539,181

(22) PCT Filed: Dec. 14, 2015

(86) PCT No.: PCT/EP2015/002509
§ 371 (c)(1),
(2) Date: Jun. 23, 2017

(87) PCT Pub. No.: WO2016/107670
PCT Pub. Date: Jul. 7, 2016

(65) Prior Publication Data
US 2017/0349827 A1 Dec. 7, 2017

(30) Foreign Application Priority Data

Dec. 29, 2014 (EP) .................................. 14004431

(51) Int. Cl.
| | |
|---|---|
| *C09K 19/18* | (2006.01) |
| *C09K 19/44* | (2006.01) |
| *C09K 19/12* | (2006.01) |
| *C09K 19/04* | (2006.01) |
| *C09K 19/30* | (2006.01) |
| *C09K 19/16* | (2006.01) |

(52) U.S. Cl.
CPC .............. *C09K 19/18* (2013.01); *C09K 19/12* (2013.01); *C09K 19/16* (2013.01); *C09K 19/44* (2013.01); *C09K 2019/0459* (2013.01); *C09K 2019/0466* (2013.01); *C09K 2019/122* (2013.01); *C09K 2019/123* (2013.01); *C09K 2019/183* (2013.01); *C09K 2019/188* (2013.01); *C09K 2019/3004* (2013.01); *C09K 2219/11* (2013.01)

(58) Field of Classification Search
CPC ........................ C09K 19/18; C09K 2019/188
See application file for complete search history.

(56) References Cited

U.S. PATENT DOCUMENTS

| | | | | |
|---|---|---|---|---|
| 5,356,558 | A | * | 10/1994 | Yamada .................. C07C 25/24 252/299.01 |
| 6,210,603 | B1 | | 4/2001 | Kondo et al. |
| 6,210,761 | B1 | | 4/2001 | Kondo et al. |
| 6,254,941 | B1 | | 7/2001 | Kondou et al. |
| 2005/0260358 | A1 | * | 11/2005 | Motoyama .............. C07C 69/94 428/1.1 |
| 2012/0119141 | A1 | * | 5/2012 | Manabe ................. C09K 19/12 252/299.01 |
| 2012/0162595 | A1 | | 6/2012 | Lee et al. |
| 2012/0182200 | A1 | | 7/2012 | Manabe et al. |
| 2012/0261615 | A1 | | 10/2012 | Manabe et al. |

(Continued)

FOREIGN PATENT DOCUMENTS

| | | | | | |
|---|---|---|---|---|---|
| CN | | 102634347 A | * | 8/2012 | ............. C09K 19/42 |
| CN | | 103254910 A | | 8/2013 | |

(Continued)

OTHER PUBLICATIONS

English translation of JP2002308814. (Year: 2002).*

(Continued)

*Primary Examiner* — Chanceity N Robinson
*Assistant Examiner* — Anna Malloy
(74) *Attorney, Agent, or Firm* — Millen White Zelano & Branigan, PC; Brion P. Heaney

(57) ABSTRACT

Liquid-crystalline media comprising
one or more compounds of formula G

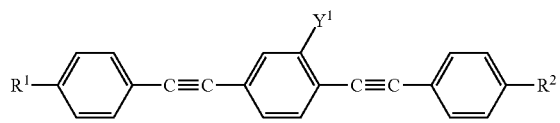

and
one or more compounds selected from the group of compounds of formulae I, II and III,

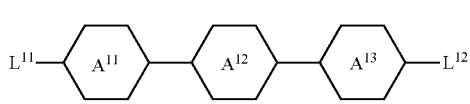

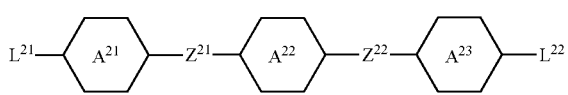

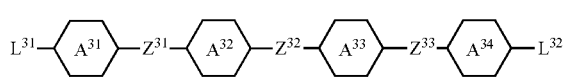

in which the parameters have the meaning indicated in claim 1, and components comprising these media, are suitable for use in high-frequency technology, in particular, in phase shifters and microwave array antennas.

26 Claims, No Drawings

(56) References Cited

U.S. PATENT DOCUMENTS

| | | | | |
|---|---|---|---|---|
| 2013/0292608 | A1* | 11/2013 | Manabe | C09K 19/322 252/299.62 |
| 2014/0125938 | A1* | 5/2014 | Wittek | C09K 19/0275 349/183 |
| 2017/0051207 | A1* | 2/2017 | Okabe | C09K 19/14 |
| 2017/0313940 | A1* | 11/2017 | Okabe | C09K 19/12 |

FOREIGN PATENT DOCUMENTS

| | | | | |
|---|---|---|---|---|
| DE | 102010025572 | A1 | 1/2012 | |
| JP | 1998101600 | A | 4/1998 | |
| JP | 2002308814 | A * | 10/2002 | |
| JP | 2002308814 | A | 10/2002 | |
| JP | 4044617 | B2 | 2/2008 | |
| JP | 4044618 | B2 | 2/2008 | |
| JP | 2013506016 | A | 2/2013 | |
| JP | 2013512970 | A | 4/2013 | |
| JP | 2014511399 | A | 5/2014 | |
| WO | WO-2012163478 | A1 * | 12/2012 | C09K 19/0275 |
| WO | 2013034227 | A1 | 3/2013 | |
| WO | 2013045029 | A1 | 4/2013 | |
| WO | 2013139176 | A1 | 9/2013 | |
| WO | 15162950 | A1 | 10/2015 | |

OTHER PUBLICATIONS

Dubois et al. "Large Microwave Birefrinegence Liquid-Crystal Characerization for Phase-Shifter Applications", 2008, Japanese Journal of Applied Physics, vol. 47 No. 5, 3564-3567. (Year: 2008).*
English translation of CN 102634347. (Year: 2012).*
Adomenas, et al., "Acetylenic liquid crystals available by Castro reaction", 1981, Advances in Liquid Crystal Research and Applications, 1029-1038. (Year: 1981).*
ISR for PCT/2015EP/002509 dated Feb. 3, 2016.
English machine translation DE102010025572A1 published Jan. 5, 2012 to Merck Patent GMBH.
English machine translation WO2013139176A1 published Sep. 26, 2013 to XU Haibin of Jiangsu Hecheng Display.
Office Action in corresponding ROC (Taiwan) Patent Application No. 104144072 dated Jul. 22, 2019 (pp. 1-5) with english machine translation of same (pp. 1-4).
English translation of Japanese office action dated Jan. 14, 2020 in corresponding JP Patent Application No. 2017-534825 (pp. 1-4).
English translation of CN office action dated Sep. 3, 2020, received Sep. 14, 2020 in corresponding CN Patent Application No. 201580071397.6 (pp. 1-23).

* cited by examiner

LIQUID-CRYSTALLINE MEDIUM AND HIGH-FREQUENCY COMPONENTS COMPRISING SAME

FIELD OF THE INVENTION

The present invention relates to liquid-crystalline media and to high-frequency components comprising same, especially microwave components for high-frequency devices, such as devices for shifting the phase of microwaves, in particular for microwave phased-array antennas.

Prior Art and Problem to be Solved

Liquid-crystalline media have a been used for some time in electro-optical displays (liquid crystal displays: LCDs) in order to display information.

Recently, however, liquid-crystalline media have also been proposed for use in components for microwave technology, such as, for example, in DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tunable Components Using Liquid Crystals. $32^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters. It has already investigated liquid-crystalline media with respect to their properties in the corresponding frequency range. In addition, it describes liquid-crystalline media which comprise compounds of the formulae

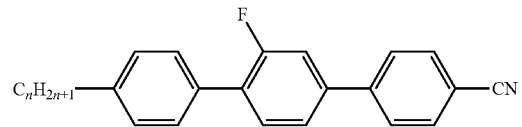

besides compounds of the formulae

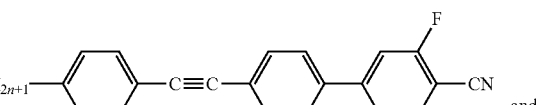

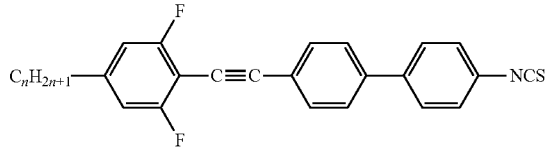

or besides compounds of the formulae

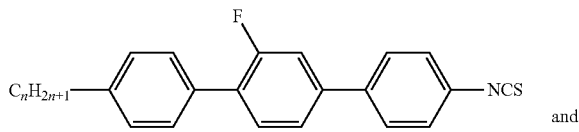

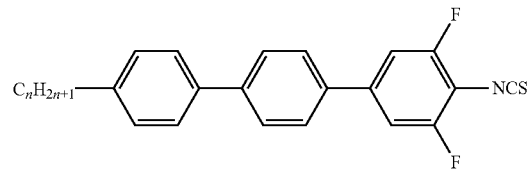

Further liquid crystalline media for microwave applications comprising one or more these compounds, as well as similar ones, are proposed by for microwave applications e.g. in WO 2013/034227 A1 and DE 10 2010 025 572 A1, which discloses, amongst others, liquid crystalline media comprising compounds of formula

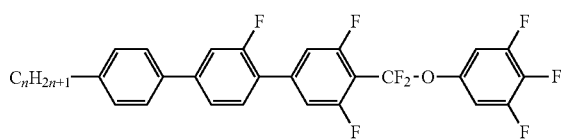

But these media are characterized by rather high values of the clearing point and by high rotational viscosities, leading to long response times, which are undesirable for many practical applications. They further do in many cases exhibit nematic phase ranges, which are not adequate for many practical applications. Especially the phase behaviour at low temperature has to be improved for most of them.

Polymer stabilization of liquid crystalline media, as well as doping by chiral dopants, has already been proposed for several types of display applications and for various reasons. However, there has been no respective suggestion for the type of applications envisaged by the instant application.

The known devices for the high frequency-technology comprising these media do still lack sufficient stability and, in particular, fast response.

However, these compositions are afflicted with serious disadvantages. Most of them result, besides other deficiencies, in disadvantageously high losses and/or inadequate phase shifts or inadequate material quality.

For these applications, liquid-crystalline media having particular, hitherto rather unusual and uncommon properties or combinations of properties are required.

Novel liquid-crystalline media having improved properties are thus necessary. In particular, the dielectric loss in the microwave region must be reduced and the material quality ($\eta$, sometimes also called figure of merit, short FoM), i.e. a high tunability and, at the same time, a low dielectric loss, must be improved. Besides these requirements increased focus has to be placed on improved response times for several envisaged applications especially for those devices using planar structures such as e.g. phase shifters and leaky antennas.

In addition, there is a steady demand for an improvement in the low-temperature behaviour of the components. Both an improvement in the operating properties at low temperatures and also in the shelf life are necessary here.

There is therefore a considerable demand for liquid-crystalline media having suitable properties for corresponding practical applications.

The invention additionally has the aim of providing improved methods and materials, to achieve polymer stabilised mesogenic phases, in particular nematic phases, which do not have the above-mentioned disadvantages of methods and materials described in prior art. These mesogenic phases comprise a polymer and a low molecular weight mesogenic material. Consequently, they are also called "composite systems", or short "systems".

Another aim of the invention is to extend the pool of suitable materials available to the expert. Other aims are immediately evident to the expert from the following description.

Surprisingly, it has now been found that liquid crystalline media comprising one or more compounds of formula G as defined below are characterized by a very good temperature range and especially by an excellent behavior under storage at low temperatures compared to the state of the art. They are characterized by comparatively wide nematic phase ranges extending to deep temperatures.

Preferably the chiral dopants present in the media according to the instant application are mesogenic compounds and most preferably they exhibit a mesophase on their own.

Particularly preferred, the media according to the present invention comprise one or more chiral dopants. Preferably these chiral dopants have an absolute value of the helical twisting power (short HTP) in the range of 1 $\mu m^{-1}$ or more to 150 $\mu m^{-1}$ or less, preferably in the range from 10 $\mu m^{-1}$ or more to 100 $\mu m^{-1}$ or less. In case the media comprise at least two, i.e. two or more, chiral dopants, these may have mutually opposite signs of their HTP-values. This condition is preferred for some specific embodiments, as it allows to compensate the chirality of the respective compounds to some degree and, thus, may be used to compensate various temperature dependent properties of the resulting media in the devices. Generally, however, it is preferred that most, or, even more preferred, all of the chiral compounds present in the media according to the present invention have the same sign of their HTP-values.

It has to be noted here that, as a first approximation, the HTP of a mixture of chiral compounds, i.e. of conventional chiral dopants, as well as of chiral reactive mesogens, may be approximated by the addition of their individual HTP values weighted by their respective concentrations in the medium.

In this embodiment, the cholesteric pitch of the modulation medium in the cholesteric phase, also referred to as the chiral nematic phase, can be reproduced to a first approximation by equation (1).

$$P = (HTP \cdot c)^{-1} \qquad (1)$$

in which P denotes the cholesteric pitch,
  c denotes the concentration of the chiral component (A) and
  HTP (helical twisting power) is a constant which characterises the twisting power of the chiral substance and depends on the chiral substance (component (A)) and on the achiral component (B).

If the pitch is to be determined more accurately, equation (1) can be correspondingly modified. To this end, the development of the cholesteric pitch in the form of a polynomial (2) is usually used.

$$P = (HTP \cdot c)^{-1} + (\alpha_1 \cdot c)^{-2} + (\alpha_2 \cdot c)^{-3} + \ldots \qquad (2)$$

in which the parameters are as defined above for equation (1) and
  $\alpha_1$ and $\alpha_2$ denote constants which depend on the chiral component (A) and on the achiral component (B).

The polynomial can be continued up to the degree, which enables the desired accuracy.

Typically the parameters of the polynomial (HTP (sometimes also called $\alpha_1$, $\alpha_2$, $\alpha_3$ and so forth) do depend more strongly on the type of the chiral dopant, and, to some degree, also on the specific liquid crystal mixture used.

Obviously, they do also depend on the enantiomeric excess of the respective chiral dopant. They have their respective largest absolute values for the pure enantiomers and are zero for racemates. In this application the values given are those for the pure enantiomers, having an enantiomeric excess of 98% or more, unless explicitly stated otherwise.

If the chiral component (A) consists of two or more compounds, equation (1) is modified to give equation (3).

$$P = [\Sigma_i (HTP(i) \cdot c_i)]^{-1} \qquad (3)$$

in which P denotes the cholesteric pitch,
  $c_i$ denotes the concentration of the i-th compound of the chiral component (A) and HTP(i) denotes the HTP of the i-th compound of the chiral component (A) in the achiral component (B).

The temperature dependence of the HTP is usually represented in a polynomial development (4), which, however, for practical purposes often can be terminated already right after the linear element ($\beta_1$).

$$HTP(T)=HTP(T_0)+\beta_1 \cdot (T-T_0)+\beta_2 \cdot (T-T_0)^2+ \ldots \quad (4)$$

in which the parameters are as defined above for equation (1) and
T denotes the temperature,
$T_0$ denotes the reference temperature,
HTP(T) denotes the HTP at temperature T,
HTP($T_0$) denotes the HTP at temperature $T_0$ and
$\beta_1$ and $\beta_2$ denote constants which depend on the chiral component (A) and on the achiral component (B).

Additionally, it has been found that by using an RM, a stabilised liquid crystalline phase which has a broad temperature range and a improved, faster switching times, good tunability and acceptable loss can be achieved.

Additionally to mesogenic monomers the use of non-mesogenic monomers, such as 2-ethylhexylacrylate, is also possible and in certain instances may be beneficial. It, however, also may be problematic due to the volatile nature of such compounds, leading to problems of loss due to evaporation and inhomogeniety of the mixed monomer/host system.

Also, the use of non-mesogenic compounds can severely lower the clearing point of the liquid crystalline host, leading to a much smaller width of the polymer stabilised nematic phase, which is not desirable for most practical applications.

Using RMs having a cyclohexylene core instead of a core comprising one or more 1,4-phenylenes has an advantage for the stability against UV irradiation in general and in particular against the UV irradiation used in the polymerisation process. The resultant polymer stabilised phase (composite system) therefore has a high voltage holding ratio (VHR).

Also, it has been found that by using cyclohexylene RMs in combination with a liquid crystalline host comprising fluorophenyl liquid crystalline compounds, the RMs do effectively stabilise this host to give a high VHR, which is necessary for advanced state-of-the-art devices.

Present Invention

Surprisingly, it has now been found that it is possible to achieve liquid-crystalline media having a suitably fast switching time, a suitable nematic phase range and loss which do not have the disadvantages of the prior-art materials, or at least only do so to a considerably reduced extent.

These improved liquid-crystalline media in accordance with the present invention comprise
one or more compounds of the formula G,

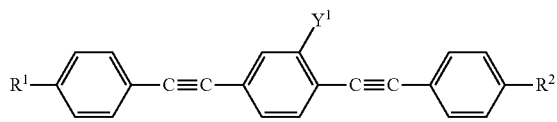

wherein
$R^1$ and $R^2$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, and
$Y^1$ denotes halogen, preferably F or Cl and
preferably $R^1$ and $R^2$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms,
particularly preferably $R^1$ denotes unfluorinated alkyl having 1 to 7 C atoms or unfluorinated alkenyl, unfluorinated alkenyloxy or unfluorinated alkoxyalkyl, each having 2 to 7 C atoms, and
particularly preferably $R^2$ denotes unfluorinated alkyl or unfluorinated alkoxy, each having 1 to 7 C atoms, and
one or more compounds selected from the group of compounds of formulae I, II and III

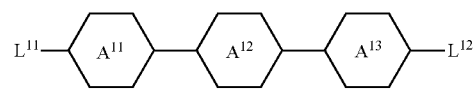

in which
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

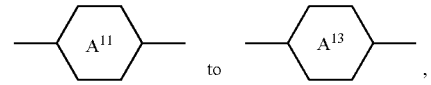

independently of one another, denote

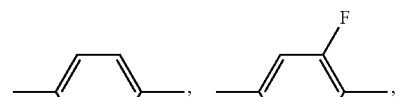

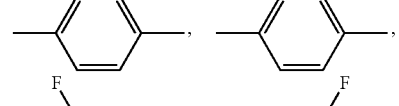

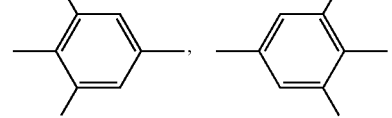

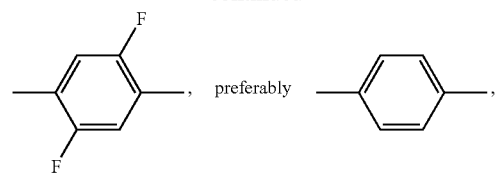, preferably

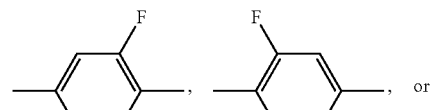,

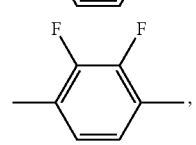, or

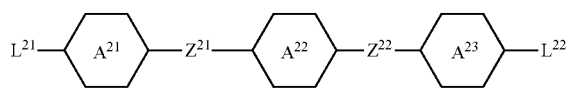,

II $$L^{21}-A^{21}-Z^{21}-A^{22}-Z^{22}-A^{23}-L^{22}$$

in which $L^{21}$ denotes $R^{21}$ and, in the case where $Z^{21}$ and/or $Z^{22}$ denote trans-CH=CH— or trans-CF=CF—, alternatively denotes $X^{21}$, $L^{22}$ denotes $R^{22}$ and, in the case where $Z^{21}$ and/or $Z^{22}$ denote trans-CH=CH— or trans-CF=CF—, alternatively denotes $X^{22}$, $R^{21}$ and $R^{22}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{21}$ and $X^{22}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, or —NCS, preferably —NCS, one of $Z^{21}$ and $Z^{22}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

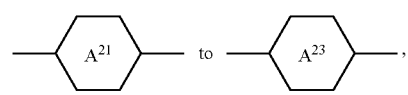

independently of one another, denote

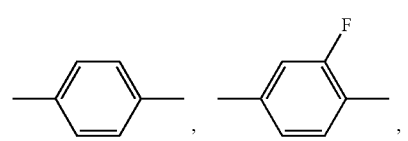,

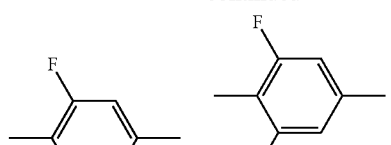,

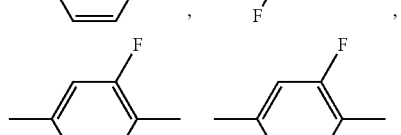,

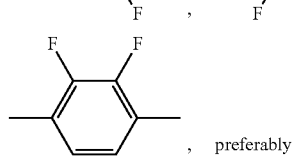, preferably

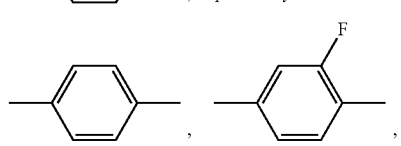,

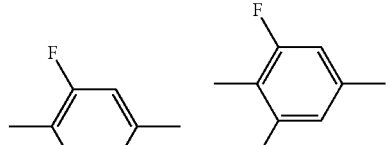,

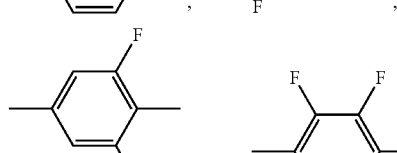, or

III

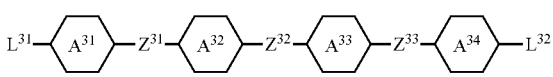

in which $L^{31}$ denotes $R^{31}$ or $X^{31}$, $L^{32}$ denotes $R^{32}$ or $X^{32}$, $R^{31}$ and $R^{32}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denotes a single bond, particularly preferably all denote a single bond, and

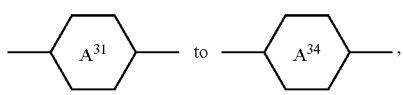

independently of one another, denote

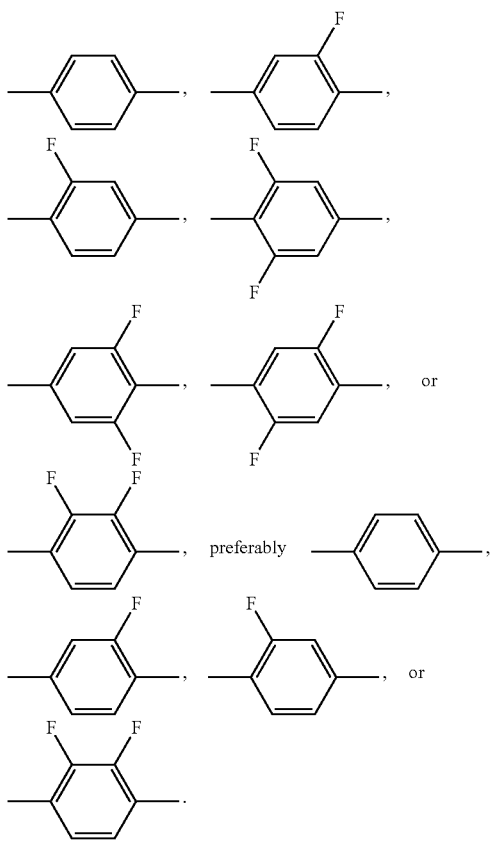

and optionally one or more compounds selected from the group of compounds CC and CP, preferably of CP, more preferably both of CC and of CP,

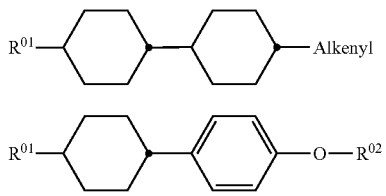

in which

Alkenyl denotes unfluorinated alkenyl having 2 to 15, preferably 1-E alkenyl having 2 to 4, C atoms, more preferably vinyl or 1-E-propenyl, most preferably vinyl, $R^{01}$ denotes unfluorinated alkyl having 1 to 17, preferably having 3 to 10, C atoms or unfluorinated alkenyl having 2 to 15, preferably 3 to 10, C atoms, preferably alkyl having 3 C atoms, and $R^{02}$ denotes unfluorinated alkyl having 1 to 17, preferably having 1 to 5, C atoms or unfluorinated alkenyl having 2 to 15, preferably 3 to 10, C atoms, preferably alkyl having 1 or 2 C atoms, and also optionally one or more compounds of formula P

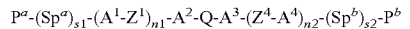

$$P^a\text{-}(Sp^a)_{s1}\text{-}(A^1\text{-}Z^1)_{n1}\text{-}A^2\text{-}Q\text{-}A^3\text{-}(Z^4\text{-}A^4)_{n2}\text{-}(Sp^b)_{s2}\text{-}P^b \qquad P$$

wherein the individual radicals have the following meanings:

$P^a$, $P^b$ each, independently of one another, are a polymerisable group, $Sp^a$, $Sp^b$ each, independently of one another, denote a spacer group, s1, s2 each, independently of one another, denote 0 or 1, n1, n2 each, independently of one another, denote 0 or 1, preferably 0, Q denotes a single bond, —CF$_2$O—, —OCF$_2$—, —CH$_2$O—, —OCH$_2$—, —(CO)O—, —O(CO)—, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —O—, —CH$_2$—, —(CH$_2$)$_3$—, —CF$_2$—, preferably —CF$_2$O—, $Z^1$, $Z^4$ denote a single bond, —CF$_2$O—, —OCF$_2$—, —CH$_2$O—, —OCH$_2$—, —(CO)O—, —O(CO)—, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —O—, —CH$_2$—, —(CH$_2$)$_3$—, —CF$_2$—, where $Z^1$ and Q or $Z^4$ and Q do not simultaneously denote a group selected from —CF$_2$O— and —OCF$_2$—, $A^1$, $A^2$, $A^3$, $A^4$ each, independently of one another, denote a diradical group selected from the following groups:

a) the group consisting of trans-1,4-cyclohexylene, 1,4-cyclohexenylene and 1,4'-bicyclohexylene, in which, in addition, one or more non-adjacent CH$_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

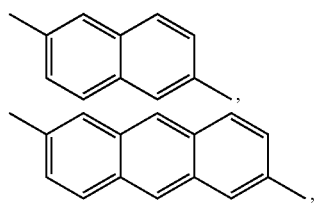

-continued

[chemical structures]

where, in addition, one or more H atoms in these radicals may be replaced by L, and/or one or more double bonds may be replaced by single bonds, and/or one or more CH groups may be replaced by N, and $A^3$, alternatively may be a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^{03}$, $R^{04}$ each, independently of one another, denote H, F or straight-chain or branched alkyl having 1 to 12 C atoms, in which, in addition, one or more H atoms may be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^0$, or denote Cl or CN, and one of the groups $Y^1$ and $Y^2$ alternatively denotes —$OCF_3$, preferably H, F, Cl, CN or $CF_3$, and also optionally one or more chiral compounds/dopants.

The invention further relates to a polymer stabilized system obtainable by polymerisation of one or more compounds of the formula P alone or in combination with one or more further polymerisable compounds from a respective mixture, and to the use of such a stabilized system in components or devices for high frequency technology.

In a first preferred embodiment of the present invention, the liquid-crystalline media in accordance with the present invention comprise comprises one or more compounds of the formula G selected from the group of compounds of formulae G-1 and G-2.

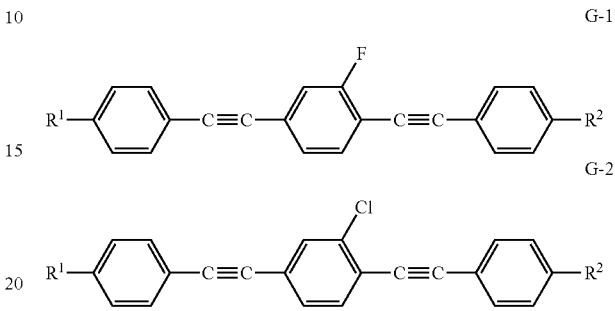

wherein the parameters have the respective meanings given under formula G above.

The chiral compounds of chiral component (A) preferably have a high absolute value of the HTP. They are also referred to as chiral dopants since they are generally added in relatively low concentrations to mesogenic base mixtures. They preferably have good solubility in the achiral component (B). They do not impair the mesogenic or liquid-crystalline properties of the mesogenic medium, or only do so to a small extent, so long as the cholesteric pitch has small values which are much smaller than the wavelength of the light. If the cholesteric pitch is in the order of the wavelength of the light, however, they induce a blue phase having a completely different structure to that of the cholesteric phase. If two or more chiral compounds are employed, they may have the same or opposite direction of rotation and the same or opposite temperature dependence of the twist.

Particular preference is given to chiral compounds having an HTP of 20 $\mu m^{-1}$ or more, in particular of 40 $\mu m^{-1}$ or more, particularly preferably of 70 $\mu m^{-1}$ or more, in the commercial liquid-crystal mixture MLC-6828 from Merck KGaA.

In a preferred embodiment of the present invention, the chiral component (A) consists of two or more chiral compounds which all have the same sign of the HTP.

The temperature dependence of the HTP of the individual compounds may be high or low. The temperature dependence of the pitch of the medium can be compensated by mixing compounds having different temperature dependence of the HTP in corresponding ratios.

For the optically active component, a multiplicity of chiral dopants, some of which are commercially available, is available to the person skilled in the art, such as, for example, cholesteryl nonanoate, R/S-811, R/S-1011, R/S-2011, R/S-3011, R/S-4011, B(OC)2C*H—C-3 or CB15 (all Merck KGaA, Darmstadt).

Particularly suitable dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Chiral compounds preferably used according to the present invention are selected from the group consisting of the formulae shown below.

Particular preference is given to dopants selected from the group consisting of compounds of the following formulae A-I to A-III:

in which $R^{a11}$ and $R^{a12}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl, $R^{a21}$ and $R^{a22}$, independently of one another, are alkyl or alkoxy having from 1 to 9, preferably up to 7, carbon atoms, oxaalkyl, alkenyl or alkenyloxy having from 2 to 9, preferably up to 7, carbon atoms, preferably both are alkyl, preferably n-alkyl, $R^{a31}$ and $R^{a32}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl.

Particular preference is given to dopants selected from the group consisting of the compounds of the following formulae:

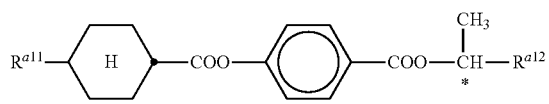

A-I

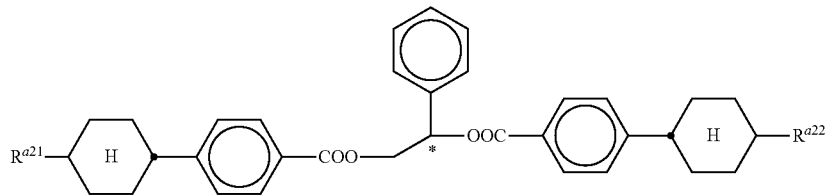

A-II

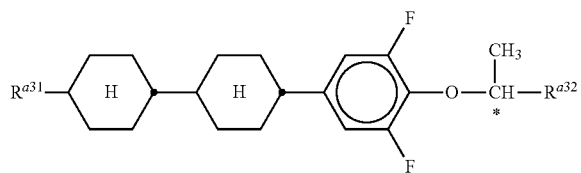

A-III

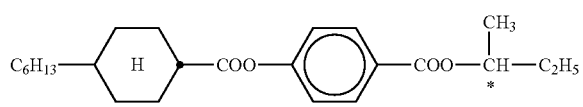 A-I-1

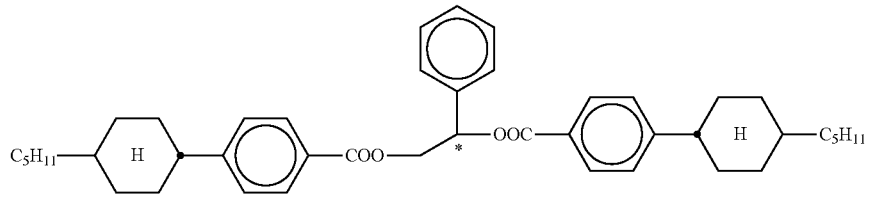 A-II-1

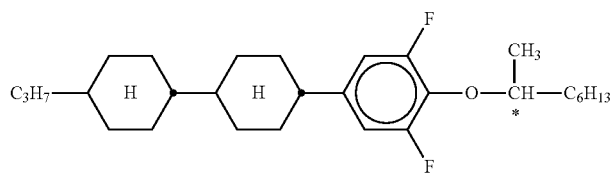 A-III-1

Further preferred dopants are derivatives of the isosorbide, isomannitol or isoiditol of the following formula A-IV:

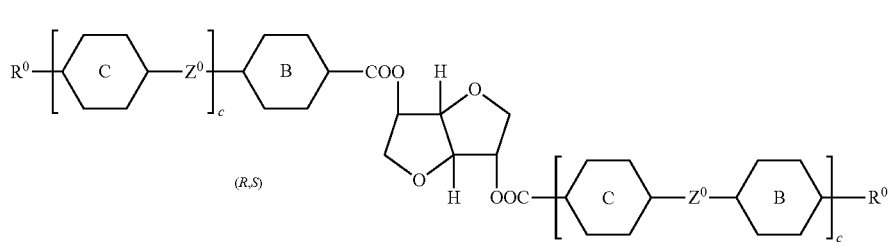 A-IV in which the group

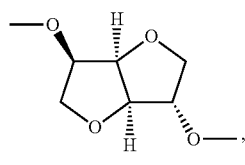
(dianhydrosorbitol)

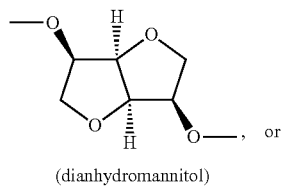
(dianhydromannitol) or

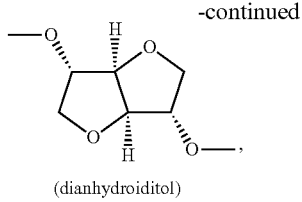
(dianhydroiditol)

preferably dianhydrosorbitol, and chiral ethanediols, such as, for example, diphenylethanediol (hydrobenzoin), in particular mesogenic hydrobenzoin derivatives of the following formula A-V:

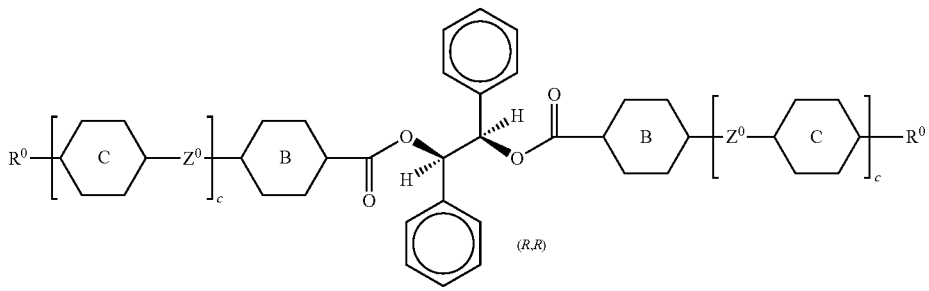

A-V including the (R,S), (S,R), (R,R) and (S,S) enantiomers, which are not shown,
in which

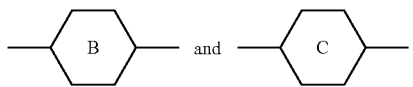

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1-12 carbon atoms.

The compounds of the formula A-IV are described in WO 98/00428. The compounds of the formula A-V are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

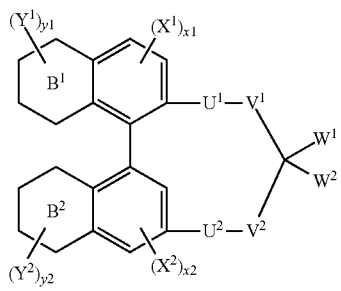

A-VI in which
$X^1$, $X^2$, $Y^1$ and $Y^2$ are each, independently of one another, F, Cl, Br, I, CN, SCN, SF$_5$, straight-chain or branched alkyl having from 1 to 25 carbon atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may be replaced by N atoms and one or more non-adjacent CH$_2$ groups may be replaced by O and/or S, $W^1$ and $W^2$ are each, independently of one another, —$Z^1$-$A^1$-($Z^2$-$A^2$)$_m$-R, and one of the two is alternatively $R^1$ or $A^3$, but both are not simultaneously H, or

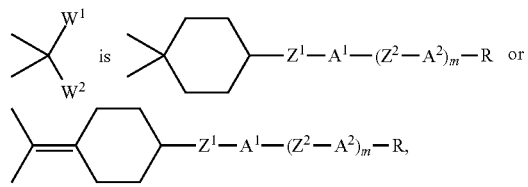

$U^1$ and $U^2$ are each, independently of one another, CH$_2$, O, S, CO or CS, $V^1$ and $V^2$ are each, independently of one another, (CH$_2$)$_n$, in which from one to four non-adjacent CH$_2$ groups may be replaced by O and/or S, and one of $V^1$ and $V^2$ and, in the case where

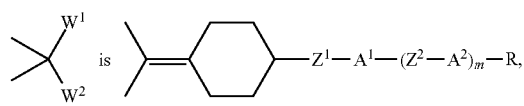

both are a single bond, $Z^1$ and $Z^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—

CH₂—, —CF₂—CH₂—, —CH₂—CF₂—, —CF₂—CF₂—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, A¹, A² and A³ are each, independently of one another, 1,4-phenylene, in which one or two non-adjacent CH groups may be replaced by N, 1,4-cyclohexylene, in which one or two non-adjacent CH₂ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition A¹ is a single bond, L is a halogen atom, preferably F, CN, NO₂, alkyl, alkoxy, alkylcarbonyl, alkoxycarbonyl or alkoxycarbonyloxy having 1-7 carbon atoms, in which one or more H atoms may be replaced by F or Cl, m is in each case, independently, 0, 1, 2 or 3, and R and R¹ are each, independently of one another, H, F, Cl, Br, I, CN, SCN, SF₅, straight-chain or branched alkyl having from 1 or 3 to 25 carbon atoms respectively, which may optionally be monosubstituted or polysubstituted by F, Cl, Br, I or CN, and in which one or more non-adjacent CH₂ groups may be replaced by —O—, —S—, —NH—, —NR⁰—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

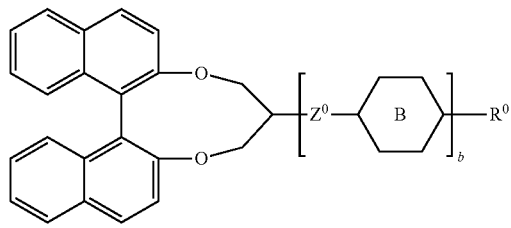

A-VI-1 in particular those selected from the following formulae A-VI-1a to A-VI-1c:

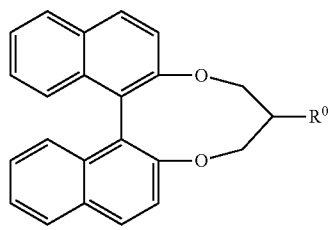

A-VI-1a

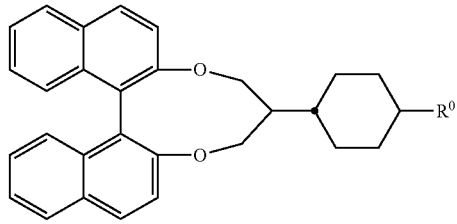

A-VI-1b

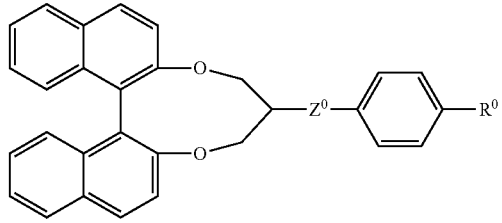

A-VI-1c in which ring B and Z° are as defined for the formula A-IV, and

R⁰ as defined for formula A-IV or H or alkyl having from 1 to 4 carbon atoms, and b is 0, 1 or 2, and Z° is, in particular, —OC(O)— or a single bond.

Particular p reference is furthermore given to chiral binaphthyl derivatives of the formula A-VI-2

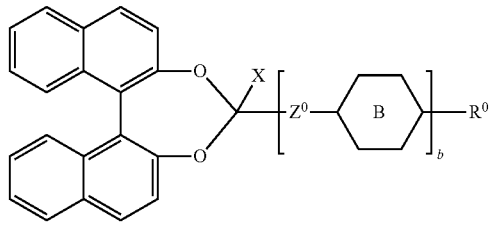

A-VI-2 in particular those selected from the following formulae A-VI-2a to A-VI-2f:

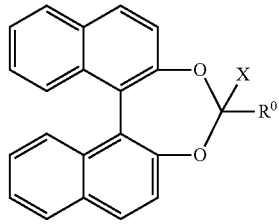

A-VI-2a

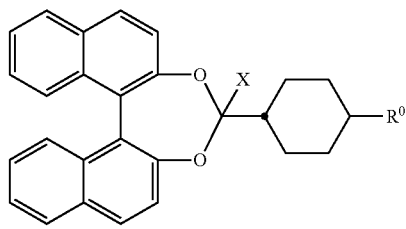

A-VI-2b

A-VI-2c
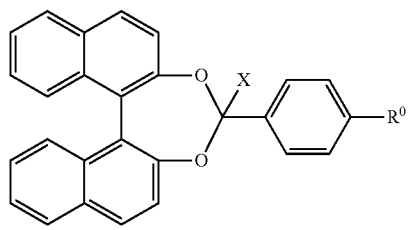
A-VI-2e
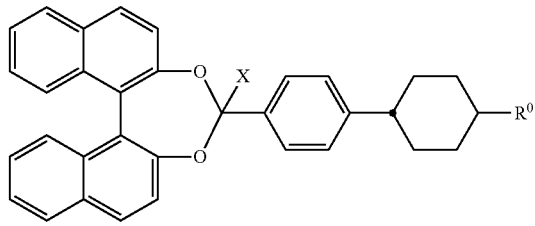
A-VI-2f
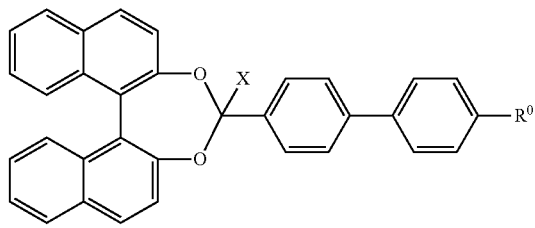
A-VI-2d
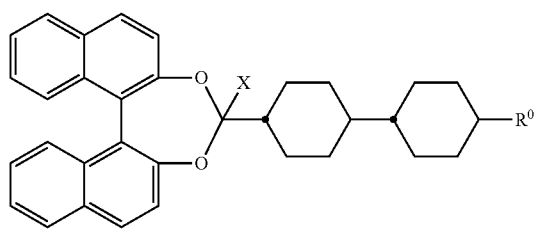
in which R⁰ is as defined for the formula A-VI, and X is H, F, Cl, CN or $R^0$, preferably F.
Polymerisable compounds of formula P preferably used according to the present invention are selected from the group consisting of the following formulae:
P1-1
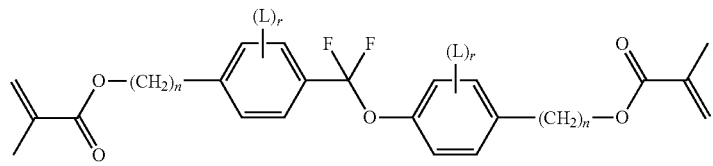
P1-2
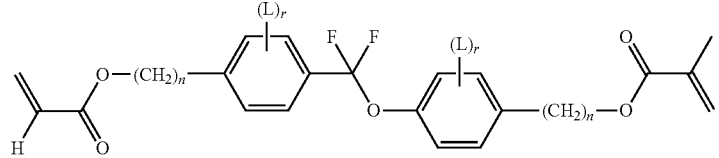
P1-3
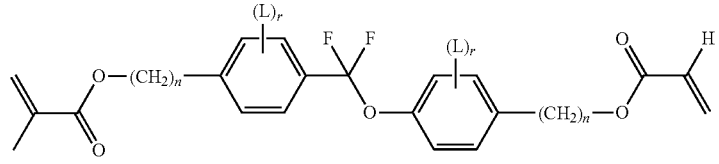
P1-4
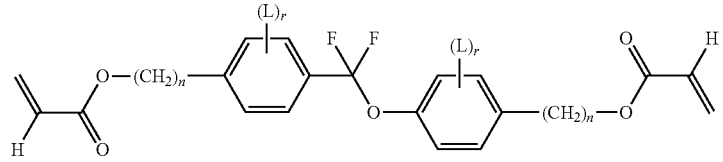
P2-1
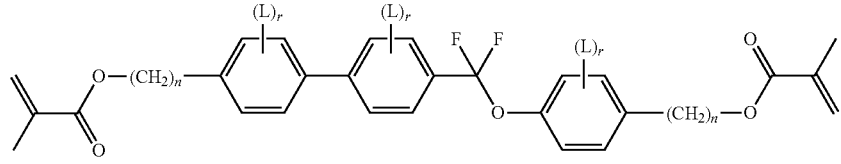

-continued
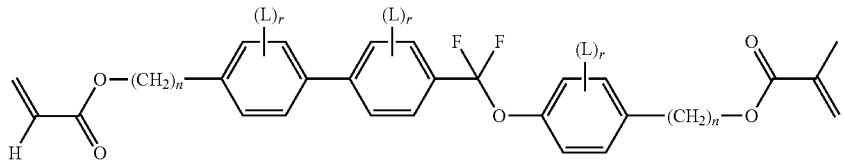 P2-2
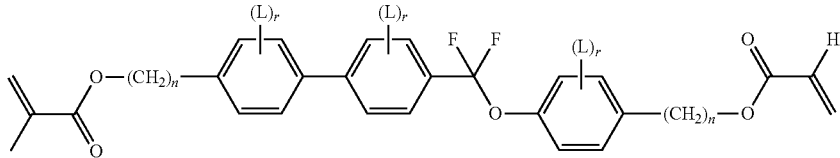 P2-3
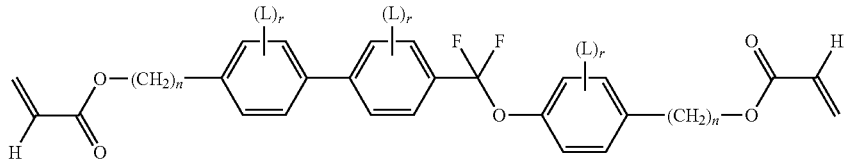 P2-4
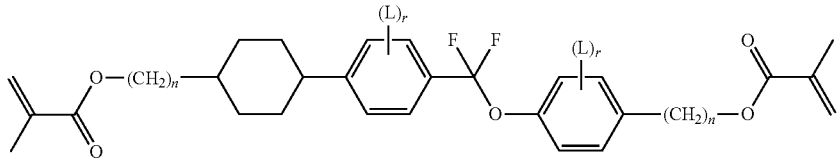 P3-1
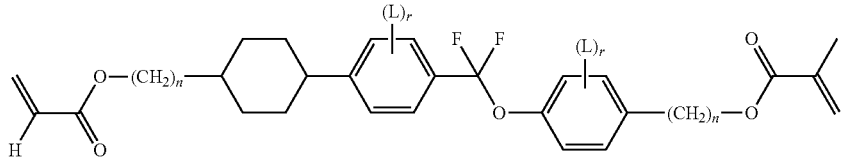 P3-2
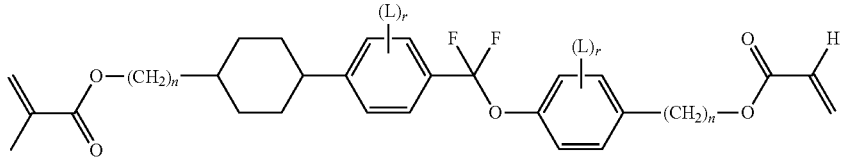 P3-3
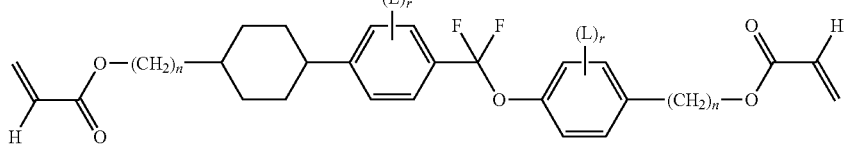 P3-4
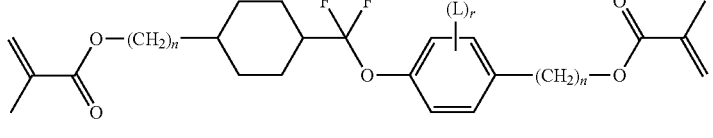 P4-1
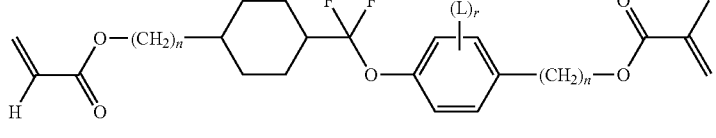 P4-2

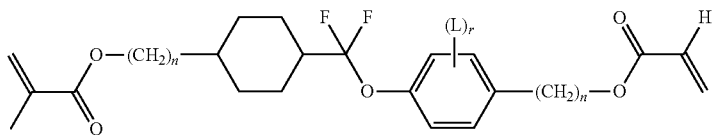
P4-3
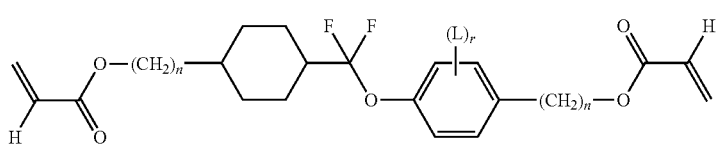
P4-4
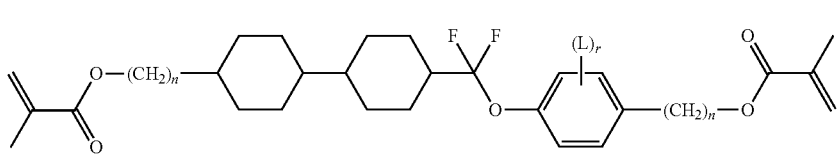
P5-1
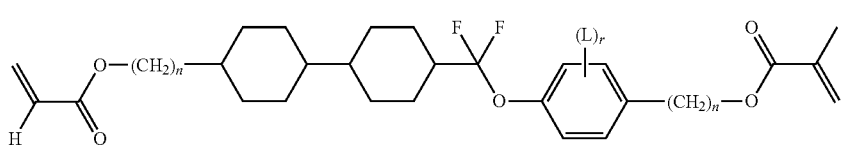
P5-2
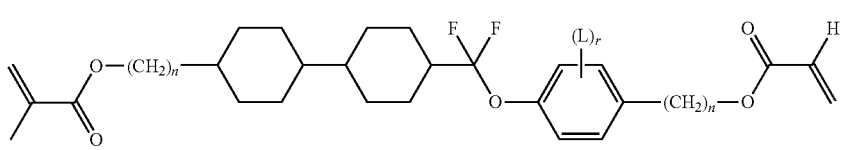
P5-3
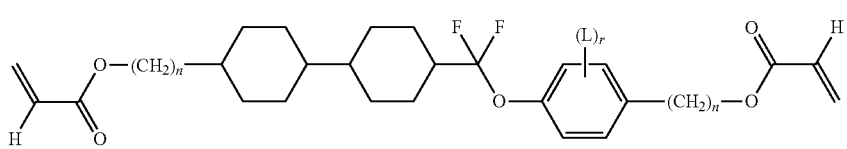
P5-4
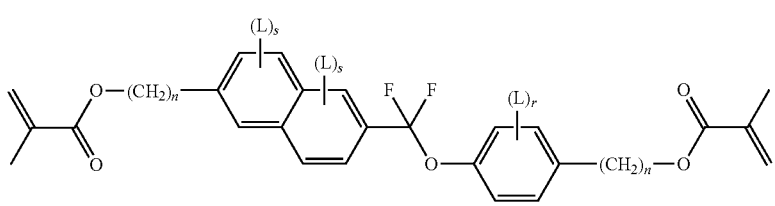
P6-1
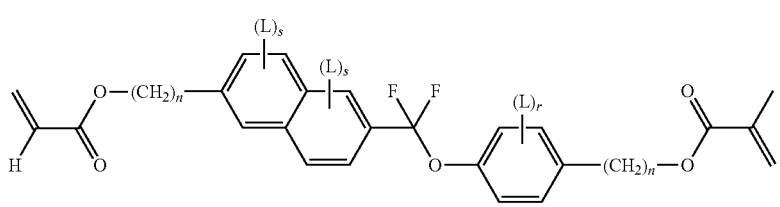
P6-2
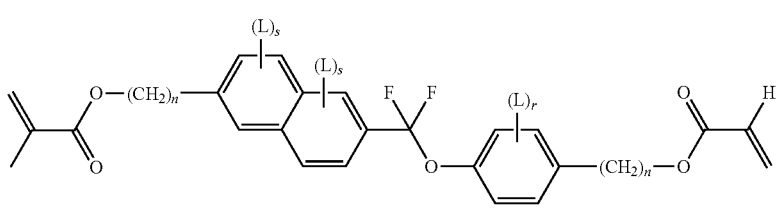
P6-3

P6-4
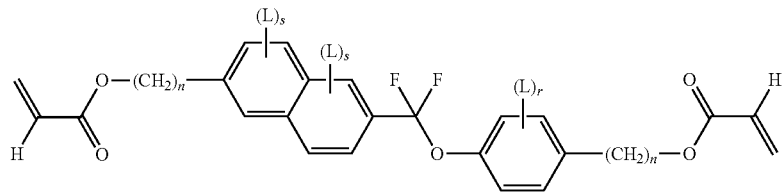
P7-1
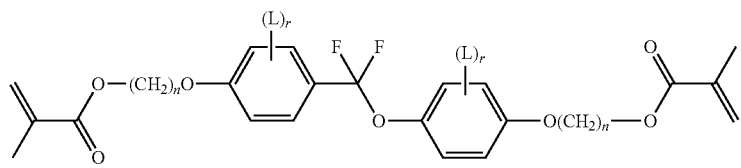
P7-2
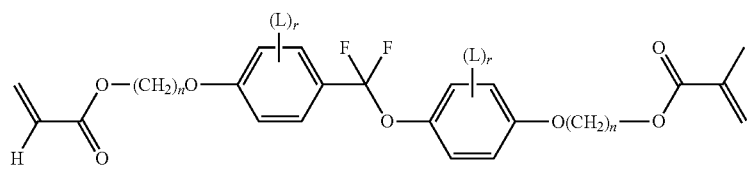
P7-3
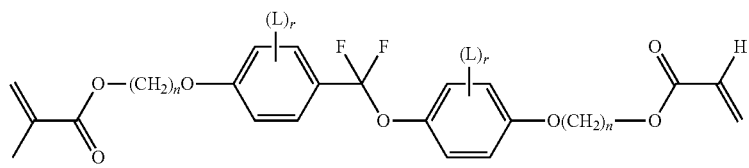
P7-4
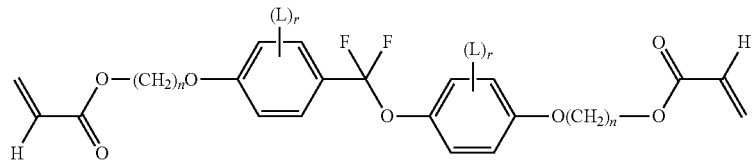
P8-1
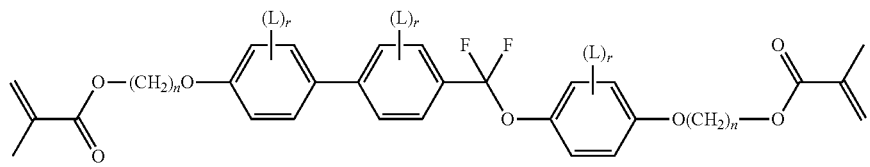
P8-2
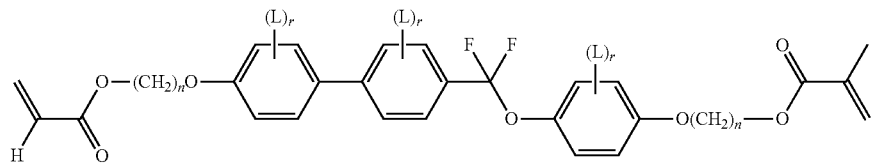
P8-3
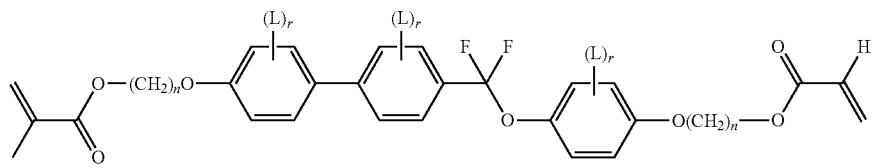
P8-4
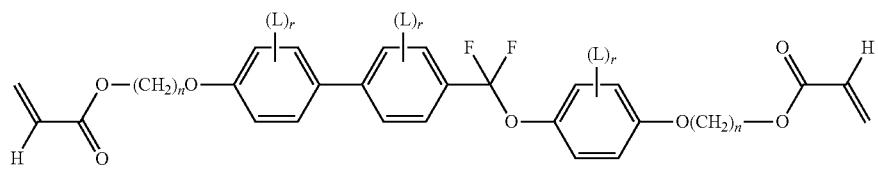

-continued
P9-1
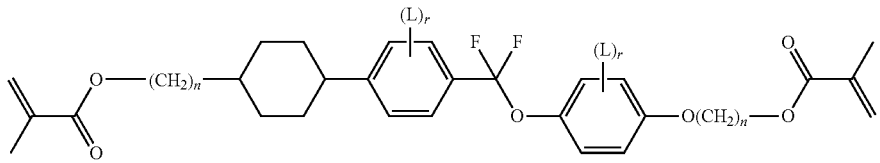
P9-2
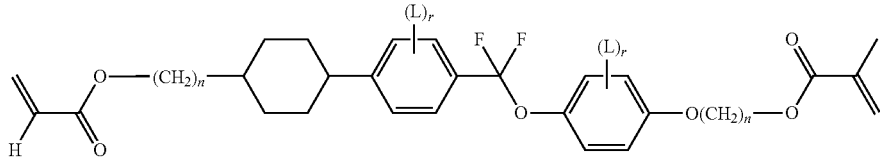
P9-3
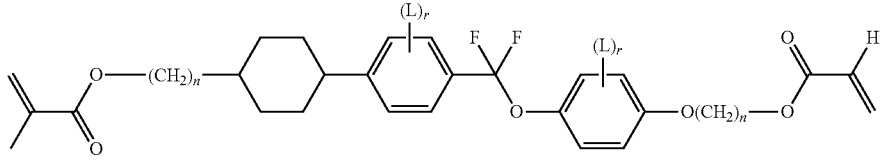
P9-4
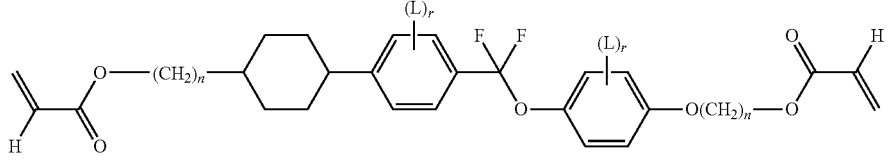
P10-1
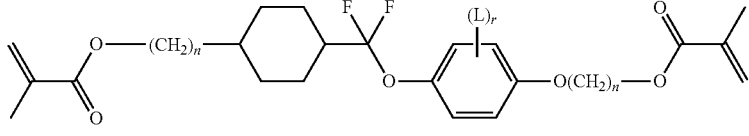
P10-2
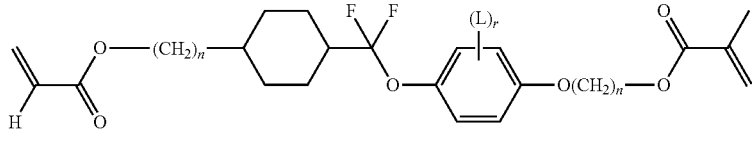
P10-3
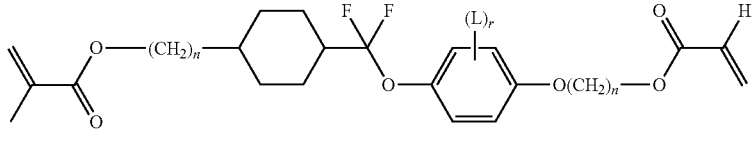
P10-4
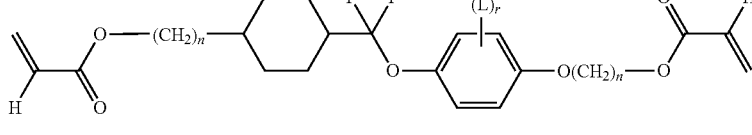
P11-1
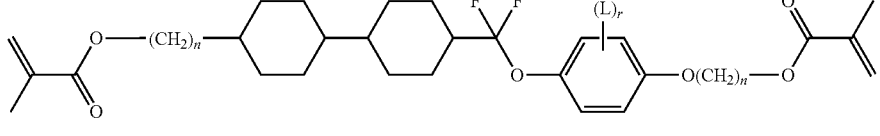
P11-2
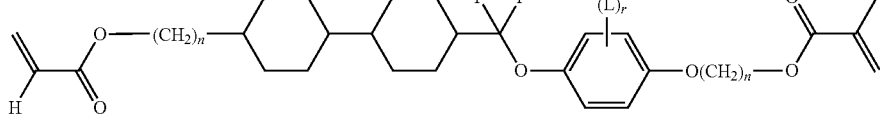

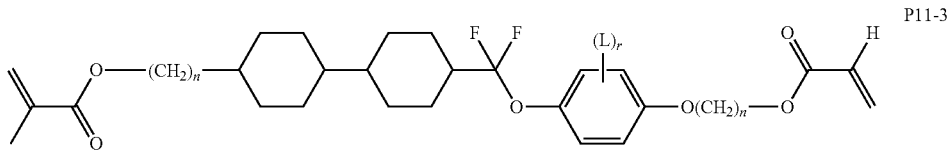

P11-3

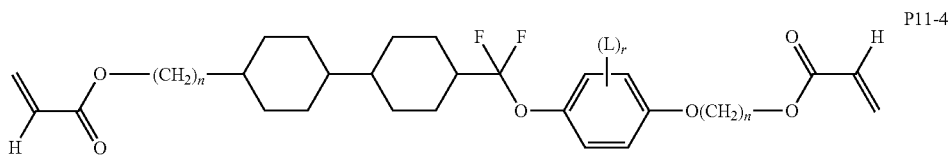

P11-4

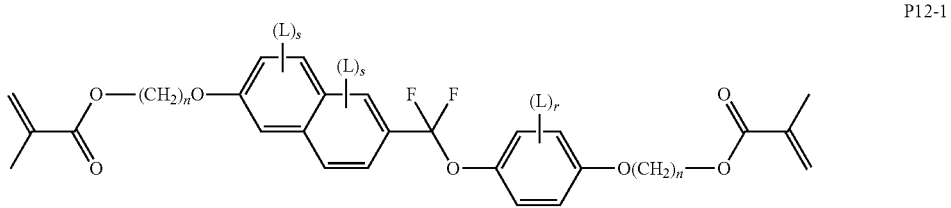

P12-1

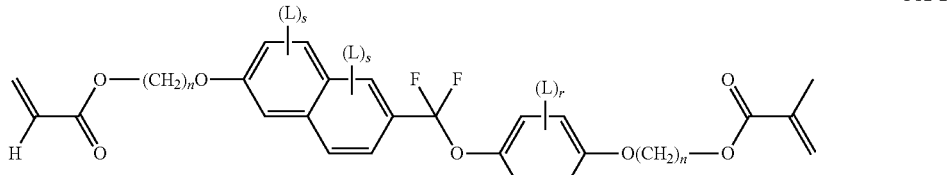

P12-2

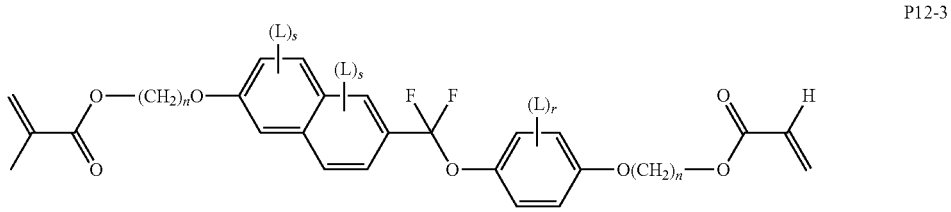

P12-3

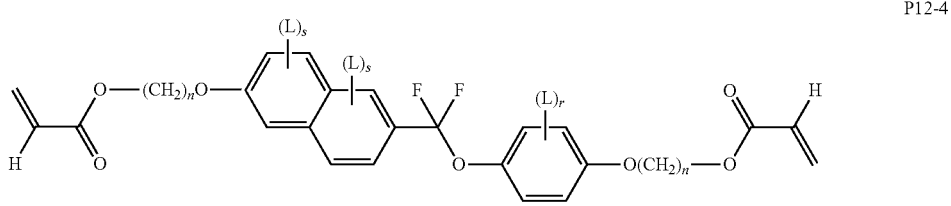

P12-4 in which L in each occurrence, identically or differently, has one of the meanings indicated above and below, r denotes 0, 1, 2, 3 or 4, s denotes 0, 1, 2 or 3, and n denotes an integer between 1 and 24, preferably between 1 and 12, very particularly preferably between 2 and 8, and in which, if a radical is not indicated at the end of a single or double bond, it is a terminal $CH_3$ or $CH_2$ group.

In the formulae P1 to P24,

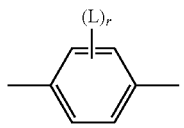

preferably denotes a group selected from the group consisting of the following formulae:

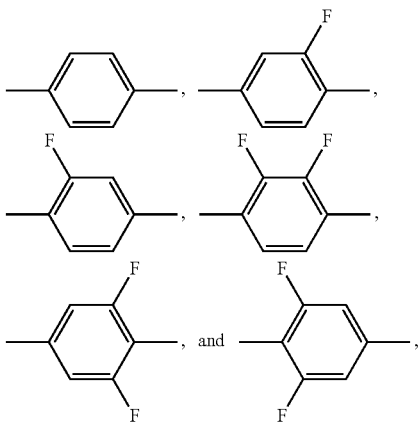

particularly preferably selected from

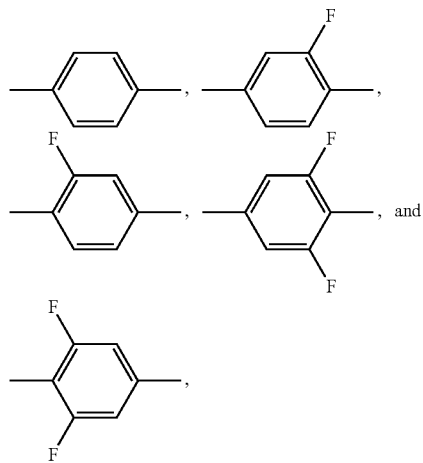

The group A²-Q-A³ preferably denotes a group of the formula

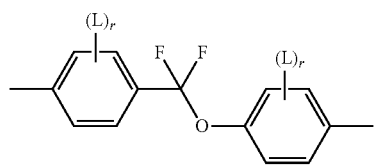

in which at least one of the rings is substituted by at least one group L=F. r here is in each case, independently, preferably 0, 1 or 2.

$P^a$ and $P^b$ in the compounds of the formula P and the sub-formulae thereof preferably denote acrylate or methacrylate, furthermore fluoroacrylate.

$Sp^a$ and $Sp^b$ in the compounds of the formula I and the sub-formulae thereof preferably denote a radical selected from the group consisting of —(CH$_2$)$_{p1}$—, —(CH$_2$)$_{p1}$—O—, —(CH$_2$)$_{p1}$—O—CO— and —(CH$_2$)$_{p1}$—O—CO—O— and mirror images thereof, in which p1 denotes an integer from 1 to 12, preferably from 1 to 6, particularly preferably 1, 2 or 3, where these groups are linked to $P^a$ or $P^b$ in such a way that O atoms are not directly adjacent.

Of the compounds of the formula P, particular preference is given to those in which
the radicals $P^a$ and $P^b$ are selected from the group consisting of vinyloxy, acrylate, methacrylate, fluoroacrylate, chloroacrylate, oxetane and epoxide groups, particularly preferably acrylate or methacrylate groups,
the radicals $Sp^a$ and $Sp^b$ are selected from the group consisting of —(CH$_2$)$_{p1}$—, —(CH$_2$)$_{p1}$—O—, —(CH$_2$)$_{p1}$—O—CO— and —(CH$_2$)$_{p1}$—O—CO—O— and mirror images thereof, in which p1 denotes an integer from 1 to 12, preferably from 1 to 6, particularly preferably 1, 2 or 3, and where these radicals are linked to $P^a$ or $P^b$ in such a way that O atoms are not directly adjacent, Compounds of formula P preferably used according to a preferred embodiment of the instant invention are those comprising exactly two rings (n1=n2=0), which are preferably 6-membered rings. Especially preferred are compounds selected from the group of compounds of the following formulae:

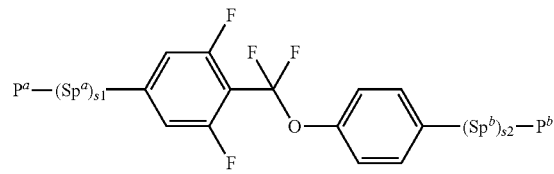
Pa

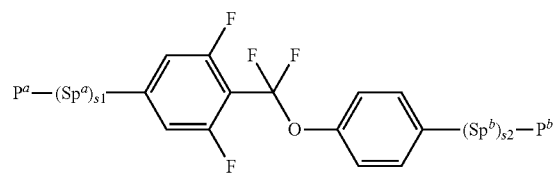
Pb

Pc

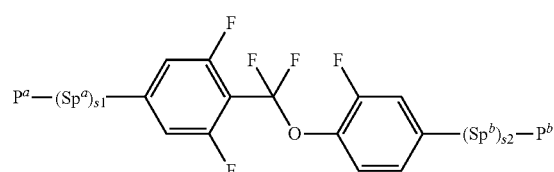
Pd

Pe

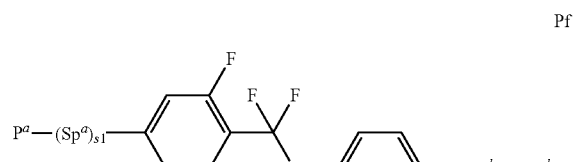
Pf

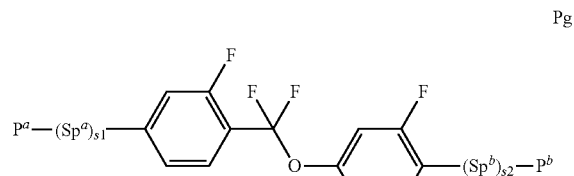
Pg

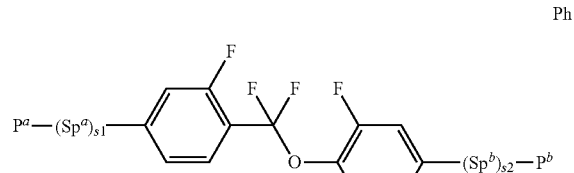
Ph

Pi
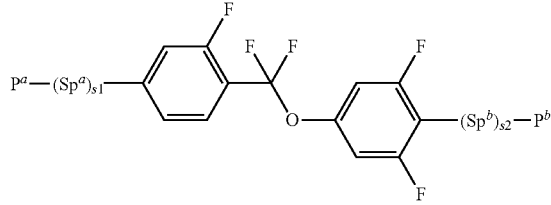

Pk
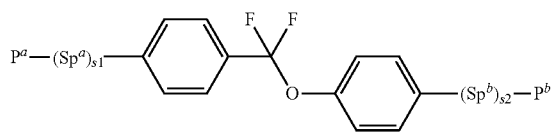

Pl
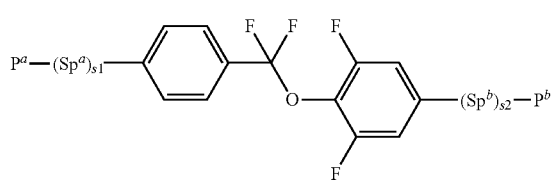

Pm
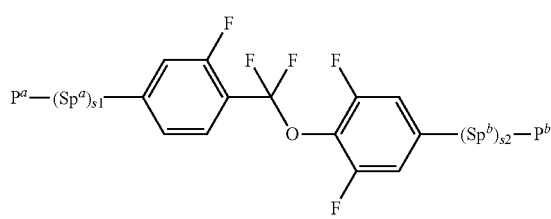

Pn
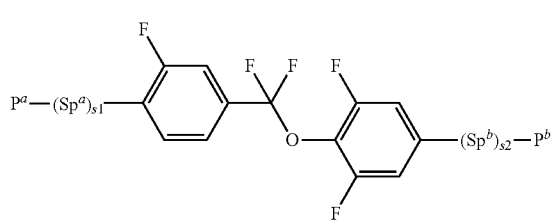

Po
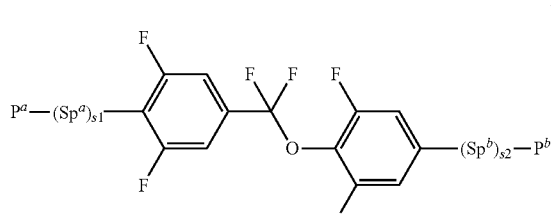

Pp
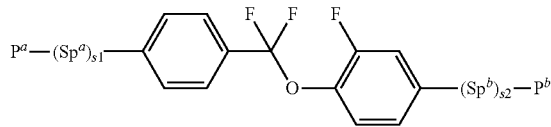

Pq
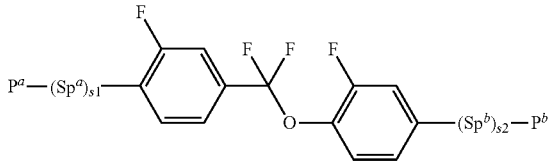

Pr
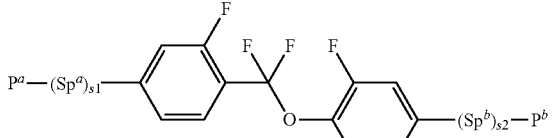

Ps
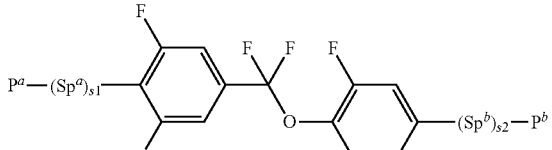

wherein $P^a$, $P^b$, $Sp^a$, $Sp^b$, s1 and s2 are as Defined Under Formula P Above, and preferably $Sp^{a/b}$ is alkylene —$(CH_2)_n$— wherein n preferably is 3, 4, 5, 6 or 7 and $P^{a/b}$ preferably a methacrylate- or acrylate moiety. Especially preferred is the use of compounds selected from the group of formulae Pa, Pb, Pc, Pd, Pe, Pf, Pg, Ph and Pi and, in particular the compounds of formula Pa.

Suitable and preferred co-monomers for use in polymer precursors for polymer stabilised devices according to the present invention are selected, for example, from the following formulae:

M1
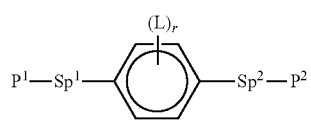

M2
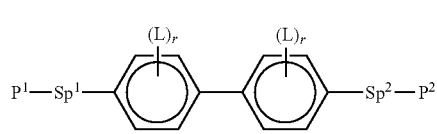

M3
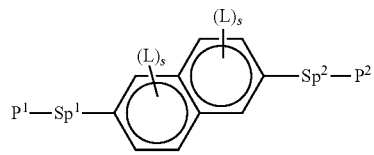

M4
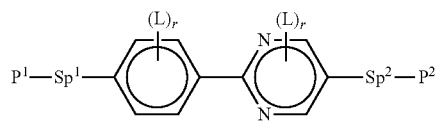

M5
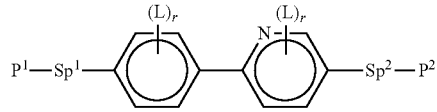

-continued

M6–M15, M16–M27: chemical structure diagrams

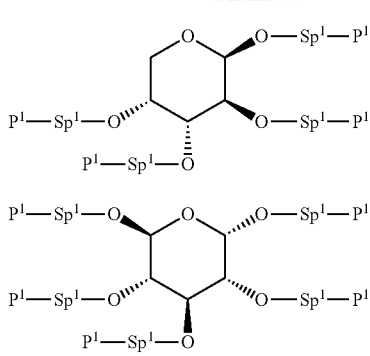

M28

M29 wherein the parameters have the following meanings:
P¹ and P² each, independently of one another, a polymerisable group, preferably having one of the meanings given above or below for $P^a$, particularly preferred an acrylate, methacrylate, fluoroacrylate, oxetane, vinyloxy- or epoxy group, $Sp^1$ and $Sp^2$ each, independently of one another, a single bond or a spacer group, preferably having one of the meanings given above or below for $Sp^a$, particularly preferred an —(CH$_2$)$_{p1}$—, —(CH$_2$)$_{p1}$—O—, —(CH$_2$)$_{p1}$—CO—O— or —(CH$_2$)$_{p1}$—O—CO—O—, wherein p1 is an integer from 1 to 12, and wherein the groups mentioned last are linked to the adjacent ring via the O-atom, and, wherein alternatively also one or more of P¹-Sp¹- and P²—Sp²- may be $R^{aa}$, provided that at least one of P¹-Sp¹- and P²-Sp²- present in the compound is not $R^{aa}$, $R^{aa}$ H, F, Cl, CN or linear or branched alkyl having 1 to 25 C-atoms, wherein one or more non-adjacent —CH$_2$— groups, independently of each another, may be replaced by —C(R⁰)=C(R⁰⁰)—, —C≡C—, —N(R⁰)—, —O—, —S—, —CO—, —CO—O—, —O—CO—, —O—CO—O— in such a way that neither O- nor S-atoms are directly linked to one another, and wherein also one or more H-atoms may be replaced by F, Cl, CN or P¹-Sp¹-, particularly preferred linear or branched, optionally single- or polyfluorinated, alkyl, alkoxy, alkenyl, alkinyl, alkylcarbonyl, alkoxycarbonyl, or alkylcarbonyloxy having 1 to 12 C-atoms, wherein the alkenyl- and alkinyl groups have at least two and the branched groups have at least three C-atoms, R⁰, R⁰⁰ each, at each occurrence independently of one another, H or alkyl having 1 to 12 C-atoms, $R^y$ and $R^z$ each, independently of one another, H, F, CH$_3$ or CF$_3$, Z¹ —O—, —CO—, —C(R$^y$R$^z$)—, or —CF$_2$CF$_2$—, Z² and Z³ each, independently of one another, —CO—O—, —O—CO—, —CH$_2$O—, —OCH$_2$—, —CF$_2$O—, —OCF$_2$—, or —(CH$_2$)$_n$—, wherein n is 2, 3 or 4, L at each occurrence independently of one another, F, Cl, CN, SCN, SF$_5$ or linear or branched, optionally mono- or polyfluorinated, alkyl, alkoxy, alkenyl, alkinyl, alkylcarbonyl, alkoxycarbonyl, alkylcarbonyloxy or alkoxycarbonyloxy having 1 to 12 C-atoms, preferably F, L' and L" each, independently of one another, H, F or Cl, r 0, 1, 2, 3 or 4, s 0, 1, 2 or 3, t 0, 1 or 2, and x 0 or 1.

Suitable and preferred co-monomers for use in devices according to the present application operable and/or operating at a temperature where the mesogenic medium is in the blue are for example selected from the group of mono-reactive compounds, which are present in the precursor of the polymer stabilised systems in a concentration in the range from 1 to 9 wt.-%, particularly preferred from 4 to 7 wt.-%. Preferred mono-reactive compounds are the compounds of formulae M1 to M29, wherein one or more of P¹-Sp¹- and P²-Sp²- are Rest $R^{aa}$, such that the compounds have a single reactive group only.

Particularly preferred mono-reactive compounds are the compounds of the following formulae

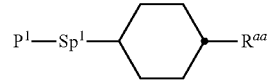

M16-A

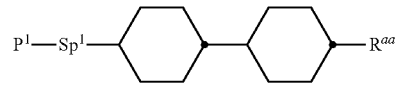

M17-A wherein P¹, Sp¹ and $R^{aa}$ have the respective meanings given above and P¹ preferably is acrylate (CH$_2$=CH—CO—O—) or methacrylate (CH$_2$=C(CH$_3$)—CO—O—).

Amongst these the compounds of the formula

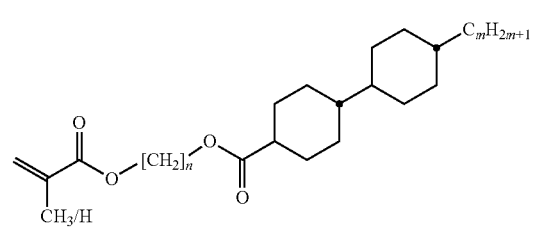

M17-A' wherein
n is an integer, preferably an even integer, in the range from 1 to 16, preferably from 2 to 8,
m is an integer in the range from 1 to 15, preferably from 2 to 7, are especially preferred.

Particular preference is given to an LC medium, an LC device, preferably for the high frequency technology, in particular for a phase shifter or a microwave antenna, e.g. a leaky antenna, a process or the use as described above and below, in which the LC medium or the polymerisable or polymerised component present therein comprises one or more compounds of the following formula:

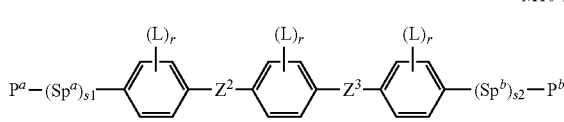

M10-A in which $P^a$, $P^b$, $Sp^a$, $Sp^b$, s1, s2 and L have the meanings indicated above and below, r denotes 0, 1, 2, 3 or 4, and Z² and Z³ each, independently of one another, denote —CF$_2$—O— or —O—CF$_2$—, preferably Z² is —CF$_2$—O— and Z³ is —O—CF$_2$— or vice versa or Z² is —CO—O— and Z³ is —O—CO— or vice versa, and, most preferably, Z² is —CF$_2$—O— and Z³ is —O—CF$_2$— or Z² is —CO—O— and Z³ is —O—CO—.

Preferably the liquid-crystalline media used according to the present invention comprise as a polymer precursor or part of a polymer precursor one, two or more reactive mesogens, preferably one or more mono-reactive mesogens and, at the same time, one or more direactive mesogens. Optionally one or more of the reactive mesogens may be replaced by a non-mesogenic, or an isotropic, reactive compound, preferably selected from HDMA, HDDMA, EHA, EA, EMA and the like.

In a preferred embodiment of the instant application the liquid-crystalline media used according to the present invention comprise a polymer obtained or obtainable by polymerisation, preferably photopolymerisation of a polymer precursor comprising one, two or more reactive mesogens, preferably one or more mono-reactive mesogens and, at the same time, one or more direactive mesogens. Optionally one or more of the reactive mesogens may be replaced by a non-mesogenic, or isotropic, reactive compound, preferably selected from 2-ethylhexyl acrylate (EHA), 1,3,3-trimethylhexyl acrylate (TMHA), hexanol diacrylate (HDDA), hexanol dimethacrylate (HDDMA), and the like, but also from methyl methacrylate (MMA), ethyl acrylate (EA), ethyl methacrylate (EMA) and 6-(4'-cyanobiphenyl-4-yloxy) hexyl acrylate (6CBA), a mesogenic monomer.

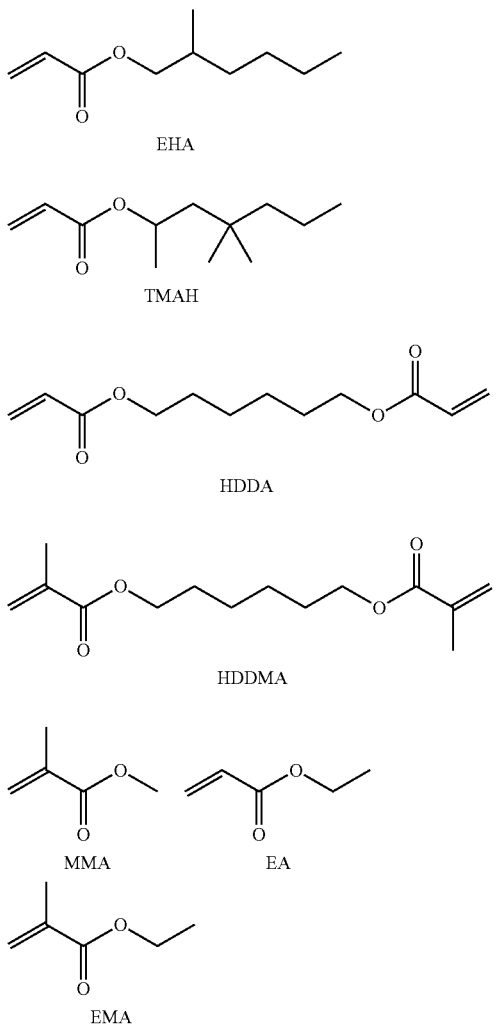

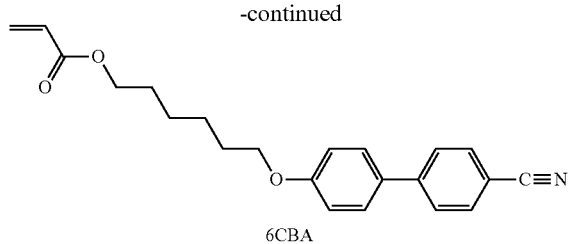

Preferably one or more, most preferably all, mono-reactive mesogens are methacrylates and, also preferably one or more, most preferably all, mono-reactive mesogens are selected from the group of the bisacrylates and the mixed acrylates-methacrylates, preferably they are bisacrylates.

Preferably the liquid-crystalline media according to the present invention comprise
one or more compounds of the formula G, preferably of the formula G-1 or the formula G-2 and most preferably one or more compounds of the formula G-1 and one or more compounds of the formula G-2,
and preferably
one or more compounds of the formula CC,
or
one or more compounds of the formula CP,
or
one or more compounds of the formula CC and
one or more compounds of the formula CP,
and besides these compounds, preferably
one or more compounds of the formula I and
one or more compounds of the formula II
or
one or more compounds of the formula I and
one or more compounds of the formula III
or
one or more compounds of the formula II and
one or more compounds of the formula III
or, most preferably,
one or more compounds of the formula I and
one or more compounds of the formula II and
one or more compounds of the formula III.

In a preferred embodiment of the present invention, the liquid-crystalline media comprise one or more compounds of the formula I and one or more compounds of the formula III.

In a further preferred embodiment of the present invention, the liquid-crystalline media comprise one or more compounds of the formula I and one or more compounds of the formula II.

The liquid-crystalline media in accordance with the present invention likewise preferably comprise one or more compounds of the formula II and one or more compounds of the formula III.

Particular preference is given in accordance with the present invention to liquid-crystalline media which comprise one or more compounds of the formula I, one or more compounds of the formula II and one or more compounds of the formula III.

Additionally the liquid-crystalline media used according to the present invention comprise one or more compounds of the formula IV,

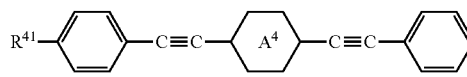

wherein

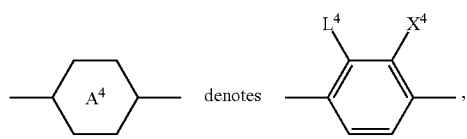

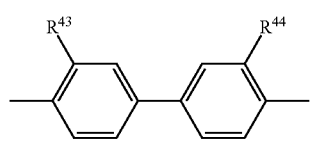

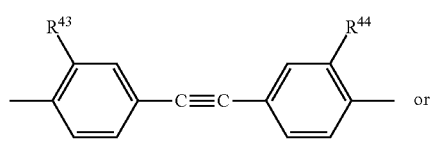

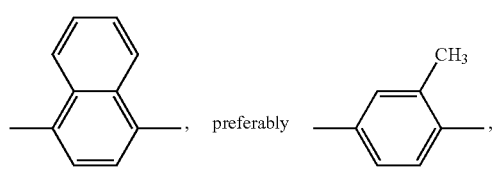

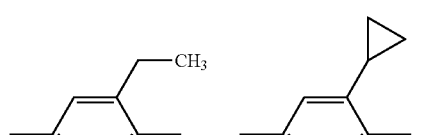

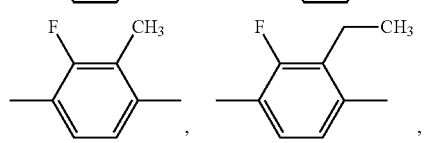

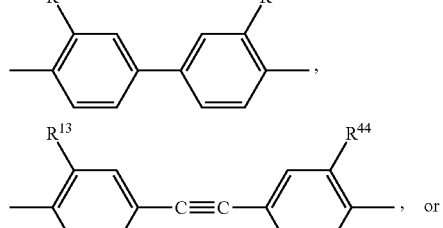

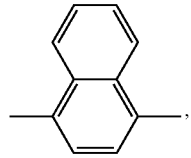

particularly preferably

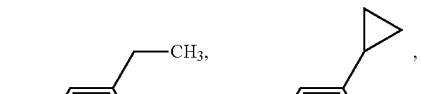

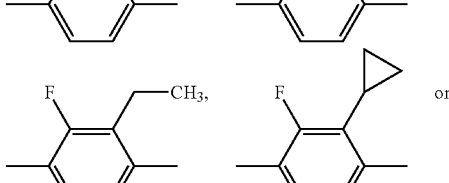

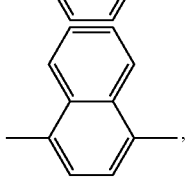

and wherein $L^4$ denotes alkyl having 1 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclohexyl, cyclopent-1-enyl or cyclohex-1-enyl, and particularly preferably $CH_3$, $C_2H_5$, cyclopropyl or cyclobutyl, $X^4$ denotes H, alkyl having 1 to 3 C atoms or halogen, preferably H, F or Cl, and particularly preferably H or F and very particularly preferably F, $R^{41}$ to $R^{44}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, each having up to 15 C atoms, and alternatively one of $R^{43}$ and $R^{44}$ or both also denote H, preferably $R^{41}$ and $R^{42}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably $R^{41}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably $R^{42}$ denotes unfluorinated alkyl or unfluorinated alkoxy, each having 1 to 7 C atoms, and preferably $R^{43}$ and $R^{44}$ denote H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl or cyclohexyl, and very particularly preferably at least one of $R^{43}$ and $R^{44}$ denotes n-alkyl, particularly preferably methyl, ethyl or n-propyl, and the other denotes H or n-alkyl, particularly preferably H, methyl, ethyl or n-propyl.

Preferably the liquid crystal media contain one or more chiral dopants preferably having an absolute value of the helical twisting power (HTP) of 20 µm$^{-1}$ or more, preferably of 40 µm$^{-1}$ or more, more preferably in the range of 60 µm$^{-1}$ or more, most preferably in the range of 80 µm$^{-1}$ or more to 260 µm$^{-1}$ or less.

The liquid-crystalline media in accordance with the present application preferably comprise in total 15% to 90%, preferably 20% to 85% and particularly preferably 25% to 80%, of compounds of the formula I. The liquid-crystalline media in accordance with the present application preferably comprise in total 1% to 70%, preferably 2% to 65% and particularly preferably 3% to 60%, of compounds of the formula II.

The liquid-crystalline media in accordance with the present application preferably comprise in total 0% to 60%, preferably 5% to 55% and particularly preferably 10% to 50%, of compounds of the formula III.

In a preferred embodiment of the present invention, in which the liquid-crystalline media comprise in each case one or more compounds of the formulae I, II and III, the concentration of the compounds of the formula I is preferably 45% to 75%, preferably 50% to 70% and particularly preferably 55% to 65%, the concentration of the compounds of the formula II is preferably 1% to 20%, preferably 2% to 15% and particularly preferably 3% to 10%, and the concentration of the compounds of the formula III is preferably 1% to 30%, preferably 5% to 25% and particularly preferably 5% to 20%.

In a further preferred embodiment of the present invention, in which the liquid-crystalline media comprise in each case one or more compounds of the formulae I, II and III, the concentration of the compounds of the formula I is preferably 15% to 40%, preferably 20% to 35% and particularly preferably 25% to 30%, the concentration of the compounds of the formula II is preferably 10% to 35%, preferably 15% to 30% and particularly preferably 20% to 25% and the concentration of the compounds of the formula III is preferably 25% to 50%, preferably 30% to 45% and particularly preferably 35% to 40%

In a preferred embodiment of the present invention, in which the liquid-crystalline media comprise in each case one or more compounds of the formulae I and II, but at most 5% and preferably no compounds of the formula III, the concentration of the compounds of the formula I is preferably 10% to 50%, preferably 20% to 40% and particularly preferably 25% to 35% the concentration of the compounds of the formula II is preferably 40% to 70% preferably 50% to 65% and particularly preferably 55% to 60%, and the concentration of the compounds of the formula III is preferably 1% to 4%, preferably 1% to 3% and particularly preferably 0%.

The liquid-crystalline media in accordance with the present application particularly preferably comprise in total 50% to 80%, preferably 55% to 75% and particularly preferably 57% to 70% of compounds of the formula I-1 and/or in total 5% to 70% preferably 6% to 50% and particularly preferably 8% to 20% of compounds selected from the group of the compounds of the formulae I-2 and I-3.

The liquid-crystalline media in accordance with the present application likewise preferably comprise in total 5% to 60% preferably 10% to 50% and particularly preferably 7% to 20% of compounds of the formula II.

In the case of the use of a single homologous compound, these limits correspond to the concentration of this homologue, which is preferably 2% to 20% particularly preferably 1% to 15%. In the case of the use of two or more homologues, the concentration of the individual homologues is likewise preferably in each case 1% to 15%

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

In a preferred embodiment of the present invention, the liquid-crystal medium comprises one or more compounds of the formula CC, wherein
Alkenyl denotes vinyl or 1-E-propenyl, most preferably vinyl, and
R$^{01}$ denotes unfluorinated alkyl having 3 to 10, C atoms, preferably 3 to 10, C atoms, most preferably 3 C atoms.

In a preferred embodiment of the present invention, the liquid-crystal medium comprises one or more compounds of the formula CC, wherein
Alkenyl denotes vinyl or 1-E-propenyl, most preferably vinyl, and
R$^{01}$ denotes unfluorinated alkenyl having 2 to 10, C atoms, preferably 2 or 3 C atoms, most preferably vinyl or 1-E-propenyl.

In a preferred embodiment of the present invention, the liquid-crystal medium comprises one or more compounds of the formula CP, wherein
R$^{01}$ denotes unfluorinated alkyl having 1 to 17, preferably having 3 to 10, C atoms or unfluorinated alkenyl having 2 to 15, preferably 3 to 10, C atoms, preferably alkyl having 3 C atoms, and
R$^{02}$ denotes unfluorinated alkyl having 1 to 17, preferably having 1 to 5, C atoms or unfluorinated alkenyl having 2 to 15, preferably 3 to 10, C atoms, preferably alkyl having 1 or 2 C atoms.

In a preferred embodiment of the present invention, the liquid-crystal medium comprises one or more compounds of the formula I, preferably selected from the group of the compounds of the formulae I-1 to I-3, preferably of the formulae I-1 and/or I-2 and/or I-3, preferably of the formulae I-1 and I-2, more preferably these compounds of the formula I predominantly consist, even more preferably essentially consist and very particularly preferably completely consist thereof:

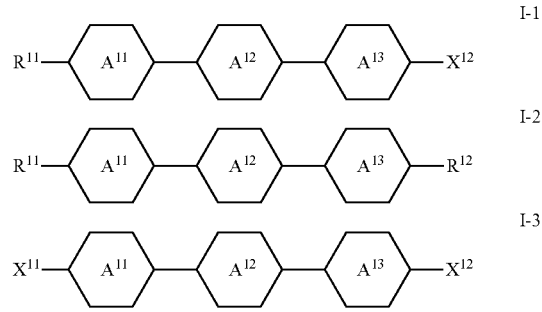

in which the parameters have the respective meanings indicated above for formula I and preferably
R$^{11}$ denotes unfluorinated alkyl having 1 to 7 C atoms or unfluorinated alkenyl having 2 to 7 C atoms,
R$^{12}$ denotes unfluorinated alkyl having 1 to 7 C atoms or unfluorinated alkenyl having 2 to 7 C atoms or unfluorinated alkoxy having 1 to 7 C atoms,
X$^{11}$ and X$^{12}$, independently of one another, denote F, Cl, —OCF$_3$, —CF$_3$, —CN, —NCS or —SF$_5$, preferably F, Cl, —OCF$_3$ or —CN.

The compounds of the formula I-1 are preferably selected from the group of the compounds of the formulae I-1a to I-1d, more preferably these compounds of the formula I-1 predominantly consist, even more preferably essentially consist and very particularly preferably completely consist thereof:

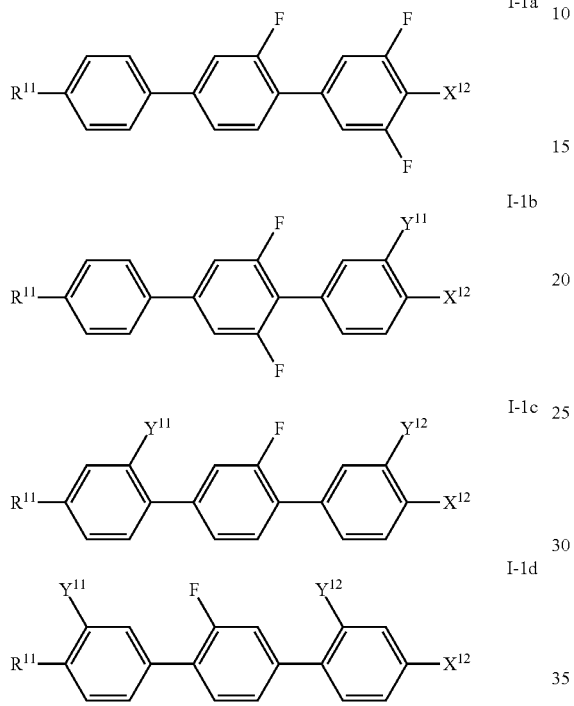

in which the parameters have the respective meanings indicated above for formula I-1 and in which $Y^{11}$ and $Y^{12}$ each, independently of one another, denote H or F, and preferably $R^{11}$ denotes alkyl or alkenyl, and $X^{12}$ denotes F, Cl or —OCF$_3$.

The compounds of the formula I-2 are preferably selected from the group of the compounds of the formulae I-2a to I-2e and/or from the group of the compounds of the formulae I-2f and I-2g, more preferably these compounds of the formula I-2 predominantly consist, even more preferably essentially consist and very particularly preferably completely consist thereof:

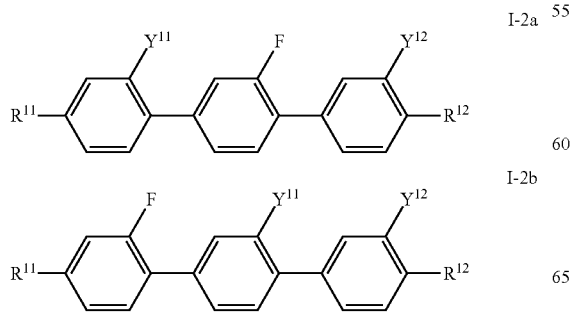

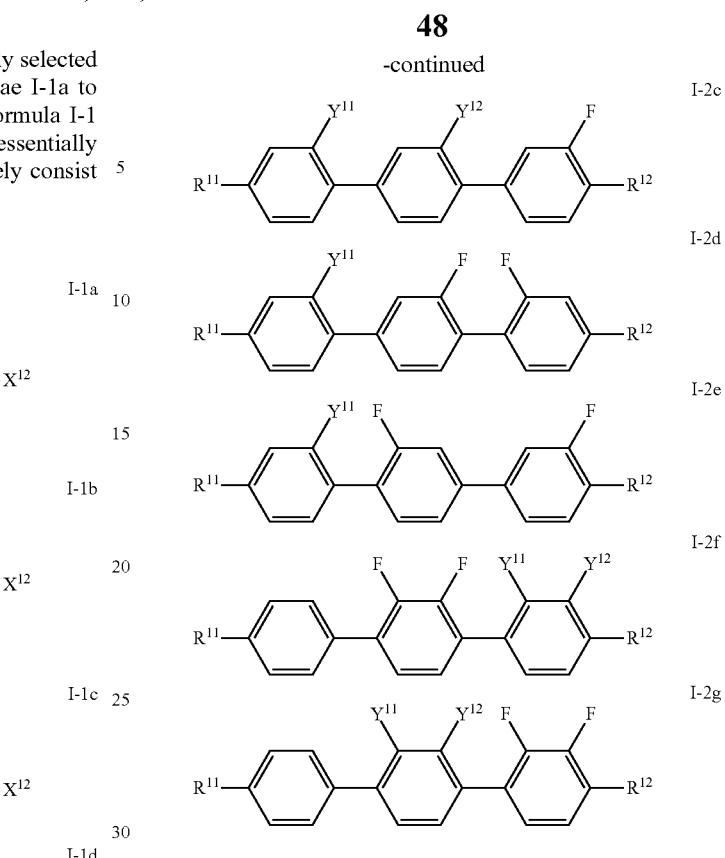

where in each case the compounds of the formula I-2a are excluded from the compounds of the formulae I-2b and I-2c, the compounds of the formula I-2b are excluded from the compounds of the formulae I-2c and the compounds of the formula I-2g are excluded from the compounds of the formulae I-2f, and in which the parameters have the respective meanings indicated above for formula I-1 and in which $Y^{11}$ and $Y^{12}$ each, independently of one another, denote H or F, and preferably $R^{11}$ denotes alkyl or alkenyl, $X^{11}$ denotes F, Cl or —OCF$_3$, and preferably one of $Y^{11}$ and $Y^{12}$ denotes H and the other denotes H or F, preferably likewise denotes H.

The compounds of the formula I-3 are preferably compounds of the formula I-3a:

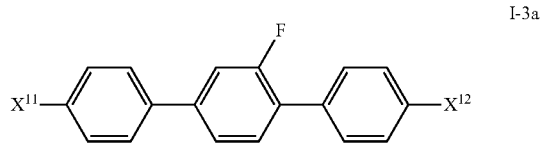

in which the parameters have the respective meanings indicated above for formula I-1 and in which preferably $X^{11}$ denotes F, Cl, preferably F, $X^{12}$ denotes F, Cl or —OCF$_3$, preferably —OCF$_3$.

In an even more preferred embodiment of the present invention, the compounds of the formula I are selected from the group of the compounds I-1a to I-1d, preferably selected from the group of the compounds I-1c and I-1d, more preferably the compounds of the formula I predominantly consist, even more preferably essentially consist and very particularly preferably completely consist thereof.

The compounds of the formula I-1a are preferably selected from the group of the compounds I-1a-1 and I-1a-2, more preferably these compounds of the formula I-1a predominantly consist, even more preferably essentially consist and very particularly preferably completely consist thereof:

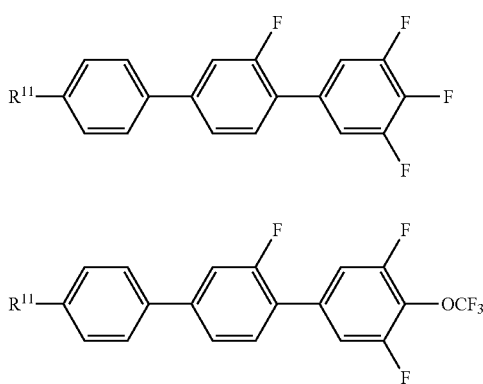

in which
R$^{11}$ has the meaning indicated above and preferably denotes C$_n$H$_{2n+1}$, in which
n denotes an integer in the range from 0 to 7, preferably in the range from 1 to 5 and particularly preferably 3 or 7.

The compounds of the formula I-1b are preferably compounds of the formula I-1 b-1:

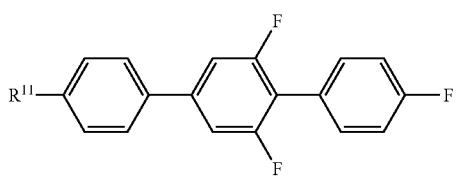

in which
R$^{11}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula I-1c are preferably selected from the group of the compounds of the formulae I-1c-1 and I-1c-4, preferably selected from the group of the compounds of the formulae I-1c-1 and I-1c-2, more preferably these compounds of the formula I-1c predominantly consist, even more preferably essentially consist and very particularly preferably completely consist thereof:

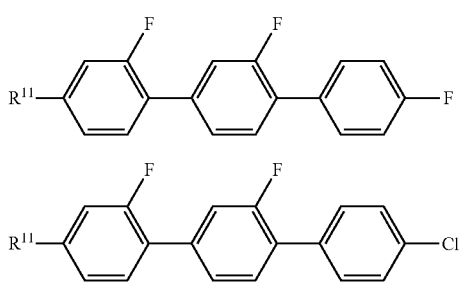

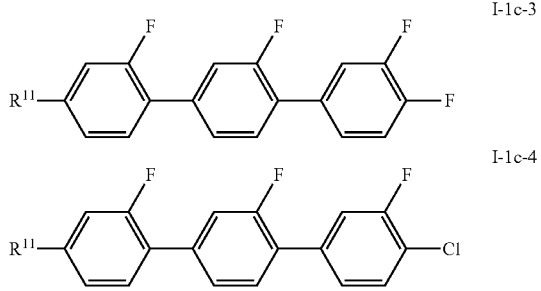

in which
R$^{11}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula I-1d are preferably selected from the group of the compounds of the formulae I-1d-1 and I-1d-2, preferably the compound of the formula I-1d-2, more preferably these compounds of the formula I-1d predominantly consist, even more preferably essentially consist and very particularly preferably completely consist thereof:

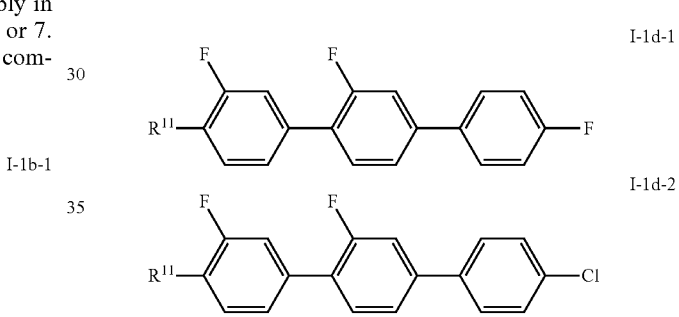

in which
R$^{11}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula I-2a are preferably selected from the group of the compounds of the formulae I-2a-1 and I-2a-2, preferably the compounds of the formula I-1a-1, more preferably these compounds of the formula I-2a predominantly consist, even more preferably essentially consist and very particularly preferably completely consist thereof:

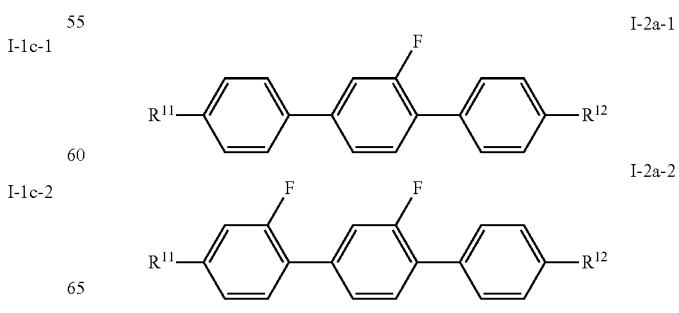

in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

Preferred combinations of (R$^{11}$ and R$^{12}$), in particular in formula I-2a-1, are (C$_n$H$_{2n+1}$ and C$_m$H$_{2m+1}$), (C$_n$H$_{2n+1}$ and O—C$_m$H$_{2m+1}$), (CH$_2$=CH—(CH$_2$)$_Z$ and C$_m$H$_{2m+1}$), (CH$_2$=CH—(CH$_2$)$_Z$ and O—C$_m$H$_{2m+1}$) and (C$_n$H$_{2n+1}$ and (CH$_2$)$_Z$—CH=CH$_2$).

Preferred compounds of the formula I-2b are the compounds of the formula I-2b-1:

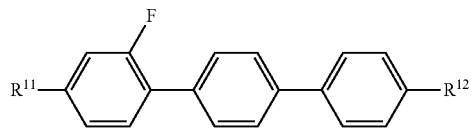

I-2b-1 in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of (R$^{11}$ and R$^{12}$) here is, in particular, (C$_n$H$_{2n+1}$ and C$_m$H$_{2m+1}$).

Preferred compounds of the formula I-2c are the compounds of the formula I-2c-1:

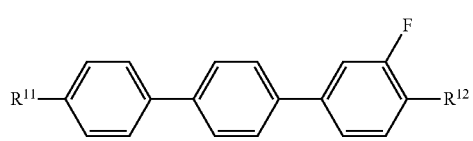

I-2c-1 in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of (R$^{11}$ and R$^{12}$) here is, in particular, (C$_n$H$_{2n+1}$ and C$_m$H$_{2m+1}$).

Preferred compounds of the formula I-2d are the compounds of the formula I-2d-1:

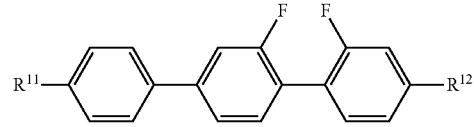

I-2d-1 in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combination of (R$^{11}$ and R$^{12}$) here is, in particular, (C$_n$H$_{2n+1}$ and C$_m$H$_{2m+1}$).

Preferred compounds of the formula I-2e are the compounds of the formula I-2e-1:

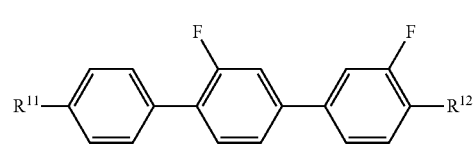

I-2e-1 in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combination of (R$^{11}$ and R$^{12}$) here is, in particular, (C$_n$H$_{2n+1}$ and O—C$_m$H$_{2m+1}$).

Preferred compounds of the formula I-2f are the compounds of the formula I-2f-1:

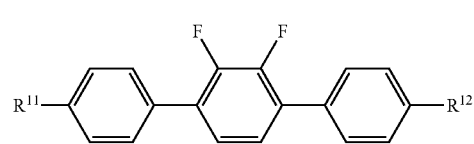

I-2f-1 in which

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combinations of (R$^{11}$ and R$^{12}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

Preferred compounds of the formula I-2g are the compounds of the formula I-2g-1:

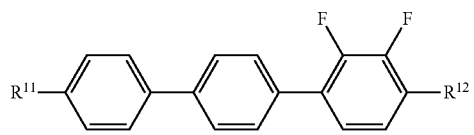

I-2g-1 in which
R$^{11}$ has the meaning indicated above and preferably denotes
C$_n$H$_{2n+1}$ or CH$_2$=CH—(CH$_2$)$_z$, and
R$^{12}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z 0, 1, 2, 3 or 4, preferably 0 or 2.

The preferred combinations of (R$^{11}$ and R$^{12}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The compounds of the formula II are preferably selected from the group of the compounds of the formulae II-1 to II-4, more preferably these compounds of the formula II predominantly consist, even more preferably essentially consist and very particularly preferably completely consist thereof:

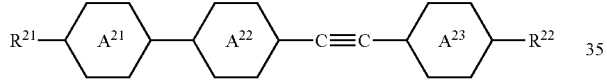

II-1

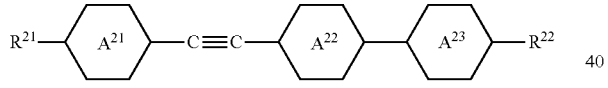

II-2

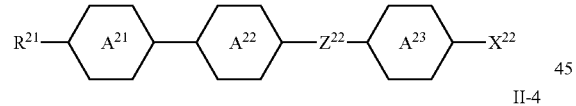

II-3

II-4 in which
Z$^{21}$ and Z$^{22}$ denote trans-CH=CH— or trans-CF=CF—, preferably trans-CH=CH—, and the other parameters have the meaning given above under formula II, and preferably
R$^{21}$ and R$^{22}$, independently of one another, denote H, unfluorinated alkyl or alkoxy having 1 to 7 C atoms or unfluorinated alkenyl having 2 to 7 C atoms,
X$^{22}$ denotes F, Cl, —CN or —NCS, preferably —NCS, and one of

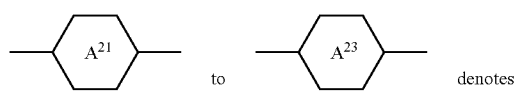

to denotes

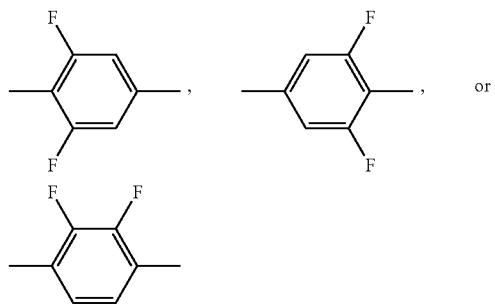

and the others, independently of one another, denote

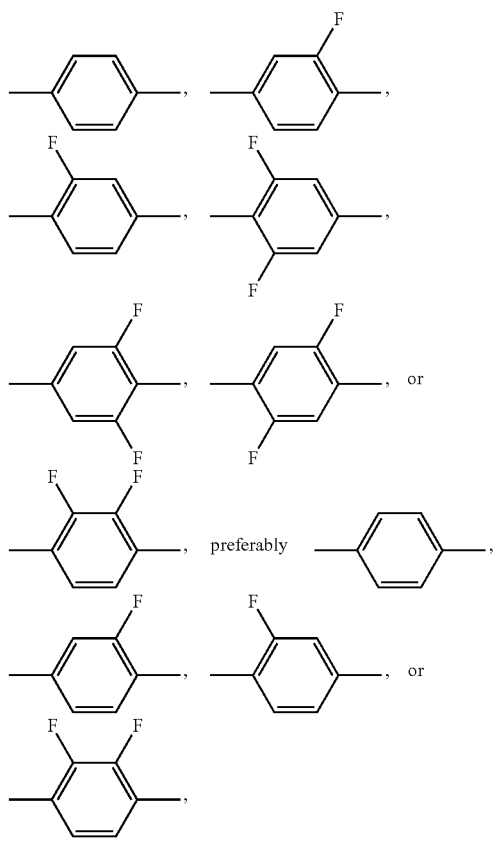

and preferably
R$^{21}$ denotes C$_n$H$_{2n+1}$ or CH$_2$=CH—(CH$_2$)$_z$, and
R$^{22}$ denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2,
and where the compounds of the formula II-2 are excluded from the compounds of the formula II-1.

The compounds of the formula II-1 are preferably selected from the group of the compounds of the formulae II-1a and II-1b, preferably selected from the group of the compounds of the formula II-1a, more preferably these compounds of the formula II-1 predominantly consist, even more preferably essentially consist and very particularly preferably completely consist thereof:

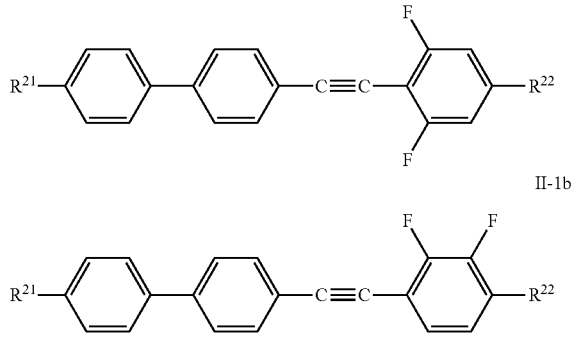

in which
$R^{21}$ has the meaning indicated above and preferably denotes $C_nH_{2n+1}$ or $CH_2\!=\!CH\!-\!(CH_2)_z$, and
$R^{22}$ has the meaning indicated above and preferably denotes $C_mH_{2m+1}$ or $O\!-\!C_mH_{2m+1}$ or $(CH_2)_z\!-\!CH\!=\!CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and $O\!-\!C_mH_{2m+1}$), particularly preferably ($C_nH_{2n+1}$ and $C_mH_{2m+1}$) in the case of formula II-1a and particularly preferably ($C_nH_{2n+1}$ and $O\!-\!C_mH_{2m+1}$) in the case of formula II-1b.

The compounds of the formula II-2 are preferably compounds of the formula II-2a:

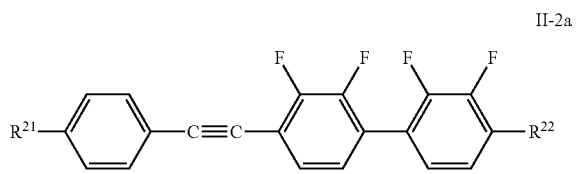

in which
$R^{21}$ has the meaning indicated above and preferably denotes $C_nH_{2n+1}$ or $CH_2\!=\!CH\!-\!(CH_2)_z$, and
$R^{22}$ has the meaning indicated above and preferably denotes $C_mH_{2m+1}$ or $O\!-\!C_mH_{2m+1}$ or $(CH_2)_z\!-\!CH\!=\!CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and $O\!-\!C_mH_{2m+1}$).

The compounds of the formula II-3 are preferably compounds of the formula II-3a:

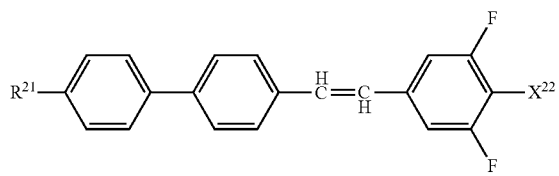

in which the parameters have the meanings indicated above for formula II-3 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

The compounds of the formula II-4 are preferably compounds of the formula II-4a:

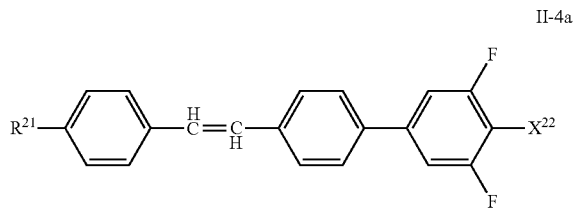

in which the parameters have the meanings indicated above for formula II-4 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

Further preferred compounds of the formula II are the compounds of the following formulae:

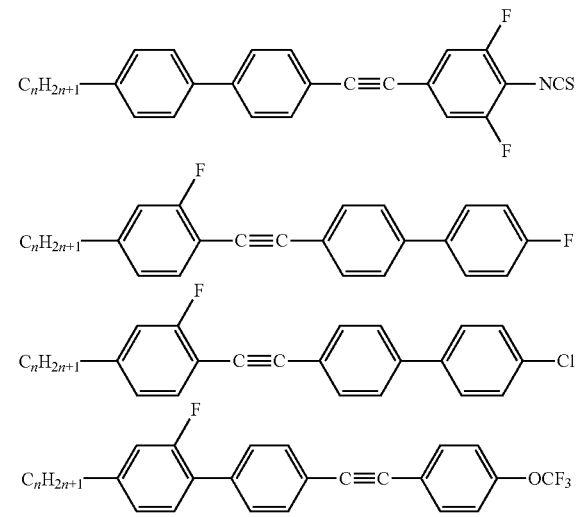

in which
n denotes an integer in the range from 0 to 7, preferably in the range from 1 to 5.

The compounds of the formula III are preferably selected from the group of the compounds of the formulae III-1 to III-7, more preferably these compounds of the formula III predominantly consist, even more preferably essentially consist and very particularly preferably completely consist thereof:

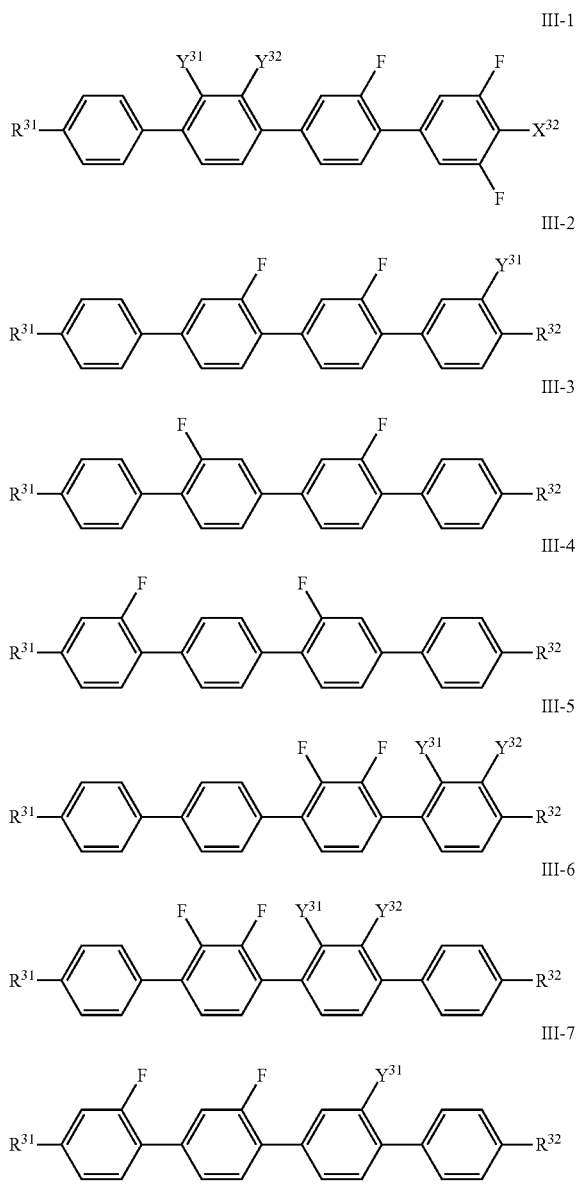

where the compounds of the formula III-5 are excluded from the compounds of the formula III-6, and
in which the parameters have the respective meanings indicated above for formula I and preferably
$R^{31}$ denotes unfluorinated alkyl or alkoxy, each having 1 to 7 C atoms, or unfluorinated alkenyl having 2 to 7 C atoms,
$R^{32}$ denotes unfluorinated alkyl or alkoxy, each having 1 to 7 C atoms, or unfluorinated alkenyl having 2 to 7 C atoms, and
$X^{32}$ denotes F, Cl, or —OCF$_3$, preferably F, and particularly preferably
$R^{31}$ has the meaning indicated above and preferably denotes $C_nH_{2n+1}$ or $CH_2$=CH—$(CH_2)_z$, and $R^{32}$ has the meaning indicated above and preferably denotes $C_mH_{2m+1}$ or O—$C_mH_{2m+1}$ or $(CH_2)_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The compounds of the formula III-1 are preferably selected from the group of the compounds of the formulae III-1a to III-1d, more preferably these compounds of the formula III-1 predominantly consist, even more preferably essentially consist and very particularly preferably completely consist thereof:

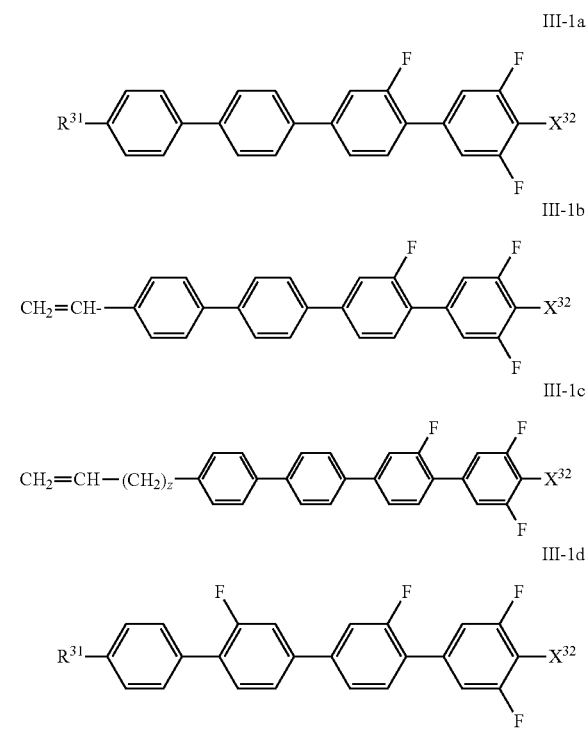

in which $X^{32}$ has the meaning given above for formula III-2 and
$R^{31}$ has the meaning indicated above and preferably denotes $C_nH_{2n+1}$, in which
n denotes 1 to 7, preferably 2 to 6, particularly preferably 2, 3 or 5, and
z denotes 0, 1, 2, 3 or 4, preferably 0 or 2, and
$X^{32}$ preferably denotes F.

The compounds of the formula III-2 are preferably selected from the group of the compounds of the formulae III-2a and III-2b, preferably of the formula III-2a, more preferably these compounds of the formula III-2 predominantly consist, even more preferably essentially consist and very particularly preferably completely consist thereof:

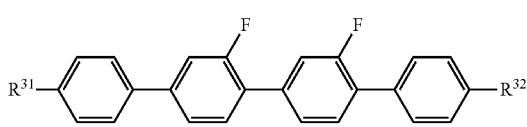

-continued

III-2b

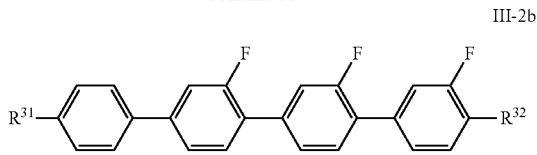

in which
R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-3 are preferably compounds of the formula III-3a:

III-3a

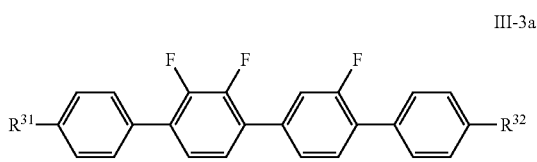

in which
R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-4 are preferably compounds of the formula III-4a:

III-4a

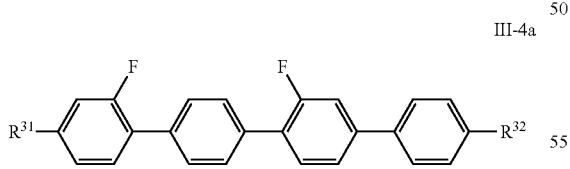

in which
R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-5 are preferably selected from the group of the compounds of the formulae III-5a and III-5b, preferably of the formula III-5a, more preferably these compounds of the formula III-5 predominantly consist, even more preferably essentially consist and very particularly preferably completely consist thereof:

III-5a

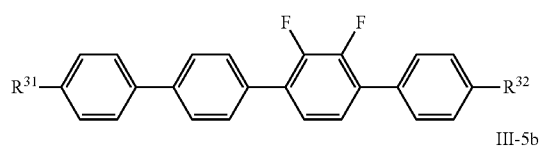

III-5b

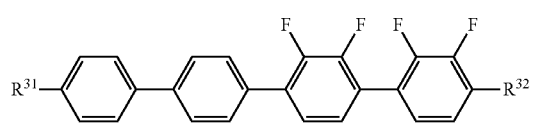

in which
R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-6 are preferably selected from the group of the compounds of the formulae III-6a and III-6b, more preferably these compounds of the formula III-6 predominantly consist, even more preferably essentially consist and very particularly preferably completely consist thereof:

III-6a

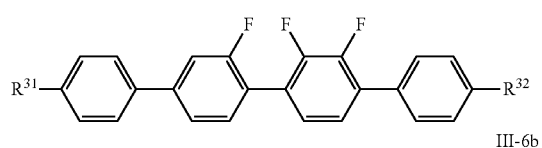

III-6b

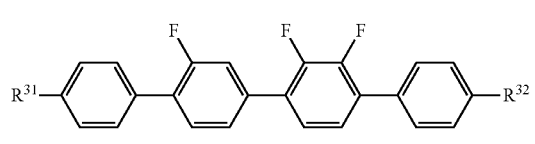

in which
R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The media in accordance with the present invention optionally comprise one or more compounds of the formula IV

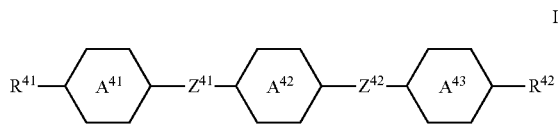
IV in which $R^{41}$ and $R^{42}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of $Z^{41}$ and $Z^{42}$ denotes trans-CH=CH—, trans-CF=CF— or —C≡C— and the other denotes, independently thereof, trans-CH=CH—, trans-CF=CF— or a single bond, preferably one of them denotes —C≡C— or trans-CH=CH— and the other denotes a single bond, and

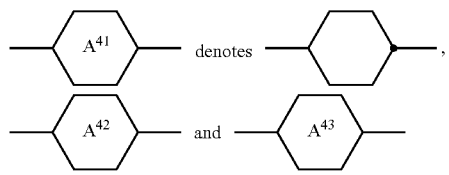

independently of one another, denote

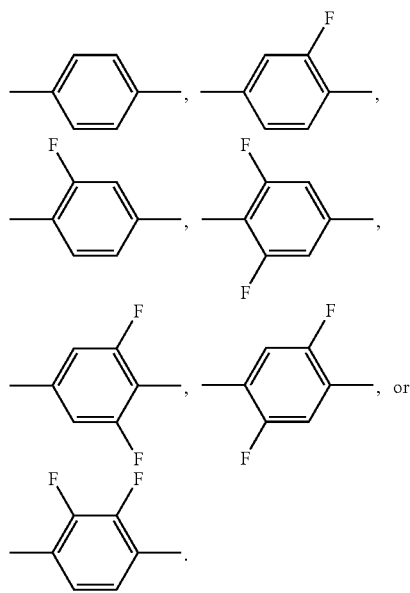

The liquid-crystalline media in accordance with the present application preferably comprise in total 0 to 40%, preferably 0 to 30% and particularly preferably 5 to 25%, of compounds of the formula IV.

The compounds of the formulae IV are preferably selected from the group of the compounds of the formulae IV-1 to IV-3, more preferably these compounds of the formula IV predominantly consist, even more preferably essentially consist and very particularly preferably completely consist thereof:

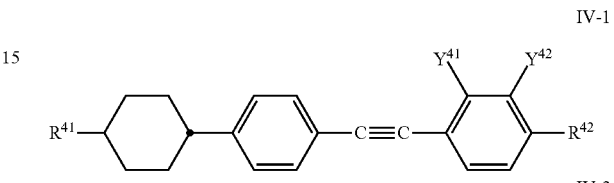
IV-1

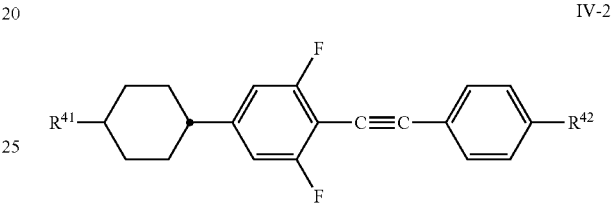
IV-2

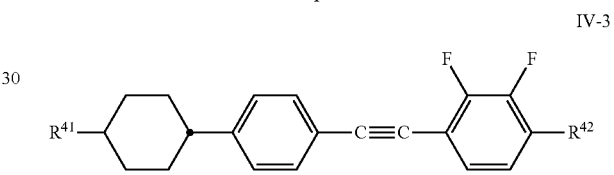
IV-3 in which one of $Y^{41}$ and $Y^{42}$ denotes H and the other denotes H or F, and $R^{41}$ has the meaning indicated above and preferably denotes $C_nH_{2n+1}$ or $CH_2$=CH—$(CH_2)_z$, and $R^{42}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The compounds of the formulae IV-1 are preferably selected from the group of the compounds of the formulae IV-1a to IV-1c, more preferably these compounds of the formula IV-1 predominantly consist, even more preferably essentially consist and very particularly preferably completely consist thereof:

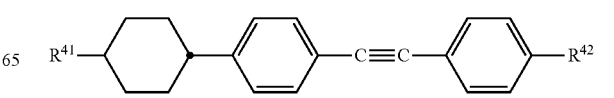
IV-1a

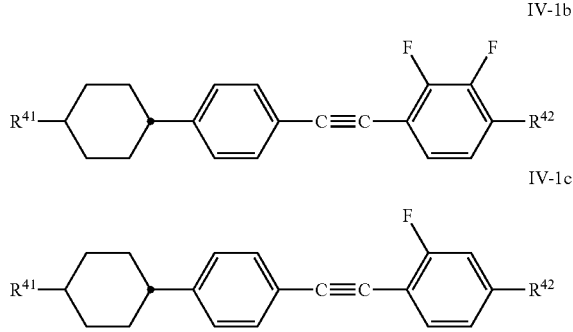

in which
R$^{41}$ has the meaning indicated above and preferably denotes C$_n$H$_{2n+1}$ or CH$_2$=CH—(CH$_2$)$_z$, and
R$^{42}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-2 are preferably compounds of the formula IV-2a:

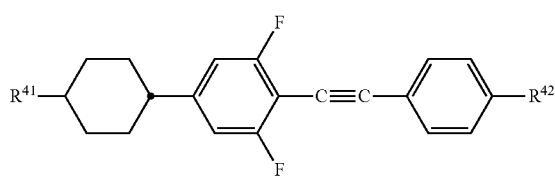

in which
R$^{41}$ has the meaning indicated above and preferably denotes C$_n$H$_{2n+1}$ or CH$_2$=CH—(CH$_2$)$_z$, and
R$^{42}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$), C$_n$H$_{2n+1}$ and O—C$_m$H$_{2m+1}$) and (CH$_2$=CH—(CH$_2$)$_z$ and C$_m$H$_{2m+1}$), particularly preferably (C$_n$H$_{2n+1}$ and C$_m$H$_{2m+1}$).

The compounds of the formula IV-3 are preferably compounds of the formula IV-3a:

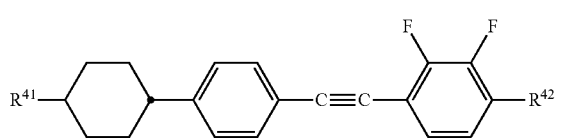

in which
R$^{41}$ has the meaning indicated above and preferably denotes C$_n$H$_{2n+1}$ or CH$_2$=CH—(CH$_2$)$_z$, and
R$^{42}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$).

The media in accordance with the present invention optionally comprise one or more compounds of the formula V

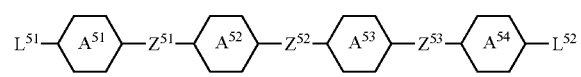

in which
L$^{51}$ denotes R$^{51}$ or X$^{51}$,
L$^{52}$ denotes R$^{52}$ or X$^{52}$,
R$^{51}$ and R$^{52}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
X$^{51}$ and X$^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
Z$^{51}$ to Z$^{53}$, independently of one another, denote trans-CH=CH—, trans-CF=CF—, —C≡C— or a single bond, preferably one or more of them denotes a single bond, and particularly preferably all denote a single bond,

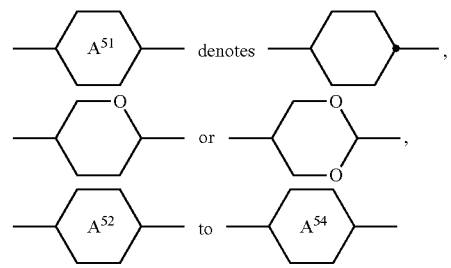

independently of one another, denote

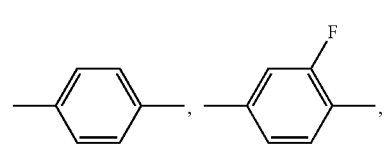

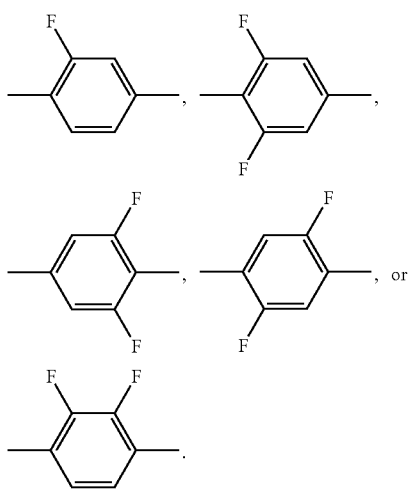

The compounds of the formula V are preferably selected from the group of the compounds of the formulae V-1 to V-3, more preferably these compounds of the formula V predominantly consist, even more preferably essentially consist and very particularly preferably completely consist thereof:

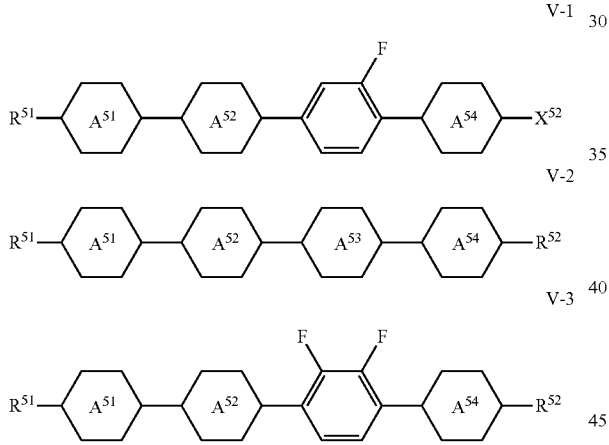

in which the parameters have the respective meanings indicated above under formula V and preferably one of

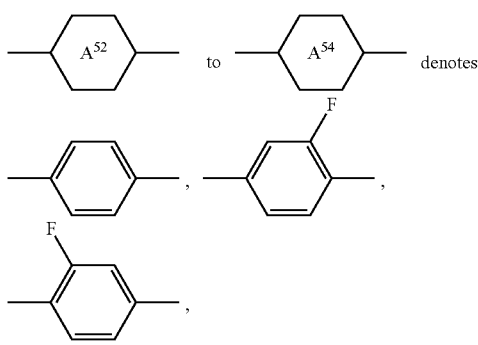

and
in which
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of the pair of parameters (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$).

The liquid-crystalline media in accordance with the present application preferably comprise in total 5% to 30%, preferably 10% to 25% and particularly preferably 15% to 20%, of compounds of the formula V.

The compounds of the formula V-1 are preferably selected from the group of the compounds of the formulae V-1a to V-1e, more preferably these compounds of the formula V-1 predominantly consist, even more preferably essentially consist and very particularly preferably completely consist thereof:

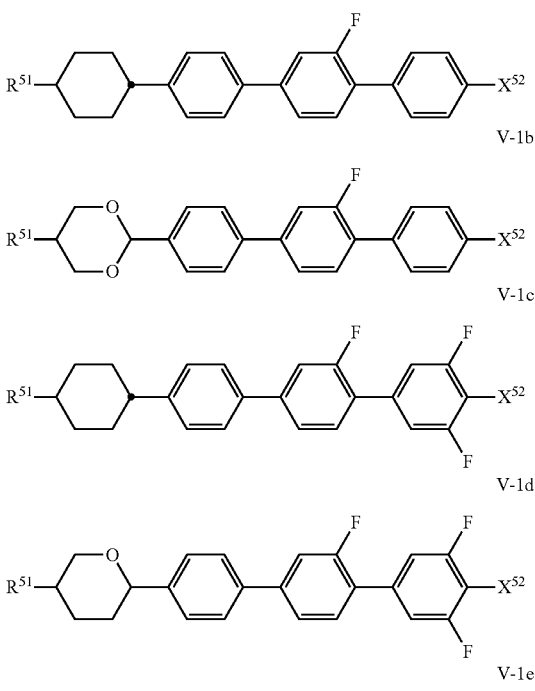

in which the parameters have the meaning given above and preferably
R$^{51}$ has the meaning indicated above and preferably denotes C$_n$H$_{2n+1}$, and
n denotes an integer in the range from 0 to 15, preferably in the range from 1 to 7 and particularly preferably 1 to 5, and
X$^{52}$ preferably denotes F or Cl.

The compounds of the formula V-2 are preferably selected from the group of the compounds of the formulae V-2a and V-2b, more preferably these compounds of the formula V-2 predominantly consist, even more preferably essentially consist and very particularly preferably completely consist thereof:

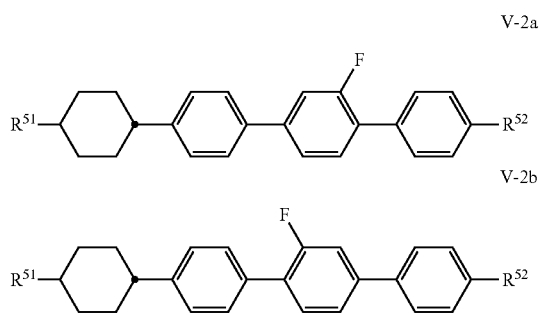

V-2a

V-2b in which
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of the pair of parameters (R$^{51}$ and R$^{52}$) here is, in particular, (C$_n$H$_{2n+1}$ and C$_m$H$_{2m+1}$).

The compounds of the formula V-3 are preferably compounds of the formulae V-3a and V-3b:

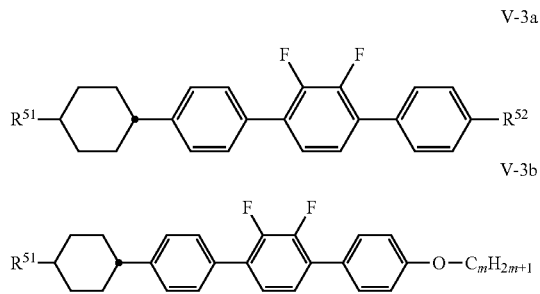

V-3a

V-3b in which
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of the pair of parameters (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

Suitable and preferred polymerisation methods are, for example, thermally induced polymerisation or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, and preferably, the commercially available photoinitiators Irgacure®184, Irgacure®369, Irgacure®651, Irgacure®784 (preferably), Irgacure®819 (preferably), Irgacure®907 or Irgacure®1300 (all from BASF) or Darocure®1173 (from Ciba AG). If an initiator is employed, its proportion is preferably 0.001% to 5% by weight, particularly preferably 0.001% to 1% by weight.

The polymerisable compounds according to the invention are also suitable for polymerisation without an initiator, which is accompanied by considerable advantages, such as, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (from Ciba AG), such as, for example, Irganox® 1076. If stabilisers are employed, their proportion, based on the total amount of the mixture of LS including the RMs or the polymerisable component, is preferably in the range from 10 ppm to 10,000 ppm, particularly preferably in the range from 50 ppm to 2,000 ppm, most preferably 0.2% or about 0.2%.

The mixtures are characterised as described below before the polymerisation. The reactive components are then polymerised by irradiation once (180 s), and the resultant media are re-characterised.

The polymerisation of the media preferably is carried out by irradiation with a UV lamp (e.g. Dymax, Bluewave 200, 365 nm interference filter) having an effective power of about 3.0 mW/cm$^2$ for 180 seconds. The polymerisation is carried out directly in the test cell/antenna device. To minimize UV induced host degradation a suitable long pass filter is beneficially applied, for example Schott GG395 or GG410.

The polymerisation is carried out at room temperature.

The entire irradiation time which results in maximum stabilisation is typically 180 s at the irradiation power indicated. Further polymerisations can be carried out in accordance with an optimised irradiation/temperature programme.

The total concentration of the polymerisable compounds in the medium prior to polymerisation preferably is in the range form 1% to 20%, more preferably from 2% to 15% and, most preferably from 2% to 10%.

In a preferred embodiment of the present invention, the medium comprises one or more dielectrically positive compounds of the formula I-1 having a dielectric anisotropy of greater than 3.

The medium preferably comprises one or more dielectrically neutral compounds of the formula I-2 having a dielectric anisotropy in the range from more than −1.5 to 3.

In a preferred embodiment of the present invention, the medium comprises one or more compounds of the formula II.

In a further preferred embodiment of the present invention, the medium comprises one or more compounds of the formula III.

The liquid-crystalline media, preferably or better the nematic component of the liquid crystalline media used in accordance with the present invention preferably comprise 10% or less, preferably 5% or less, particularly preferably 2% or less, very particularly preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and very preferably completely consist of compounds selected from the group of the compounds of the formulae G, CC, CP and I to V, preferably G, CC, CP and I to IV and very preferably G, CC, I to III and/or V.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly consist of" means that the entity in question comprises 55% or more, preferably 60% or more and very preferably 70% or more of the component or components or compound or compounds indicated.

In this connection, "essentially consist of" means that the entity in question comprises 80% or more, preferably 90% or more and very preferably 95% or more of the component or components or compound or compounds indicated.

In this connection, "completely consist of" means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 90° C. or more, more preferably 100° C. or more, still more preferably 120° C. or more, particularly preferably 150° C. or more and very particularly preferably 170° C. or more.

The nematic phase of the media in accordance with the invention preferably extends at least from 0° C. or less to 90° C. or more, preferably up to 100° C. or more, more preferably at least from −10° C. or less to 100° C. or more, very preferably at least from −20° C. or less to 100° C. or more and in particular at least from −20° C. or less to 110° C. or more.

The $\Delta\varepsilon$ of the liquid-crystal medium in accordance with the invention, at 1 kHz and 20° C., is preferably 1 or more, more preferably 2 or more and very preferably 3 or more.

The $\Delta n$ of the liquid-crystal media in accordance with the present invention, at 589 nm ($Na^D$) and 20° C., is preferably in the range from 0.200 or more to 0.90 or less, preferably in the range from 0.250 or more to 0.90 or less, even more preferably in the range from 0.300 or more to 0.85 or less and very particularly preferably in the range from 0.350 or more to 0.800 or less.

In a first preferred embodiment of the present application, the $\Delta n$ of the liquid-crystal media in accordance with the present invention is preferably 0.50 or more, more preferably 0.55 or more.

The total concentration of the compounds of formula G in the LC medium is preferably in the range from 1.0% or more to 40% or less, in case two or more homologues are used, is preferably the concentration of each homologue in this case is in the range from 1.0% or more to 20% or less. In case one homologue is used, the concentration of the compound of formula G in the LC medium is preferably in the range from 1.0% or more to 30% or less.

In accordance with the present invention, the individual compounds of the formula I are preferably used in a total concentration of 10% to 70%, more preferably 20% to 60%, even more preferably 30% to 50% and very preferably 25% to 45% of the mixture as a whole.

The compounds of the formula II are preferably used in a total concentration of 1% to 20%, more preferably 1% to 15%, even more preferably 2% to 15% and very preferably 3% to 10% of the mixture as a whole, unless explicitly stated otherwise.

The compounds of the formula III are preferably used in a total concentration of 1% to 60%, more preferably 5% to 50%, even more preferably 10% to 45% and very preferably 15% to 40% of the mixture as a whole.

The liquid-crystal media preferably comprise, preferably predominantly consist of and very preferably completely consist of in total 50% to 100%, more preferably 70% to 100% and very preferably 80% to 100% and in particular 90% to 100% of the compounds of the formulae G, CC, CP, I, II, III, IV and V, preferably of the formulae G, CC, I, III, IV and V, more preferably of the formulae G, I, II, III, IV and/or VI.

In the present application, the expression dielectrically positive describes compounds or components where $\Delta\varepsilon>3.0$, dielectrically neutral describes those where $-1.5 \leq \Delta\varepsilon \leq 3.0$ and dielectrically negative describes those where $\Delta\varepsilon<-1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\parallel - \varepsilon_\perp)$, while $\varepsilon_{ave.}$ is $(\varepsilon_\parallel + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Golden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to deter-mine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

Furthermore, the liquid-crystal media according to the invention are characterised by high optical anisotropy values in the visible range, especially at a wavelength of 589.0 nm (i.e. at the Na"D" line). The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterised by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The dielectric anisotropy in the microwave range is defined as $$\Delta\varepsilon_r \equiv (\varepsilon_{r,\parallel} - \varepsilon_{r,\perp}).$$

The tunability (τ) is defined as $$\tau \equiv (\Delta\varepsilon_r / \varepsilon_{r,\parallel}).$$

The material quality (η), also called figure of merit (FoM) is defined as $$\eta \equiv (\tau / \tan \delta_{\varepsilon^r, max.}), \text{ where}$$

the maximum dielectric loss is $$\tan \delta_{\varepsilon^r, max} \equiv \max.\{\tan \delta_{\varepsilon^r, \perp}; \tan \delta_{\varepsilon^r, \parallel}\}.$$

The material quality (η) of the preferred liquid-crystal materials is 6 or more, preferably 8 or more, preferably 10 or more, preferably 15 or more, preferably 17 or more, preferably 20 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The concentration of the chiral dopant, respectively the total concentration of the chiral dopants in the LC medium are preferably in the range from 0.05% or more to 5% or less, more preferably from 0.1% or more to 1% or less, and, most preferably from 0.2% or more to 0.8% or less. These preferred concentration ranges apply in particular to the chiral dopant S-2011, respectively to its enantiomeric form R-2011 (both from Merck KGaA) and for chiral dopants having the same or a similar HTP. For Chiral dopants having either a higher or a lower absolute value of the HTP compared to S-2011 these preferred concentrations have to be decreased, respectively increased proportionally according to the ratio of their HTP values relatively to that of S-2011.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 GHz to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.1% to 15%, more preferably from 1% to 10% and most preferably from 2% to 6%.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electro-optical response, from 0% to 90% ($t_{90}$-$t_0$), i.e. including the delay time ($t_{10}$-$t_0$), as decay time ($\tau_{off}$) for the time for the change of the relative tuning, respectively of the relative contrast for the electro-optical response, from 100% back to 10% ($t_{100}$-$t_{10}$) and as the total response time ($\tau_{total}$)=$\tau_{on}$+$\tau_{off}$), respectively.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multi bottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_oH_{2o+1}$ preferably denote straight-chain alkyl in each case having n, m or o C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

| Ring elements | | | |
|---|---|---|---|
| C | (cyclohexane-1,4-diyl) | | |
| D | (1,3-dioxane) | DI | (1,3-dioxane inverted) |
| A | (tetrahydropyran) | AI | (tetrahydropyran inverted) |
| P | (phenylene) | | |
| G | (fluorophenylene) | GI | (fluorophenylene inverted) |
| G(CL) | (chlorophenylene) | GI(CL) | (chlorophenylene inverted) |
| P(o) | ($C_oH_{2o+1}$ alkylphenylene) | PI(o) | ($C_oH_{2o+1}$ alkylphenylene inverted) |
| P(c3) | (cyclopropylphenylene) | PI(c3) | (cyclopropylphenylene inverted) |
| U | (difluorophenylene) | UI | (difluorophenylene inverted) |
| Y | (difluorophenylene) | | |
| M | (pyrimidine) | MI | (pyrimidine inverted) |

TABLE A-continued

| Ring elements | | | |
|---|---|---|---|
| N | (pyridine) | NI | (pyridine inverted) |
| Np | (naphthalene) | | |
| N3f | (trifluoronaphthalene) | N3fI | (trifluoronaphthalene inverted) |
| tH | (tetrahydronaphthalene) | tHI | (tetrahydronaphthalene inverted) |
| tH2f | (difluorotetrahydronaphthalene) | tH2fI | (difluorotetrahydronaphthalene inverted) |
| dH | (decahydronaphthalene) | | |
| K | (trifluoroindane) | KI | (trifluoroindane inverted) |
| L | (cyclohexene) | LI | (cyclohexene inverted) |
| F | (fluorocyclohexene) | FI | (fluorocyclohexene inverted) |

TABLE B

| Linking groups | | | |
|---|---|---|---|
| E | —CH₂CH₂— | Z | —CO—O— |
| V | —CH=CH— | ZI | —O—CO— |
| X | —CF=CH— | O | —CH₂—O— |
| XI | —CH=CF— | OI | —O—CH₂— |
| B | —CF=CF— | Q | —CF₂—O— |
| T | —C≡C— | QI | —O—CF₂— |
| W | —CF₂CF₂— | | |

TABLE C

End groups

| Left-hand side | | Right-hand side | |
|---|---|---|---|
| Used alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -FXO- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Used in combination with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The compounds of formula G preferably used are represented as:

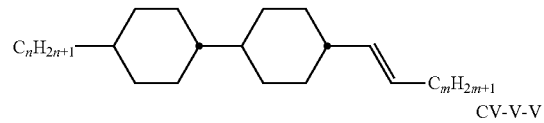

PTGTP-n-m

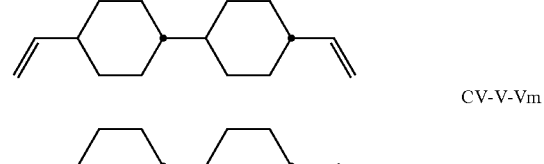

PTG(CL)TP-n-m

The compounds of formula CC preferably used are represented as:

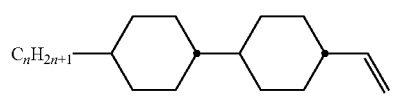

CV-n-V

-continued

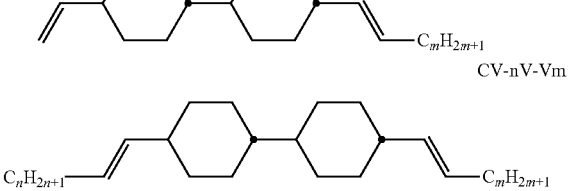

CV-n-Vm

CV-V-V

CV-V-Vm

CV-nV-Vm

The compounds of formula CP preferably used are represented as:

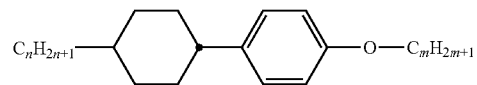

CP-n-Om

The illustrative structures are compounds having three 6-membered rings which are particularly preferably employed:

PP-n-IV
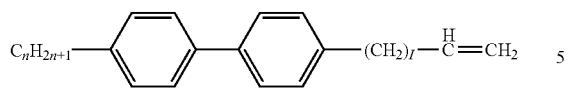
PP-n-IVm
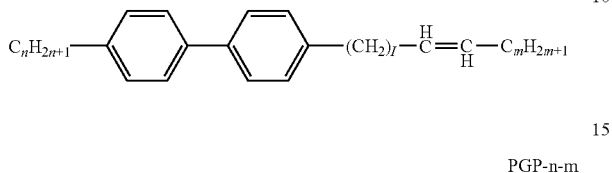
PGP-n-m
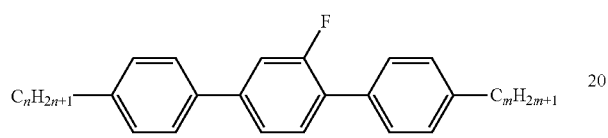
PGP-F-OT
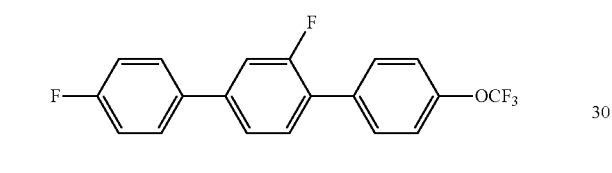
PGP-n-IV
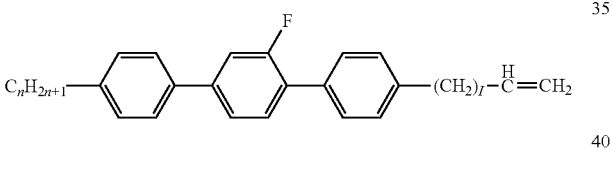
PGP-n-IVm
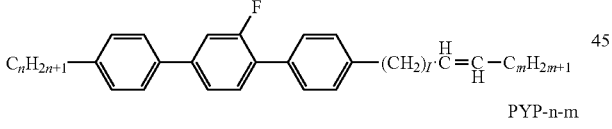
PYP-n-m
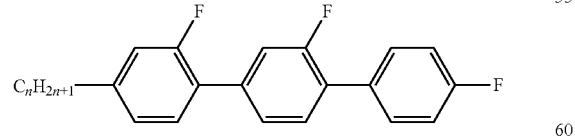
GGP-n-F
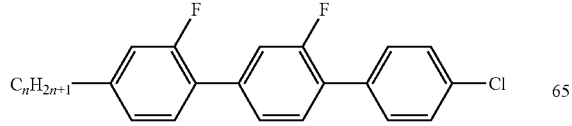
GGP-n-CL
GGP-n-m
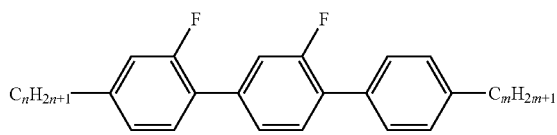
PGIGI-n-F
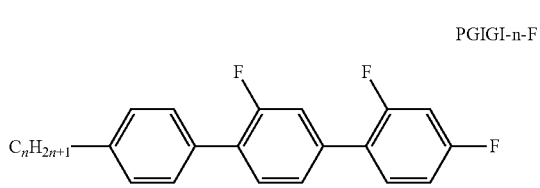
PGIGI-n-CL
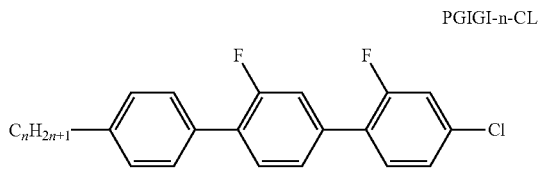
PGU-n-F
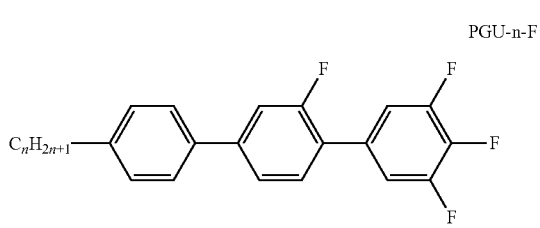
PGU-n-CL
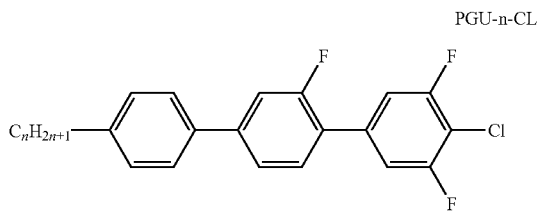
PGU-n-OT
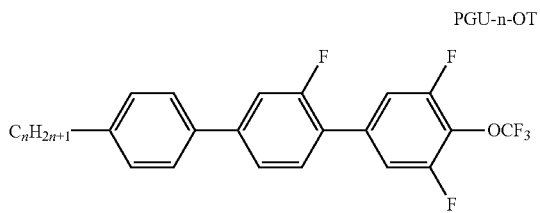
PPTUI-n-m
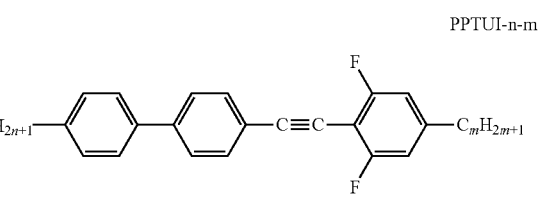
PPTY-n-m
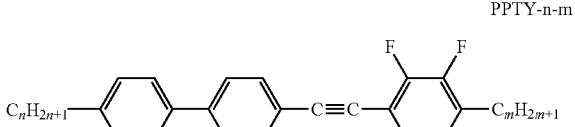
The illustrative structures are compounds having four 6-membered rings which are particularly preferably employed:

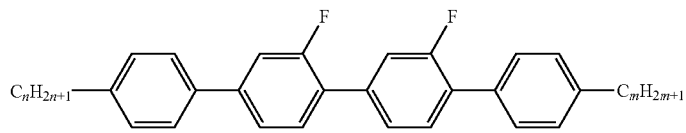 PGGP-n-m
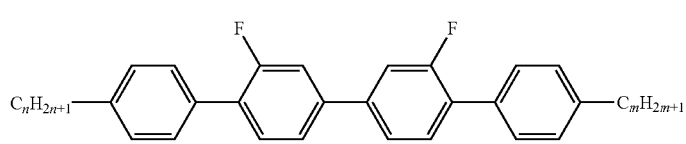 PGIGP-n-m
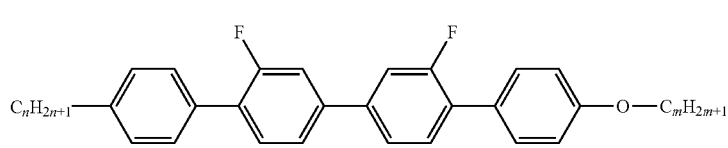 PGIGP-n-Om
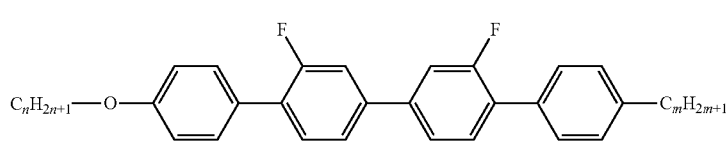 PGIGP-nO-m
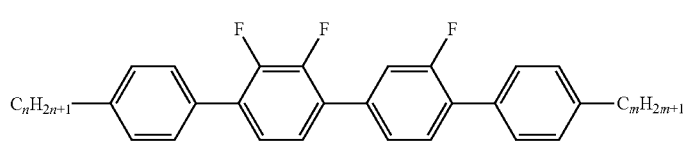 PYGP-n-m
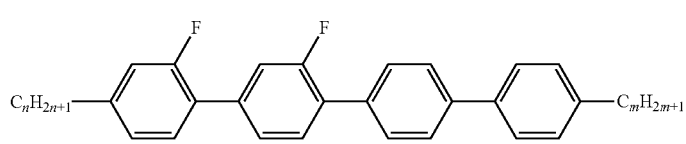 GGPP-n-m
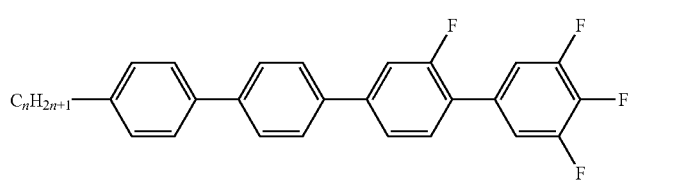 PPGU-n-F
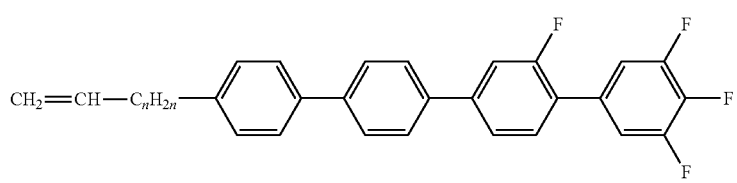 PPGU-Vn-F
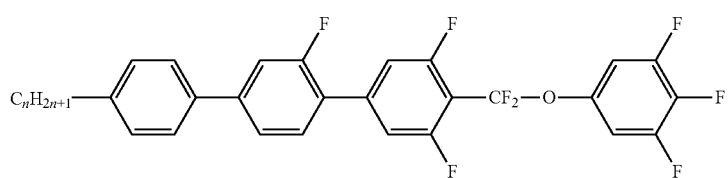 PGUQU-n-F
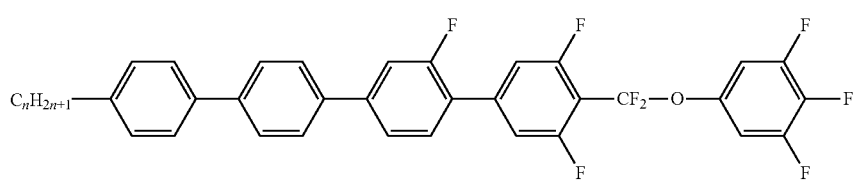 PPGUQU-n-F Illustrative structures of dielectrically neutral compounds which are preferably employed:
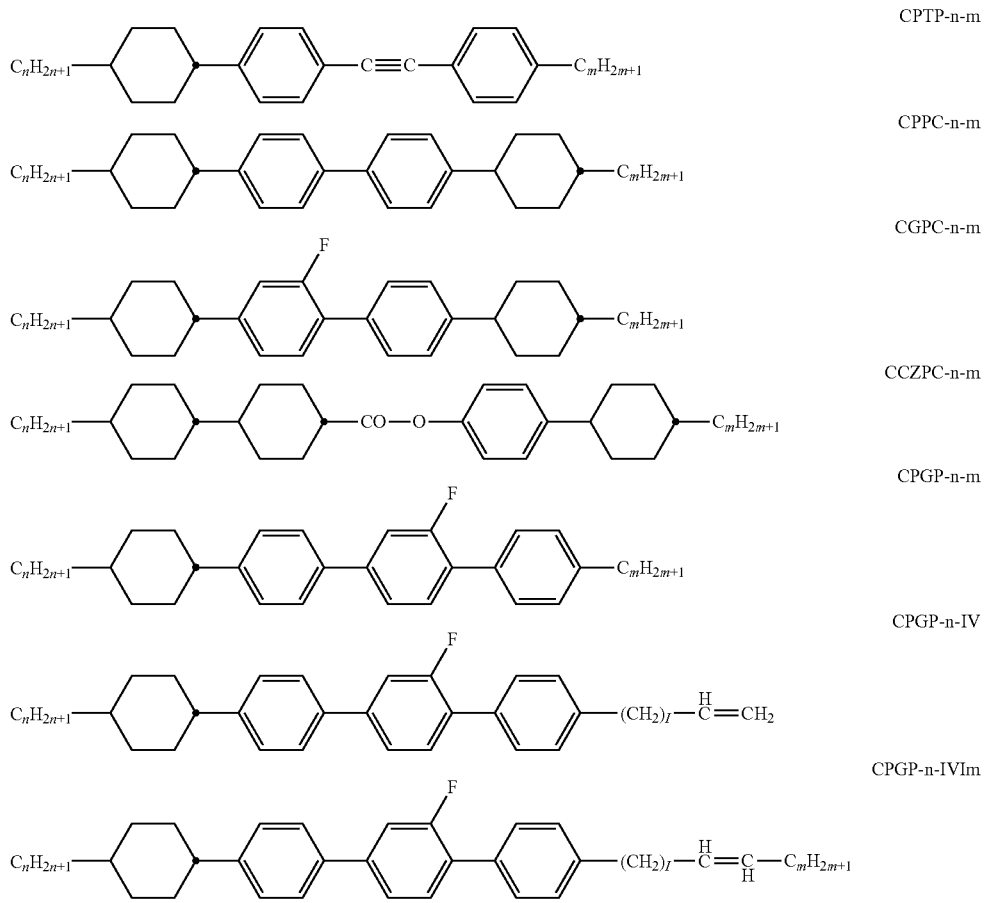
CPTP-n-m
CPPC-n-m
CGPC-n-m
CCZPC-n-m
CPGP-n-m
CPGP-n-IV
CPGP-n-IVIm
Illustrative structures of further compounds which are preferably employed:
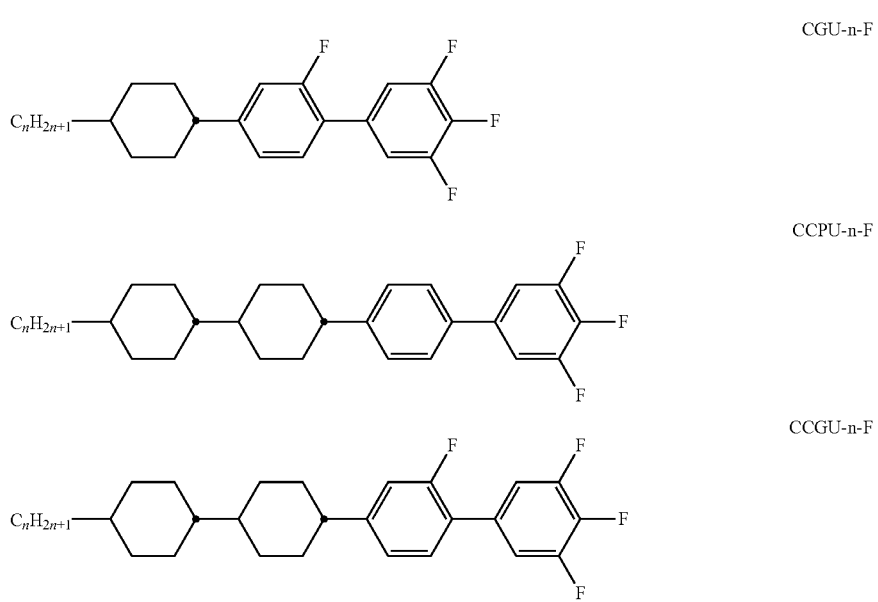
CGU-n-F
CCPU-n-F
CCGU-n-F

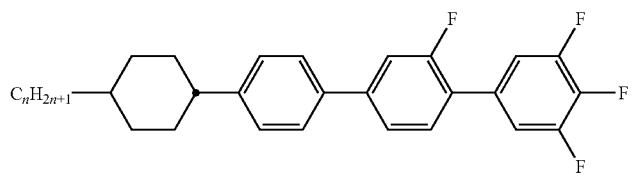
CPGU-n-F
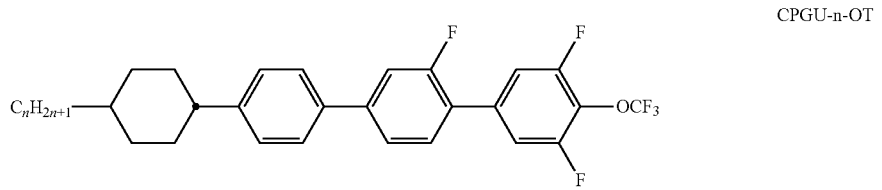
CPGU-n-OT
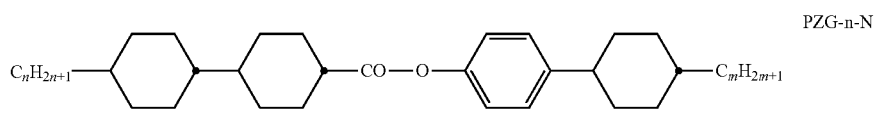
PZG-n-N
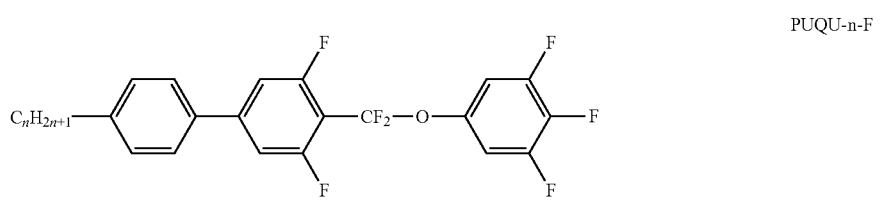
PUQU-n-F
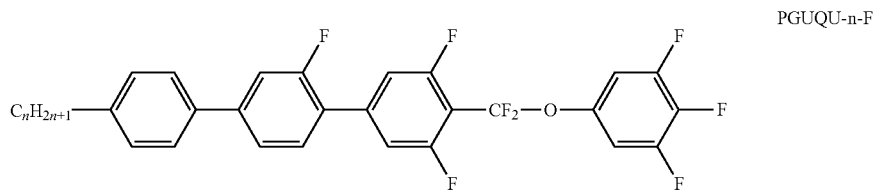
PGUQU-n-F
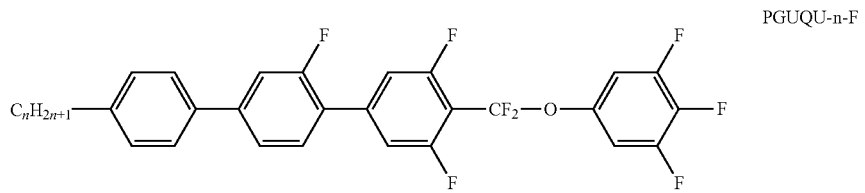
PGUQU-n-F
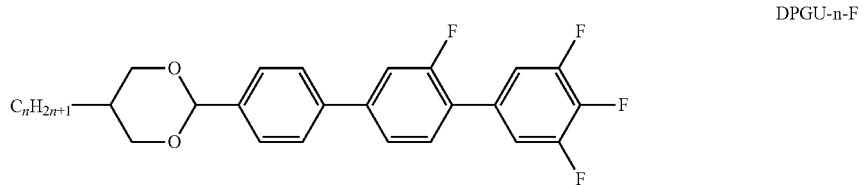
DPGU-n-F
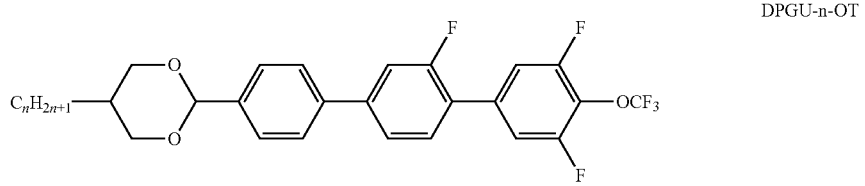
DPGU-n-OT
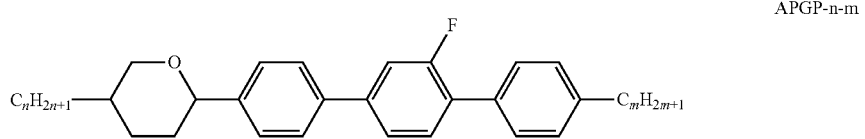
APGP-n-m

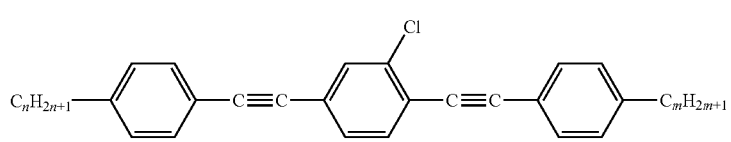

PTP(o)TP-n-m

In this table the parameters have the following meanings.

l, m, n and o are all independently of each other positive integers different from 0, preferably l is 1 or 2, m and n are preferably selected from 1 to 7, and o preferably is selected from 1 to 6, preferably 1 or 2.

The following table, Table E, shows illustrative compounds which can be used as stabiliser in the mesogenic media in accordance with the present invention. The total concentration of these and similar compounds in the media is preferably 5% or less.

TABLE E

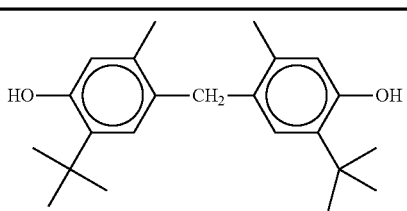

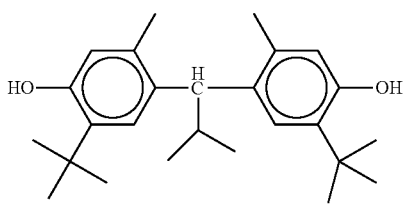

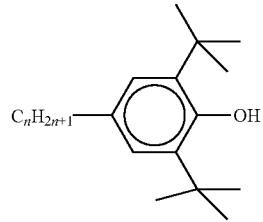

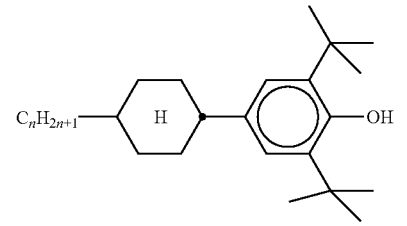

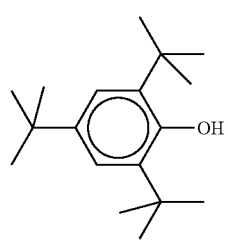

TABLE E-continued

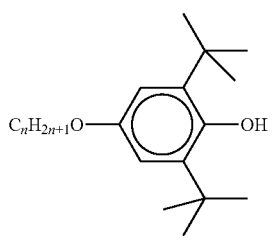

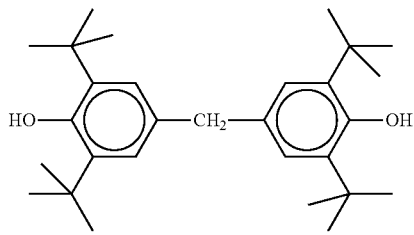

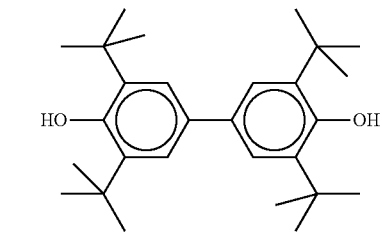

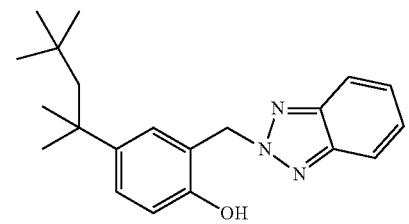 [SMILES: CC(C)(C)CC(C)(C)c1ccc(O)c(Cn2nc3ccccc3n2)c1]

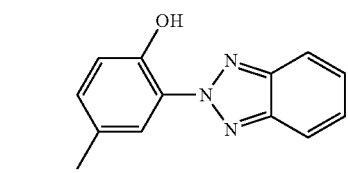 [SMILES: Cc1ccc(O)c(-n2nc3ccccc3n2)c1]

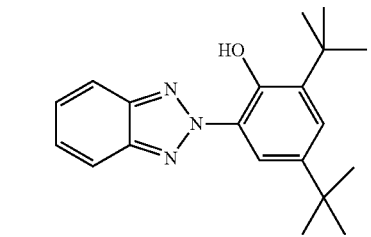 [SMILES: CC(C)(C)c1cc(-n2nc3ccccc3n2)c(O)c(C(C)(C)C)c1]

TABLE E-continued
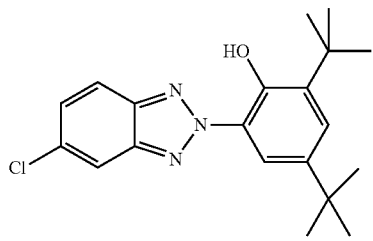 [SMILES: CC(C)(C)c1cc(-n2nc3ccc(Cl)cc3n2)c(O)c(C(C)(C)C)c1]
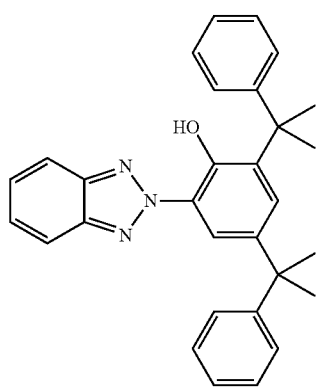 [SMILES: CC(C)(c1ccccc1)c1cc(-n2nc3ccccc3n2)c(O)c(C(C)(C)c2ccccc2)c1]
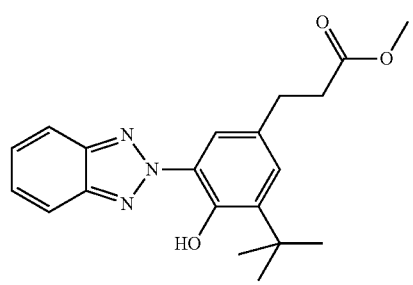 [SMILES: COC(=O)CCc1cc(-n2nc3ccccc3n2)c(O)c(C(C)(C)C)c1]
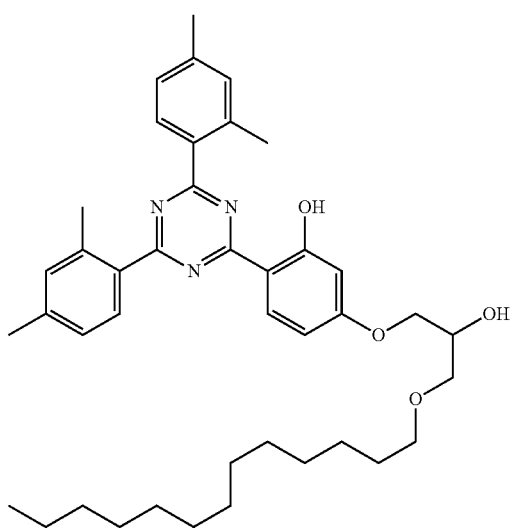 [SMILES: CCCCCCCCCCCCCOCC(O)COc1ccc(-c2nc(-c3ccc(C)cc3C)nc(-c3ccc(C)cc3C)n2)c(O)c1]
TABLE E-continued
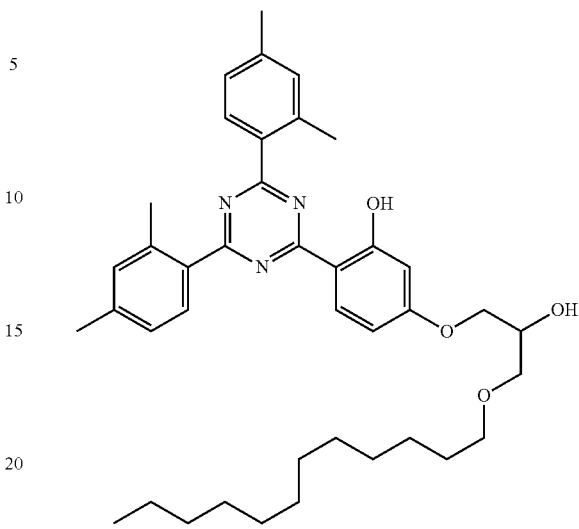
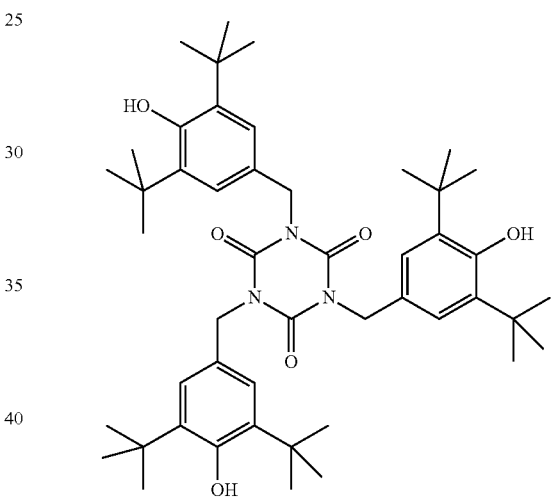
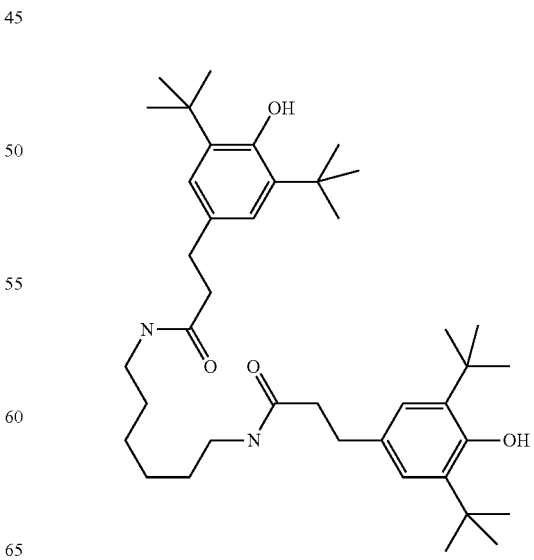

TABLE E-continued

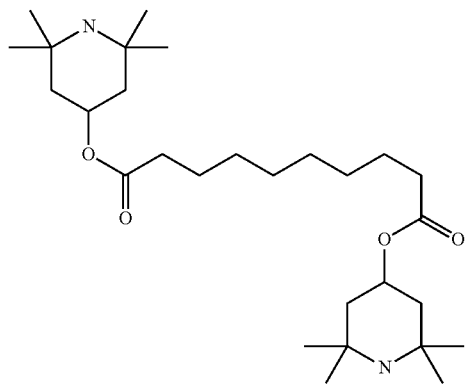

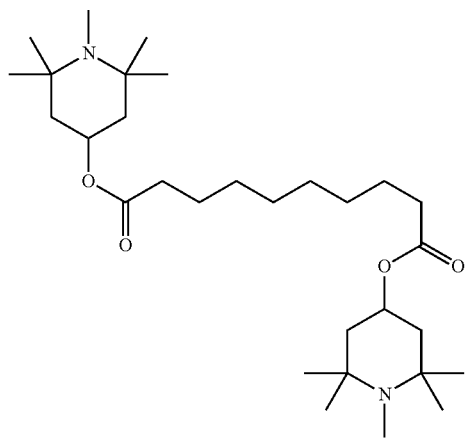

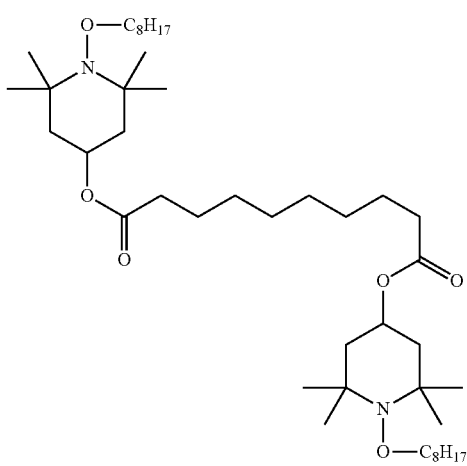

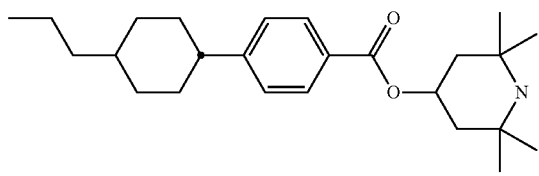

TABLE E-continued

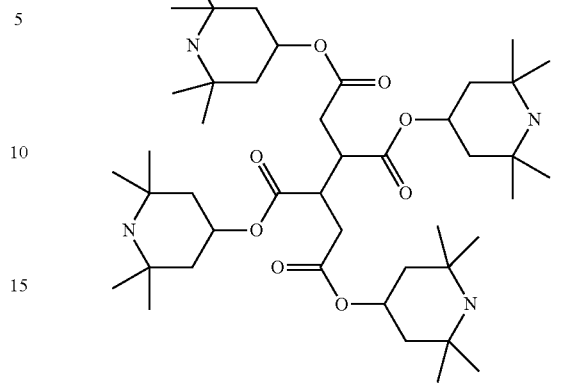

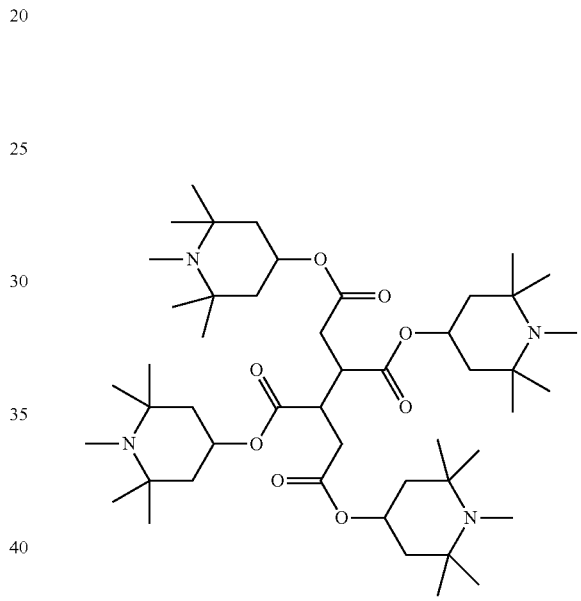

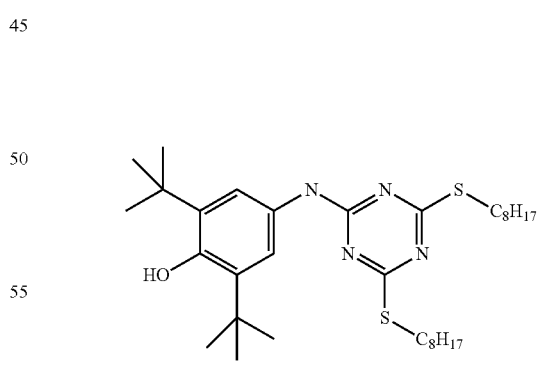

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F
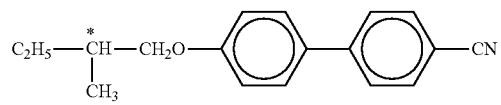
C 15
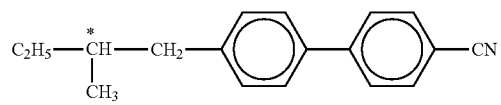
CB 15
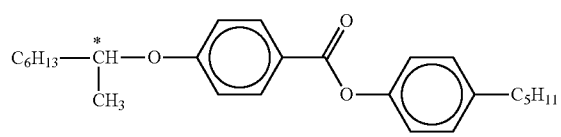
CM 21
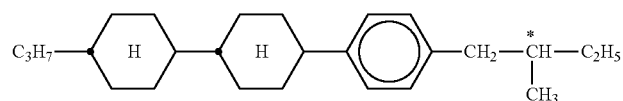
CM 44
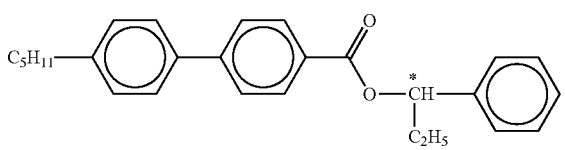
CM 45
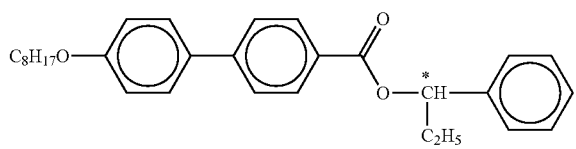
CM 47
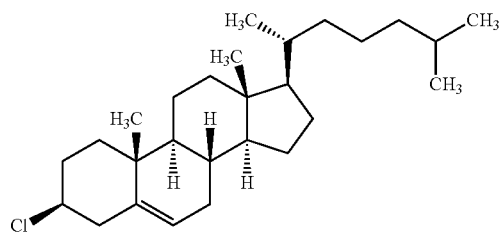
CC*
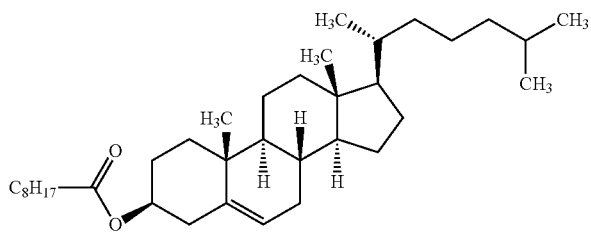
CN TABLE F-continued

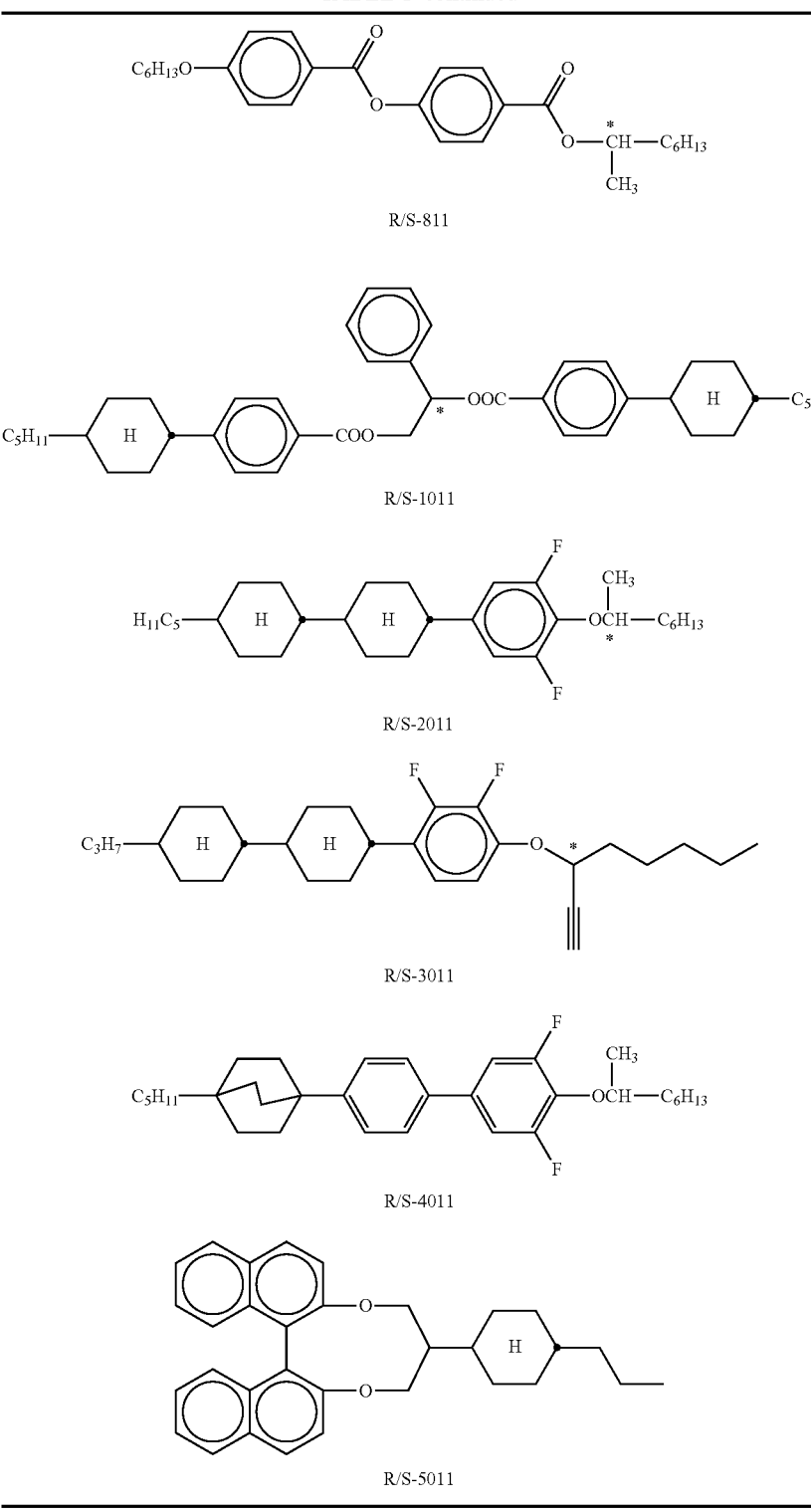

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise seven or more, preferably eight or more, compounds, preferably compounds having three or more, preferably four or more, different formulae, selected from the group of the compounds from Table D.

EXAMPLES

The following examples illustrate the present invention without limiting it in any way.

However, it is clear to the person skilled in the art from the physical properties what properties can be achieved and in what ranges they can be modified. In particular, the combination of the various properties which can preferably be achieved is thus well defined for the person skilled in the art.

Comparative Example 1

A liquid-crystal mixture C-1 having the composition and properties as indicated in the following table is prepared and characterized with respect to its general physical properties and its applicability in microwave components at 19 GHz.

TABLE 1

Composition and properties of the mixture C-1

| | Composition Compound | |
|---|---|---|
| No. | Abbreviation | |
| 1 | PPTUI-3-2 | 20.0 |
| 2 | PPTUI-3-4 | 36.0 |
| 3 | GGP-3-CL | 10.0 |
| 4 | GGP-5-CL | 20.0 |
| 5 | CPGP-5-2 | 7.0 |
| 6 | CPGP-5-2 | 7.0 |
| Σ | | 100.0 |

Physical properties $T (N, I) = 173°$ C.
$n_e$ (20° C., 589.3 nm) = 1.855
$\Delta n$ (20° C., 589.3 nm) = 0.335
$\varepsilon_{\parallel}$ (20° C., 1 kHz) = 8.1
$\Delta\varepsilon$ (20° C., 1 kHz) = 4.6
$\gamma_1$ (20° C.) = 746 mPa · s
$V_0$ = 2.42 V
tan $\delta_{\varepsilon\ r,\perp}$ (20° C., 19 GHz) = 0.0143
tan $\delta_{\varepsilon\ r,\parallel}$ (20° C., 19 GHz) = 0.0038
$\tau$ (20° C., 19 GHz) = 0.252
$\eta$ (20° C., 19 GHz) = 17.6

This mixture is suitable for applications in the microwave range, in particular for phase shifters or LC based antenna elements in the micro wave (MW) region. In comparison to the Example this mixture clearly exhibits inferior properties. In particular, it is not very stable against storage at deep temperatures.

Example 1

A liquid-crystal mixture M-1 having the composition and properties as indicated in the following table is prepared.

TABLE 1

Composition and properties of the mixture M-1

| | Composition Compound | |
|---|---|---|
| No. | Abbreviation | |
| 1 | PPTUI-3-2 | 20.0 |
| 2 | PPTUI-3-4 | 32.0 |
| 3 | GGP-3-CL | 18.0 |

TABLE 1-continued

Composition and properties of the mixture M-1

| | | |
|---|---|---|
| 4 | PGUQU-5-F | 3.0 |
| 5 | CC-3-V | 12.0 |
| 6 | PP-1-2V1 | 5.0 |
| 7 | PTGTP-4-4 | 10.0 |
| Σ | | 100.0 |

Physical properties $T (N, I) = 131°$ C.
$n_e$ (20° C., 589.3 nm) = t.b.d.
$\Delta n$ (20° C., 589.3 nm) = t.b.d.
$\varepsilon_{\parallel}$ (20° C., 1 kHz) = 6.3
$\Delta\varepsilon$ (20° C., 1 kHz) = 3.1
$\gamma_1$ (20° C.) = 311 mPa · s
$V_0$ = 2.51 V
tan $\delta_{\varepsilon\ r,\perp}$ (20° C., 19 GHz) = 0.0127
$\tau$ (20° C., 19 GHz) = 0.250
$\eta$ (20° C., 19 GHz) = 19.7

Remarks: t.b.d.: to be determined.

This mixture is comparatively stable against storage at deep temperatures.

Further, this mixture is very highly suitable for applications in the microwave range, in particular for phase shifters or LC based antenna elements in the micro wave (MW) region.

Example 2

A liquid-crystal mixture M-2 having the composition and properties as indicated in the following table is prepared.

TABLE 2

Composition and properties of the mixture M-2

| | Composition Compound | |
|---|---|---|
| No. | Abbreviation | |
| 1 | PPTUI-3-2 | 20.0 |
| 2 | PPTUI-3-4 | 32.0 |
| 3 | GGP-3-CL | 20.0 |
| 4 | CC-3-V | 12.0 |
| 5 | PP-1-2V1 | 5.0 |
| 6 | PTGTP-4-4 | 10.0 |
| Σ | | 100.0 |

Physical properties $T (N, I) = $ t.b.d. ° C.
$n_e$ (20° C., 589.3 nm) = t.b.d.
$\Delta n$ (20° C., 589.3 nm) = t.b.d.
$\varepsilon_{\parallel}$ (20° C., 1 kHz) = t.b.d.
$\Delta\varepsilon$ (20° C., 1 kHz) = t.b.d.
$\gamma_1$ (20° C.) = t.b.d. mPa · s
$V_0$ = t.b.d. V
tan $\delta_{\varepsilon\ r,\perp}$ (20° C., 19 GHz) = 0.0132
$\tau$ (20° C., 19 GHz) = 0.229
$\eta$ (20° C., 19 GHz) = 17.3

Remarks: t.b.d.: to be determined.

This mixture is very highly suitable for applications in the microwave range, in particular for phase shifters or LC based antenna elements in the micro wave (MW) region.

It is also comparatively stable against storage at deep temperatures.

Example 3

A liquid-crystal mixture M-3 having the composition and properties as indicated in the following table is prepared.

TABLE 3

Composition and properties of the mixture M3

Composition Compound

| No. | Abbreviation | |
|---|---|---|
| 1 | PPTUI-3-2 | 20.0 |
| 2 | PPTUI-3-4 | 32.0 |
| 3 | GGP-3-CL | 18.0 |
| 4 | PGUQU-5-F | 3.0 |
| 5 | CC-3-V | 12.0 |
| 6 | PP-1-2V1 | 5.0 |
| 7 | PTG(CL)TP-4-4 | 10.0 |
| Σ | | 100.0 |

Physical properties

T (N, I) = 132° C.
$n_e$ (20° C., 589.3 nm) = t.b.d.
Δn (20° C., 589.3 nm) = t.b.d.
$\varepsilon_{\parallel}$ (20° C., 1 kHz) = 6.3
Δε (20° C., 1 kHz) = 3.3
$\gamma_1$ (20° C.) = 359 mPa · s
$V_0$ = 2.47 V
tan $\delta_{\varepsilon\, r,\perp}$(20° C., 19 GHz) = 0.0126
τ (20° C., 19 GHz) = 0.230
η (20° C., 19 GHz) = 18.3

Remarks: t.b.d.: to be determined.

This mixture is comparatively stable against storage at deep temperatures. It is stable against storage at a temperature of −20° C. in the bulk for at least 1000 hours.

Further it is very highly suitable for applications in the microwave range, in particular for phase shifters or LC based antenna elements in the micro wave (MW) region.

Example 4

A liquid-crystal mixture M-4 having the composition and properties as indicated in the following table is prepared.

TABLE 4

Composition and properties of the mixture M-4

Composition Compound

| No. | Abbreviation | |
|---|---|---|
| 1 | PPTUI-3-2 | 20.0 |
| 2 | PPTUI-3-4 | 30.0 |
| 3 | PGUQU-3-F | 3.0 |
| 4 | PGUQU-5-F | 3.0 |
| 5 | PTP(2)TP-6-3 | 30.0 |
| 6 | PTGTP-4-4 | 14.0 |
| Σ | | 100.0 |

Physical properties

T (N, I) = 124° C.
$n_e$ (20° C., 589.3 nm) = t.b.d.
Δn (20° C., 589.3 nm) = t.b.d.
$\varepsilon_{\parallel}$ (20° C., 1 kHz) = 5.5
Δε (20° C., 1 kHz) = 2.6
$\gamma_1$ (20° C.) = t.b.d. mPa · s
$V_0$ = 2.38 V TABLE 4-continued Composition and properties of the mixture M-4 tan $\delta_{\varepsilon\, r,\perp}$(20° C., 19 GHz) = 0.0113
τ (20° C., 19 GHz) = 0.256
η (20° C., 19 GHz) = 22.7

Remarks: t.b.d.: to be determined.

This mixture is very highly suitable for applications in the microwave range, in particular for phase shifters or LC based antenna elements in the micro wave (MW) region.

It is also comparatively stable against storage at deep temperatures.

Example 5

A liquid-crystal mixture M-5 having the composition and properties as indicated in the following table is prepared.

TABLE 5

Composition and properties of the mixture M-5

Composition Compound

| No. | Abbreviation | |
|---|---|---|
| 1 | PPTUI-3-2 | 20.0 |
| 2 | PPTUI-3-4 | 30.0 |
| 3 | PGUQU-3-F | 3.0 |
| 4 | PGUQU-5-F | 3.0 |
| 5 | PTP(2)TP-6-3 | 30.0 |
| 6 | PTG(CL)TP-4-4 | 14.0 |
| Σ | | 100.0 |

Physical properties

T (N, I) = 121° C.
$n_e$ (20° C., 589.3 nm) = t.b.d.
Δn (20° C., 589.3 nm) = t.b.d.
$\varepsilon_{\parallel}$ (20° C., 1 kHz) = 5.5
Δε (20° C., 1 kHz) = 2.6
$\gamma_1$ (20° C.) = t.b.d. mPa · s
$V_0$ = 2.34 V
tan $\delta_{\varepsilon\, r,\perp}$(20° C., 19 GHz) = 0.0104
τ (20° C., 19 GHz) = 0.259
η (20° C., 19 GHz) = 24.9

Remarks: t.b.d.: to be determined.

This mixture is very highly suitable for applications in the microwave range, in particular for phase shifters or LC based antenna elements in the micro wave (MW) region. It is Also Comparatively Stable Against Storage at Deep Temperatures.

The invention claimed is:
1. A liquid crystal medium, comprising:
one or more compounds of formula G-2

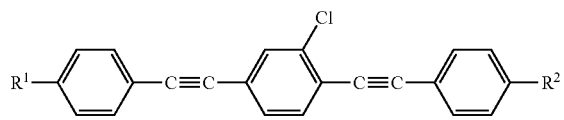

G-2 wherein
$R^1$ and $R^2$ independently of one another, denote unfluorinated alkyl or unfluorinated alkoxy, each having 1 to 15 C atoms, un-fluorinated alkenyl, unfluorinated alkenyloxy or unfluorinated alkoxyalkyl, each having 2 to 15 C atoms;

one or more compounds selected from the group of compounds of formulae II-1a and II-1b

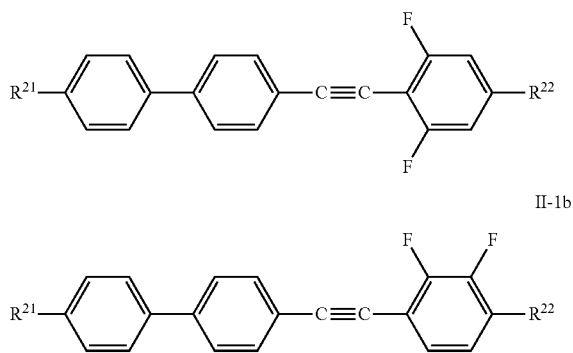

in which

R$^{21}$ and R$^{22}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms; and one or more compounds of formula IV

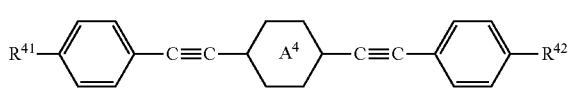

wherein

Denotes

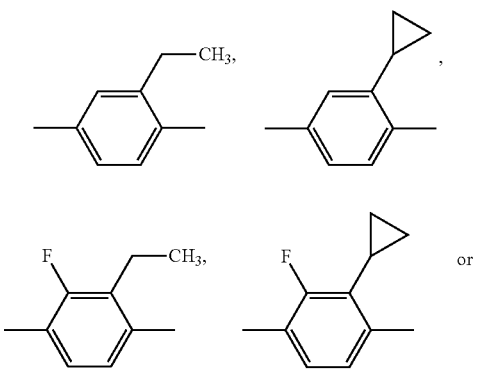

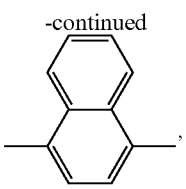

R$^{41}$ to R$^{42}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having 3 to 15 C atoms.

2. The liquid crystal medium according to claim 1, wherein said medium further comprises one or more compounds of formula P

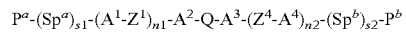

wherein the individual radicals have the following meanings:

P$^a$, P$^b$ each, independently of one another, are a polymerizable group,

Sp$^a$, Sp$^b$ each, independently of one another, denote a spacer group, s1, s2 each, independently of one another, denote 0 or 1, n1, n2 each, independently of one another, denote 0 or 1, Q denotes a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —O—, —CH$_2$—, —(CH$_2$)$_3$—, or —CF$_2$—, Z$^1$, Z$^4$ each, independently of one another, denote a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —O—, —CH$_2$—, —(CH$_2$)$_3$—, —CF$_2$—, where Z$^1$ and Q or Z$^4$ and Q do not simultaneously denote a group selected from —CF$_2$O— and —OCF$_2$—, A$^1$, A$^2$, A$^3$, A$^4$ each, independently of one another, denote a diradical group selected from the following groups:

a) the group consisting of trans-1,4-cyclohexylene, 1,4-cyclohexenylene and 1,4'-bicyclohexylene, in which, in addition, one or more non-adjacent CH$_2$ groups may each be replaced by —O— or —S— and in which, in addition, one or more H atoms may each be replaced by F, b) the group consisting of 1,4-phenylene and 1,3-phenylene, in which, in addition, one or two CH groups may each be replaced by N and in which, in addition, one or more H atoms may each be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which is unsubstituted or mono- or polysubstituted by L, d) the group consisting of saturated, partially unsaturated or fully unsaturated, and optionally substituted, polycyclic radicals having 5 to 20 cyclic C atoms, one or more of which may, in addition, each be replaced by heteroatoms, where, in addition, one or more H atoms in these radicals may each be replaced by L, and/or one or more double bonds may each be replaced by single bonds, and/or one or more CH groups may be replaced by N, and $A^3$, alternatively may be a single bond, and L on each occurrence, identically or differently, denotes F, Cl, CN, SCN, $SF_5$, straight-chain, optionally fluorinated, alkyl or alkoxy having 1 to 12 C atoms, branched, optionally fluorinated, alkyl or alkoxy having 3 to 12 C atoms, or alkylcarbonyl, alkoxycarbonyl, alkylcarbonyloxy or alkoxycarbonyloxy having 2 to 12 C atoms, in each case optionally fluorinated.

3. The liquid crystal medium according to claim 1, wherein said medium further comprises one or more compounds selected from the group of compounds of formulae CC and CP

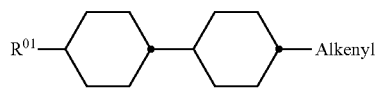
CC

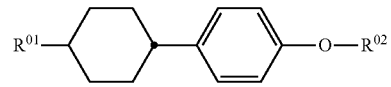
CP wherein

Alkenyl denotes unfluorinated alkenyl having 2 to 15 C atoms, $R^{01}$ denotes unfluorinated alkyl having 1 to 17 C atoms or unfluorinated alkenyl having 2 to 15 C atoms, and $R^{02}$ denotes unfluorinated alkyl having 1 to 17 C atoms or unfluorinated alkenyl having 2 to 15 C atoms.

4. The liquid crystal medium according to claim 1, wherein said medium comprises one or more chiral compounds having an absolute value of the HTP of 10 $\mu m^{-1}$ or more.

5. The liquid crystal medium according to claim 1, wherein said medium further comprises one or more chiral compounds selected from the group of compounds of formulae A-I to A-VI:

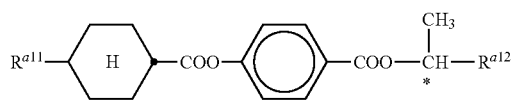
A-I

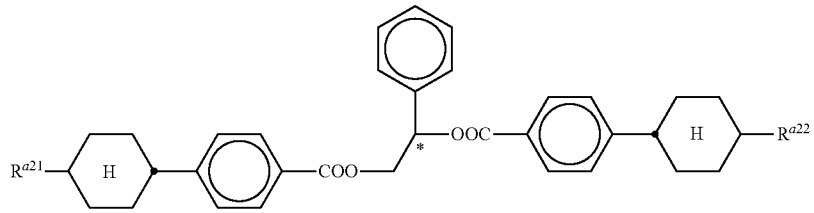
A-II

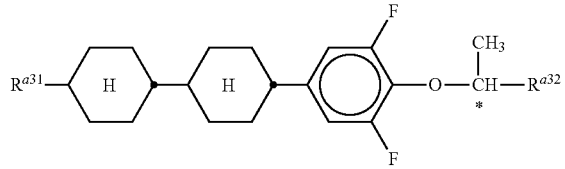
A-III

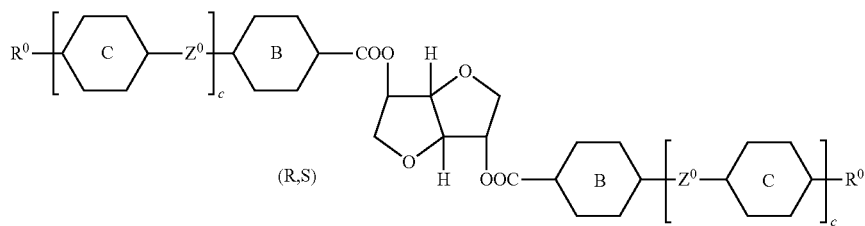
A-IV

-continued

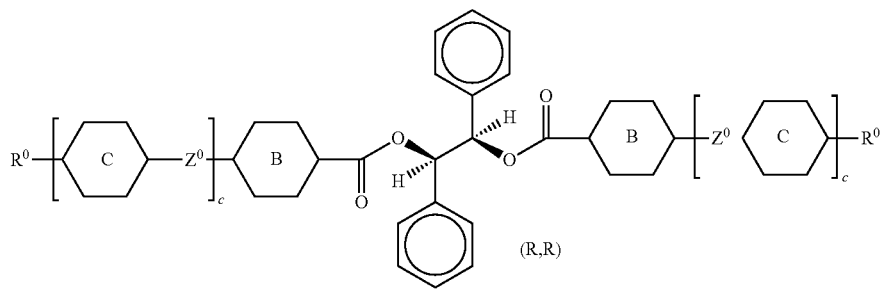

A-V including the (R,S), (S,R), (R,R) and (S,S) enantiomers, which are not shown,

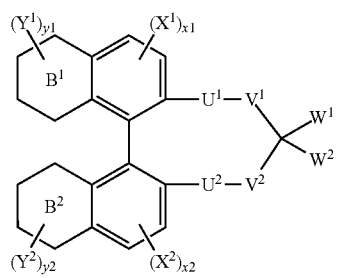

A-VI in which
$R^{a11}$ and $R^{a12}$, independently of one another, are alkyl, oxaalkyl or alkenyl having from 2 to 9 carbon atoms, and $R^{a11}$ is alternatively methyl or alkoxy having from 1 to 9 carbon atoms,
$R^{a21}$ and $R^{a22}$, independently of one another, are alkyl or alkoxy having from 1 to 9 carbon atoms, oxaalkyl, alkenyl or alkenyloxy having from 2 to 9 carbon atoms,
$R^{a31}$ and $R^{a32}$, independently of one another, are alkyl, oxaalkyl or alkenyl having from 2 to 9 carbon atoms, and $R^{a31}$ is alternatively methyl or alkoxy having from 1 to 9 carbon atoms,

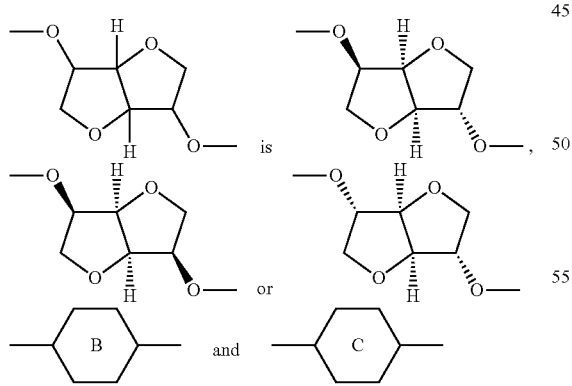

are each, independently of one another, 1,4-phenylene, which may also be mono-, di- or trisubstituted by L, or 1,4-cyclohexylene,
L is H, F, Cl, CN or optionally halogenated alkyl or alkoxy having 1 to 7 carbon atoms or alkylcarbonyl, alkoxycarbonyl or alkoxycarbonyloxy having 2 to 7 carbon atoms, c is 0 or 1,
$Z^0$ is —CO—O—, —O—CO—, —$CH_2CH_2$— or a single bond, and
$R^0$ is alkyl-carbonyloxy alkyl or alkoxy having 1 to 12 carbon atoms or alkylcarbonyl, alkoxycarbonyl or alkoxycarbonyloxy having 2 to 12 carbon atoms,
$X^1$, $X^2$, $Y^1$ and $Y^2$ are each, independently of one another, F, Cl, Br, I, CN, SCN, $SF_5$, a straight-chain alkyl having from 1 to 25 carbon atoms or a branched alkyl having 3 to 25 carbon atoms, which in each case may be monosubstituted or polysubstituted by F, Cl, Br, I or CN and in which, in addition, one or more non-adjacent $CH_2$ groups may each, independently of one another, be replaced by —O—, —S—, —NH—, $NR^0$—, —CO—, —CO—O—, —O—CO—, —OC(O)O—, —S—CO—, —CO—S—, —CH=CH— or —C≡C— in such a way that O and/or S atoms are not bonded directly to one another, a polymerizable group or cycloalkyl or aryl having 3 to 20 carbon atoms, which may optionally be monosubstituted or polysubstituted by halogen or by a polymerizable group,
$x^1$ and $x^2$ are each, independently of one another, 0, 1 or 2,
$y^1$ and $y^2$ are each, independently of one another, 0, 1, 2, 3 or 4,
$B^1$ and $B^2$ are each, independently of one another, an aromatic or partially or fully saturated aliphatic six-membered ring in which one or more CH groups may each be replaced by N atoms and one or more non-adjacent $CH_2$ groups may each be replaced by O or S,
$W^1$ and $W^2$ are each, independently of one another, $Z^1$-$A^1$-($Z^2$-$A^2$)$_m$-R, and one of the two is alternatively $R^1$ or $A^3$, but both are not simultaneously H, or

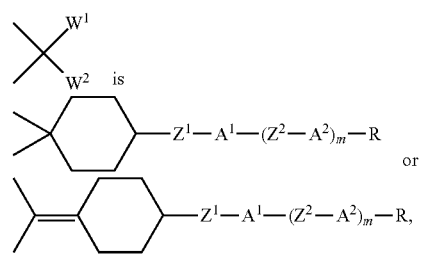

$U^1$ and $U^2$ are each, independently of one another, $CH_2$, O, S, CO or CS,
$V^1$ and $V^2$ are each, independently of one another, $(CH_2)_n$, in which from one to four non-adjacent $CH_2$ groups may each be replaced by O or S, and, in the case where

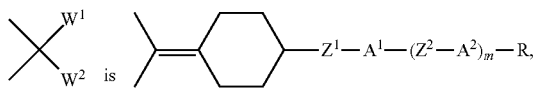 is 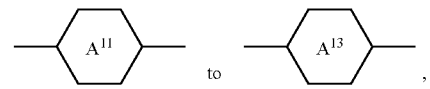, both of $V^1$ and $V^2$ are a single bond, $Z^1$ and $Z^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH═N—, —N═CH—, —N═N—, —CH═CH—, —CF═CH—, —CH═CF—, —CF═CF—, —C≡C—, or a combination of two of these groups, where no two O and/or S and/or N atoms are bonded directly to one another, or a single bond, $A^1$, $A^2$ and $A^3$ are each, independently of one another, 1,4-phenylene, in which one or two non-adjacent CH-groups may each be replaced by N, 1,4-cyclohexylene, in which one or two non-adjacent CH$_2$ groups may each be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydro-naphthalene-2,6-diyl, where each of these groups is unsubstituted or monosubstituted or polysubstituted by L, and in addition $A^1$ is a single bond, L is a halogen atom, CN, NO$_2$, alkyl or alkoxy having 1 to 7 carbon atoms or alkylcarbonyl, alkoxycarbonyl or alkoxycarbonyloxy having 2 to 7 carbon atoms, in which one or more H atoms may be replaced by F or Cl, m is in each case, independently, 0, 1, 2 or 3, and R and $R^1$ are each, independently of one another, H, F, Cl, Br, I, CN, SCN, SF$_5$, a straight-chain alkyl having from 1 to 25 carbon atoms or a branched alkyl having 3 to 25 carbon atoms, which in each case may optionally be monosubstituted or polysubstituted by F, Cl, Br, I or CN, and in which one or more non-adjacent CH$_2$ groups may each be replaced by —O—, —S—, —NH—, —NR$^0$—, —CO—, —CO—O—, —O—CO—, —O—C(O)O—, —S—CO—, —CO—S—, —CH═CH— or where no two O and/or S atoms are bonded directly to one another, or a polymerizable group.

6. The liquid crystal medium according to claim 1, wherein said medium further contains one or more compounds selected from formulae I-1, I-2, and I-3:

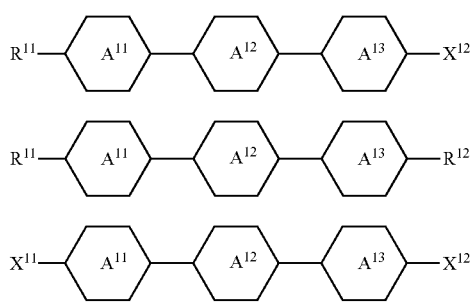

wherein $R^{11}$ denotes unfluorinated alkyl having 1 to 7 C atoms or unfluorinated alkenyl having 2 to 7 C atoms, $R^{12}$ denotes unfluorinated alkyl having 1 to 7 C atoms or unfluorinated alkenyl having 2 to 7 C atoms or unfluorinated alkoxy having 1 to 7 C atoms, $X^{11}$ and $X^{12}$, independently of one another, denote F, Cl, —OCF$_3$, —CF$_3$, —CN, —NCS or —SF$_5$, and

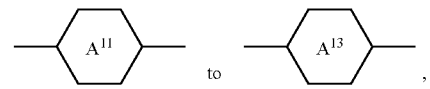

independently of one another, denote

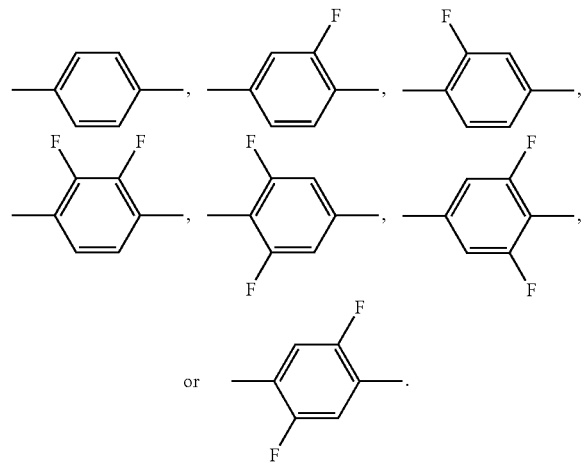

7. The liquid crystal medium according to claim 1, wherein said medium further contains one or more compounds of the formula III:

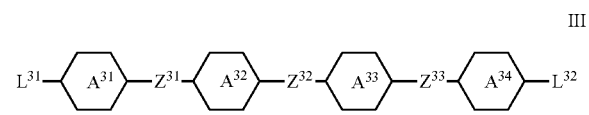

in which $L^{31}$ denotes $R^{31}$ or $X^{31}$, $L^{32}$ denotes $R^{32}$ or $X^{32}$, $R^{31}$ and $R^{32}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, $X^{31}$ and $X^{32}$, independently of one another, denote H, F, Cl, —CN, —NCS, —SF$_5$, fluorinated alkyl having 1 to 7 C atoms or fluorinated alkenyl, unfluorinated or fluorinated alkenyloxy or unfluorinated or fluorinated alkoxyalkyl having 2 to 7 C atoms, $Z^{31}$ to $Z^{33}$, independently of one another, denote trans-CH═CH—, trans —CF═CF—, —C≡C— or a single bond, and

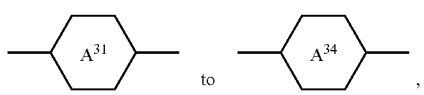

to , independently of one another, denote

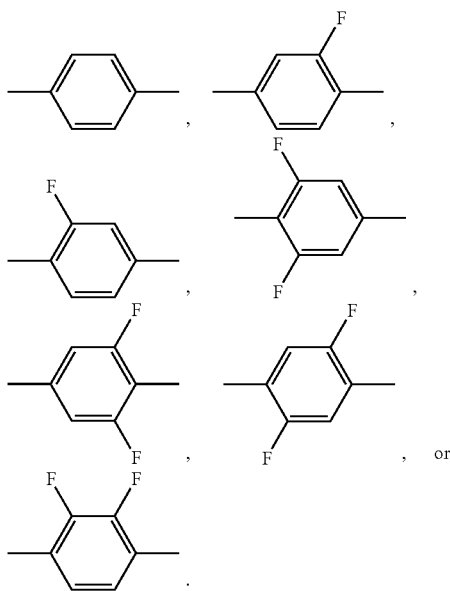

, or

8. The liquid crystal medium according to claim 1, wherein said medium further comprises a polymerization initiator.

9. A method for improving the response time of a liquid-crystal medium according to claim 1 comprising adding one or more chiral compounds.

10. A composite system comprising a liquid-crystal medium according to claim 2 wherein said medium contains a polymer obtained or obtainable from the polymerization of said one or more compounds of formula P.

11. A component for high-frequency technology, comprising a liquid crystal medium according to claim 1.

12. The component according to claim 11, wherein said component is suitable for operation in the microwave range.

13. The component according to claim 11, wherein said component is a phase shifter or a liquid crystal based antenna element operable in the microwave region.

14. A process for preparation of a liquid-crystal medium according to claim 2, said process comprising mixing one or more polymerizable compounds of formula P with one or more compounds of formula G-2, one or more compounds selected from the group of the compounds of the formulae II-1a and II-1b, one or more compounds of formula IV, and optionally with one or more further compounds and/or with one or more additives.

15. A microwave antenna array comprising one or more components according to claim 11.

16. The liquid crystal medium according to claim 1, wherein $R^{21}$ and $R^{22}$, independently of one another, denote unfluorinated alkyl having 3 to 10 C atoms or unfluorinated alkenyl having 3 to 10 C atoms.

17. The liquid crystal medium according to claim 2, wherein, in formula P, n1 are n2 each 0 and Q is —$CF_2O$—.

18. The liquid crystal medium according to claim 2, wherein, in formula P, the groups $A^1$, $A^2$, $A^3$, $A^4$ are each, independently of one another, denote a diradical group selected from the following groups:

a) the group consisting of trans-1,4-cyclohexylene, 1,4-cyclohexenylene and 1,4'-bicyclohexylene, in which, in addition, one or more non-adjacent $CH_2$ groups may each be replaced by —O— or —S— and in which, in addition, one or more H atoms may each be replaced by F, b) the group consisting of 1,4-phenylene and 1,3-phenylene, in which, in addition, one or two CH groups may each be replaced by N and in which, in addition, one or more H atoms may each be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which is unsubstituted or mono- or polysubstituted by L, d) the group consisting of bicyclo[1.1.1]pentane-1,3-diyl, bicyclo[2.2.2]octane-1,4-diyl, spiro[3.3]heptane-2,6-diyl,

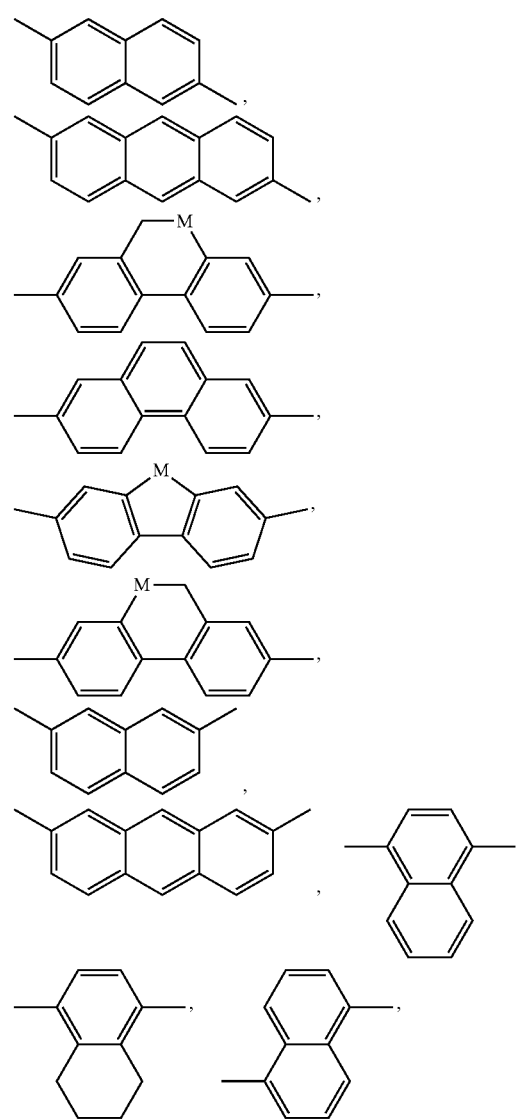

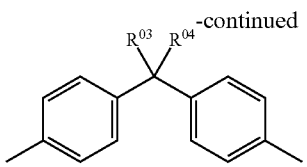
-continued where, in addition, one or more H atoms in these radicals may each be replaced by L, and/or one or more double bonds may each be replaced by single bonds, and/or one or more CH groups may be replaced by N, and $A^3$, alternatively may be a single bond, wherein $R^{03}$, $R^{04}$ each, independently of one another, denote H, F, a straight-chain alkyl having 1 to 12 C atoms, in which, in addition, one or more H atoms may each be replaced by F, or a branched alkyl having 3 to 12 C atoms, in which, in addition, one or more H atoms may each be replaced by F M denotes —O—, —S—, —CH$_2$—, —CHY$^1$— or —CY$^1$Y$^2$—, and $Y^1$ and $Y^2$ each, independently of one another, denote H, F, Cl, CN, a straight-chain alkyl having 1 to 12 C atoms, in which, in addition, one or more H atoms may each be replaced by F, or a branched alkyl having 3 to 12 C atoms, in which, in addition, one or more H atoms may each be replaced by F, and one of the groups $Y^1$ and $Y^2$ alternatively denotes —OCF$_3$.

19. The liquid crystal medium according to claim 18, $Y^1$ and $Y^2$ wherein are each independently H, F, Cl, CN or CF$_3$.

20. A composite system comprising a polymer obtained or obtainable from polymerization of polymerizable compounds within a liquid-crystal medium according to claim 2.

21. A process for the preparation of a liquid-crystal medium according to claim 3, said process comprising mixing one or more compounds of formula G-2, one or more compounds selected from formulae CC and CP, one or more compounds selected from formulae II-1a and II-1b, one or more compounds of formula IV, and optionally with one or more further compounds and/or with one or more additives.

22. The liquid crystal medium according to claim 1, wherein said medium has a material quality, η, of 17 or more measured at 20° C. and 19 GHz.

23. The liquid crystal medium according to claim 1, wherein $R^{41}$ and $R^{42}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms.

24. The liquid crystal medium according to claim 1, wherein said medium further comprises one or more compounds of the following formula

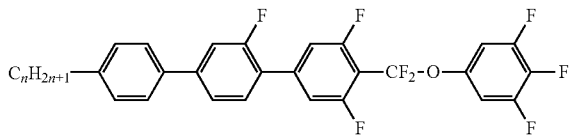

wherein n is an integer of 1 to 7.

25. The liquid crystal medium according to claim 1, wherein $R^1$ and $R^2$ are each independently methyl, ethyl, propyl, butyl, pentyl, hexyl or heptyl.

26. The liquid crystal medium according to claim 1, wherein $R^1$ and $R^2$ are each butyl.

* * * * *